(12) United States Patent
Sysak et al.

(10) Patent No.: US 12,457,045 B2
(45) Date of Patent: Oct. 28, 2025

(54) INTEGRATED CMOS PHOTONIC AND ELECTRONIC WDM COMMUNICATION SYSTEM USING OPTICAL FREQUENCY COMB GENERATORS

(71) Applicant: Ayar Labs, Inc., Santa Clara, CA (US)

(72) Inventors: Matthew Sysak, Santa Clara, CA (US); Brandon Buscaino, Santa Clara, CA (US)

(73) Assignee: Ayar Labs, Inc., San Jose, CA (US)

( * ) Notice: Subject to any disclaimer, the term of this patent is extended or adjusted under 35 U.S.C. 154(b) by 0 days.

(21) Appl. No.: 18/350,530

(22) Filed: Jul. 11, 2023

(65) Prior Publication Data

US 2023/0353254 A1 Nov. 2, 2023

Related U.S. Application Data

(63) Continuation of application No. 17/321,380, filed on May 14, 2021, now Pat. No. 11,700,068.
(Continued)

(51) Int. Cl.
*H04B 10/50* (2013.01)
*H04B 10/80* (2013.01)
*H04Q 11/00* (2006.01)

(52) U.S. Cl.
CPC ....... *H04B 10/807* (2013.01); *H04Q 11/0005* (2013.01); *H04Q 2011/0009* (2013.01);
(Continued)

(58) Field of Classification Search
CPC ................................ H04B 10/50; H04J 14/02
See application file for complete search history.

(56) References Cited

U.S. PATENT DOCUMENTS

| 10,761,401 B1 | 9/2020 | Zhu et al. |
| 2004/0264977 A1 | 12/2004 | Yap et al. |

(Continued)

FOREIGN PATENT DOCUMENTS

| JP | 2015-216437 A | 12/2015 |
| JP | 2018-074273 A | 5/2018 |

(Continued)

OTHER PUBLICATIONS

Xu et al., "Integrated flexible-grid WDM transmitter using an optical frequency comb in microring modulators", Optics Letters, vol. 43, No. 7, Apr. 2018 (Year: 2018).*

(Continued)

*Primary Examiner* — Shi K Li
(74) *Attorney, Agent, or Firm* — Penilla IP, APC

(57) ABSTRACT

An optical data communication system includes an optical power supply and an electro-optical chip. The optical power supply includes a laser that generates laser light at a single wavelength. A comb generator receives the light at the single wavelength and generates multiple wavelengths of continuous wave light from laser light at the single wavelength. The multiple wavelengths of continuous wave light are provided as light input to the electro-optical chip. The electro-optical chip includes at least one transmit macro that receives the multiple wavelengths of continuous wave light and that modulates one or more of the multiple wavelengths of continuous wave light to generate modulated light signals that convey digital data.

17 Claims, 25 Drawing Sheets

Related U.S. Application Data

(60) Provisional application No. 63/026,676, filed on May 18, 2020.

(52) U.S. Cl.
CPC ............... *H04Q 2011/0015* (2013.01); *H04Q 2011/0016* (2013.01); *H04Q 2011/0041* (2013.01)

(56) References Cited

U.S. PATENT DOCUMENTS

| | | |
|---|---|---|
| 2006/0210212 A1 | 9/2006 | Sugiyama |
| 2009/0067843 A1* | 3/2009 | Way .................... H04J 14/0246 398/43 |
| 2012/0269514 A1* | 10/2012 | Nedovic .............. H04B 10/801 398/66 |
| 2015/0316794 A1 | 11/2015 | Hayakawa |
| 2017/0250775 A1 | 8/2017 | Kato et al. |
| 2017/0294966 A1 | 10/2017 | Jia et al. |
| 2018/0054257 A1 | 2/2018 | Witzens et al. |
| 2018/0097567 A1 | 4/2018 | LeGrange et al. |
| 2019/0013869 A1 | 1/2019 | Alic et al. |
| 2019/0028203 A1 | 1/2019 | Kuse et al. |
| 2019/0089116 A1 | 3/2019 | Popovic et al. |
| 2019/0268085 A1 | 8/2019 | Urino |
| 2019/0393962 A1 | 12/2019 | Zhang et al. |
| 2020/0021384 A1 | 1/2020 | Stojanovic et al. |
| 2020/0021899 A1 | 1/2020 | Stojanovic et al. |
| 2020/0275173 A1 | 8/2020 | Shafiei et al. |
| 2020/0409001 A1* | 12/2020 | Liang .................. H01L 27/1443 |

FOREIGN PATENT DOCUMENTS

| | | |
|---|---|---|
| TW | 200408212 A | 5/2004 |
| WO | 2018035767 A1 | 3/2018 |

OTHER PUBLICATIONS

P. Dong, "Silicon Photonic Integrated Circuits for Wavelength-Division Multiplexing Applications", IEEE Journal of Selected Topics in Quantum Electronics, vol. 22, No. 6, 2016 (Year: 2016).*
PCT Application No. PCT/US21/32830, International Search Report and Written Opinion, Mailed on Aug. 31, 2021.
Ishizawa, Atsushi et al., "Phase-Noise Characteristics of a 25-GHz-Spaced Optical Frequency Comb Based on a Phase- and Intensity-Modulated Laser," Optics Express, vol. 21, No. 24, Dec. 2, 2013.
Zhang, Mian et al., "Broadband Electro-Optic Frequency Comb Generation in a Lithium Niobate Microring Resonator," Nature, vol. 568, pp. 373-377, Apr. 18, 2019.
Demirtzioglou, Iosif et al., "Frequency Comb Generation in a Silicon Ring Resonator Modulator," Optics Express, vol. 26, No. 2, Jan. 22, 2018.
Myslivets, Evgeny et al., "Generation of Wideband Frequency Combs by Continuous-Wave Seeding of Multistage Mixers with Synthesized Dispersion," Optics Express, vol. 20, No. 3, Jan. 30, 2012.
Levy, Jacob S et al., "CMOS-Compatible Multiple-Wavelength Oscillator for On-Chip Optical Interconnects," Nature Photonics, vol. 4, pp. 37-40, Jan. 2010.
Marin-Palomo, Pablo et al., "Microresonator-Based Solitons for Massively Parallel Coherent Optical Communications," Nature, vol. 546, pp. 274-279, Jun. 8, 2017.
Anandarajah, P. M. et al., "Generation of Coherent Multicarrier Signals by Gain Switching of Discrete Mode Lasers," IEEE Photonics Journal, vol. 3, No. 1, pp. 112-122, Feb. 2011.
Hillerkuss, David et al., "Single-Laser 32.5 Tbit/s Nyquist WDM Transmission," Journal of Optical Communications and Networking, vol. 4, No. 10, pp. 715-723, Oct. 2012.
Wade, Mark et al., "TeraPHY: A Chiplet Technology for Low-Power, High-Bandwidth In-Package Optical I/O," IEEE Micro, IEEE Service Center, Los Alamitos, CA, US, vol. 40, No. 2, Feb. 24, 2020, 9 pages.

* cited by examiner

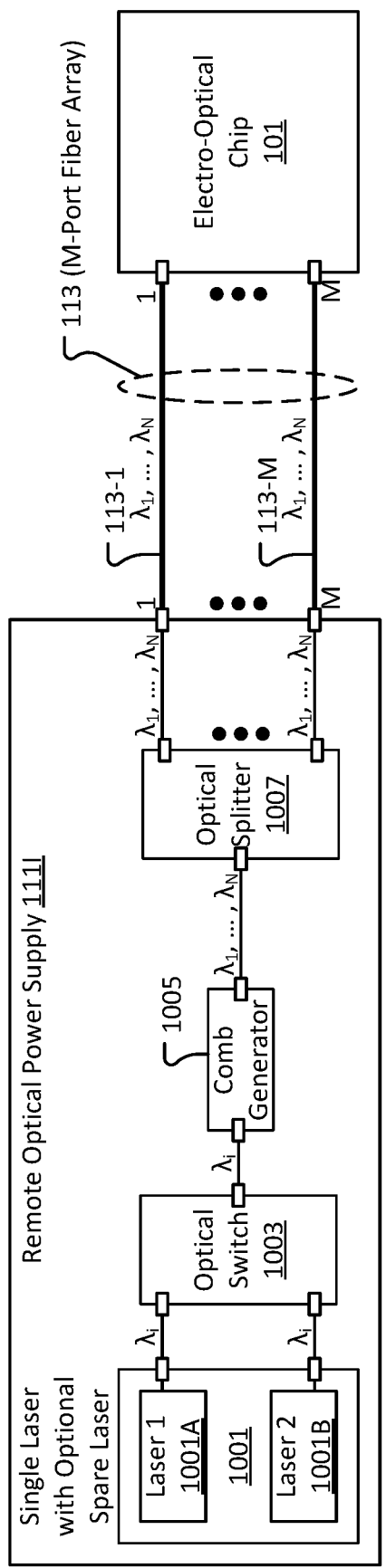
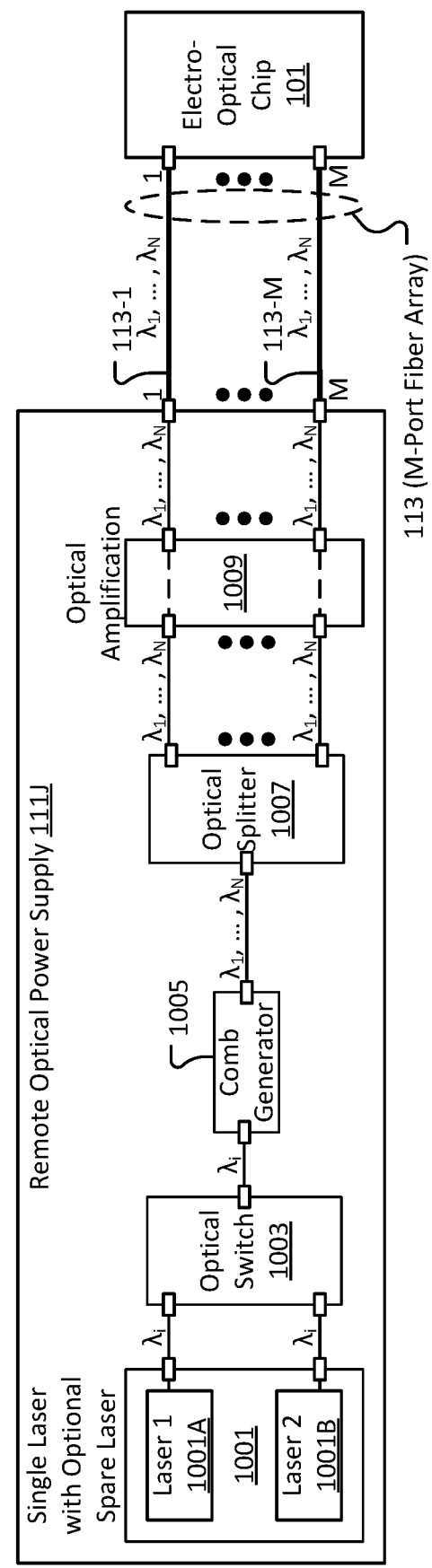
Fig. 10A
Fig. 10B

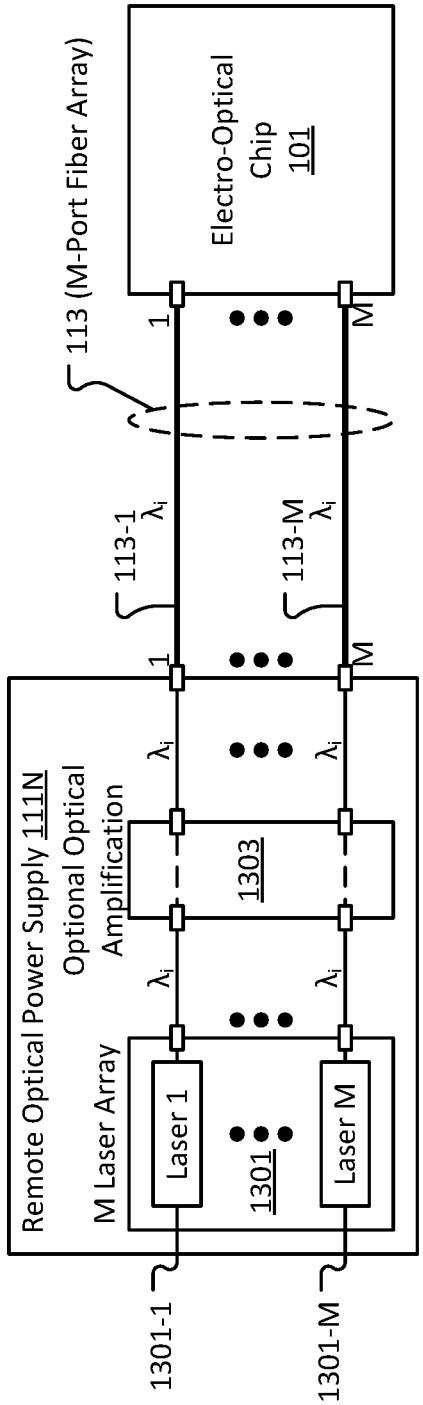
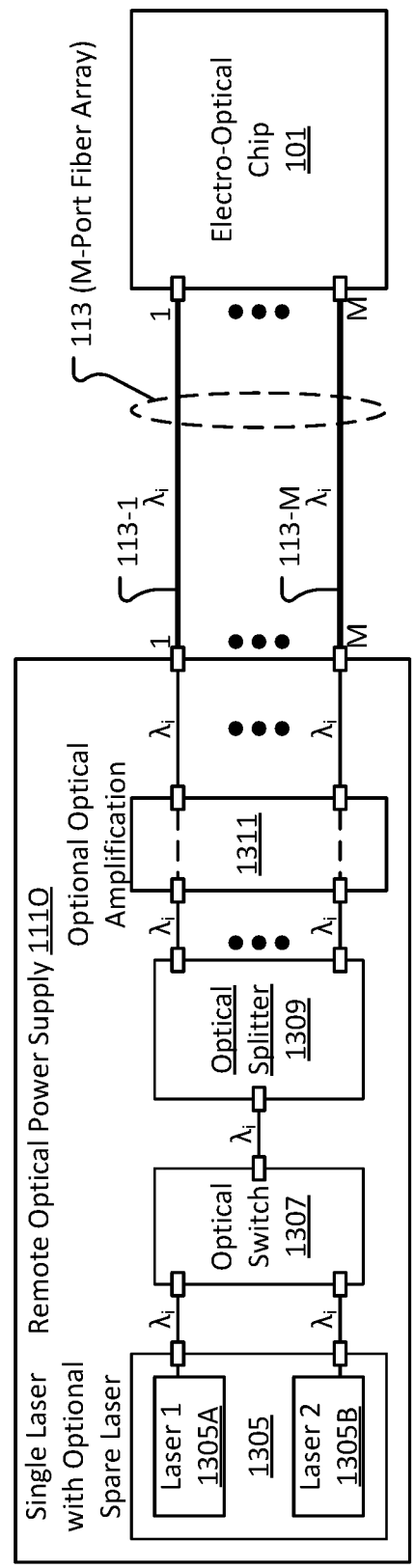
Fig. 13A
Fig. 13B

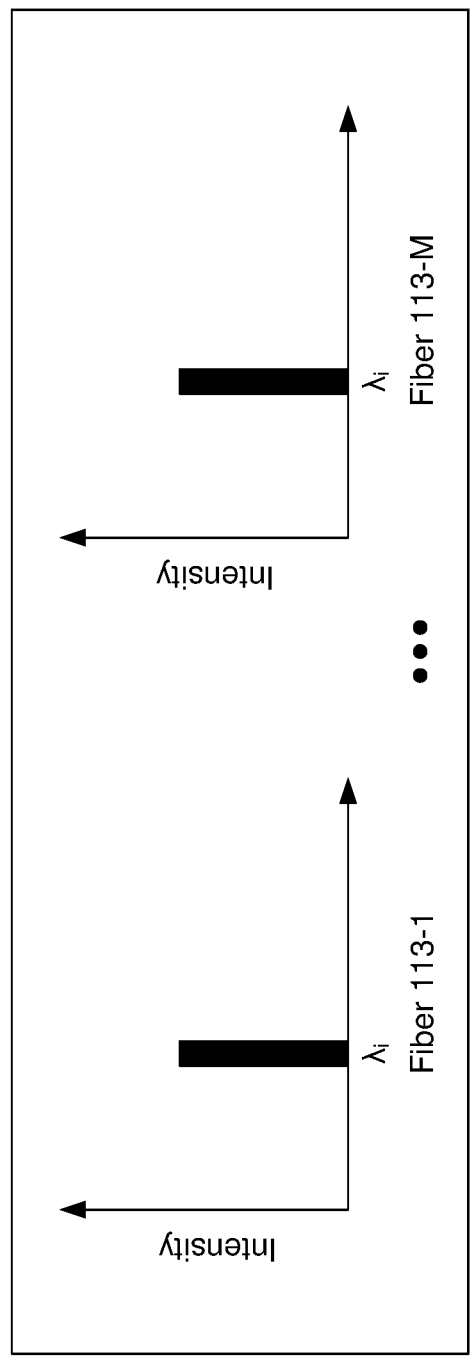

INTEGRATED CMOS PHOTONIC AND ELECTRONIC WDM COMMUNICATION SYSTEM USING OPTICAL FREQUENCY COMB GENERATORS

CLAIM OF PRIORITY

This application is a continuation application under 35 U.S.C. 120 of prior U.S. patent application Ser. No. 17/321,380, filed on May 14, 2021, issued as U.S. Pat. No. 11,700,068, on Jul. 11, 2023, which claims priority under 35 U.S.C. 119(e) to U.S. Provisional Patent Application No. 63/026,676, filed on May 18, 2020. The disclosure of each above-identified patent application is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient laser light sources. Also, it is desirable for the laser light sources of optical data communication systems to have a minimal form factor and be designed as efficiently as possible with regard to expense and energy consumption. It is within this context that the present invention arises.

In an example embodiment, an optical power supply is disclosed. The optical power supply includes a laser configured to generate continuous wave light at a single wavelength. The optical power supply also includes a comb generator optically connected to the laser to receive the continuous wave light at the single wavelength as input light. The comb generator is configured to generate multiple wavelengths of continuous wave light from the input light.

In an example embodiment, a method is disclosed for operating an optical power supply. The method includes operating a laser to generate continuous wave light at a single wavelength. The method also includes optically conveying the continuous wave light at the single wavelength to an optical input of a comb generator. The method also includes operating the comb generator to generate multiple wavelengths of continuous wave light from the continuous wave light at the single wavelength. The method also includes optically conveying the multiple wavelengths of continuous wave light to an output of the optical power supply.

In an example embodiment, an optical data communication system is disclosed. The optical data communication system includes an optical power supply and an electro-optical chip. The optical power supply includes a laser that generates laser light at a single wavelength. The optical power supply also includes a comb generator that generates multiple wavelengths of continuous wave light from laser light at the single wavelength. The optical power supply is configured to output the multiple wavelengths of continuous wave light. The electro-optical chip is optically connected to the optical power supply to receive the multiple wavelengths of continuous wave light from the optical power supply. The electro-optical chip is physically separate from the optical power supply. The electro-optical chip includes at least one transmit macro that receives the multiple wavelengths of continuous wave light and that modulates one or more of the multiple wavelengths of continuous wave light to generate modulated light signals that convey digital data.

In an example embodiment, a method is disclosed for operating an optical data communication system. The method includes operating an optical power supply to generate multiple wavelengths of continuous wave light by operating a laser onboard the optical power supply to generate laser light at a single wavelength, and by operating a comb generator onboard the optical power supply to generate multiple wavelengths of continuous wave light from the laser light at the single wavelength. The method also includes optically conveying the multiple wavelengths of continuous wave light from the optical power supply to an electro-optical chip. The method also includes operating the electro-optical chip to receive the multiple wavelengths of continuous wave light. The electro-optical chip is physically separate from the optical power supply. The method also includes operating the electro-optical chip to modulate one or more of the multiple wavelengths of continuous wave light to generate modulated light signals that convey digital data.

In an example embodiment, an electro-optical chip is disclosed. The electro-optical chip includes an optical input port optically connected to receive continuous wave light at a single wavelength from a remote optical power supply. The electro-optical chip also includes a comb generator that has an optical input optically connected to receive the continuous wave light at the single wavelength from the optical input port of the electro-optical chip. The comb generator is configured to generate multiple wavelengths of continuous wave light from the continuous wave laser light at the single wavelength and convey the multiple wavelengths of continuous wave light through an optical output of the comb generator. The electro-optical chip also includes a transmit macro that receives the multiple wavelengths of continuous wave light from the optical output of the comb generator. The transmit macro is configured to modulate one or more of the multiple wavelengths of continuous wave light to generate modulated light signals that convey digital data.

In an example embodiment, an optical data communication system is disclosed. The optical data communication system includes an optical power supply that outputs continuous wave light at a single wavelength. The optical data communication system also includes an electro-optical chip that has an optical input port optically connected to receive the continuous wave light at the single wavelength from an optical power supply. The electro-optical chip is physically separate from the optical power supply. The electro-optical chip includes a comb generator that has an optical input optically connected to receive the continuous wave light at the single wavelength from the optical input port of the electro-optical chip. The comb generator is configured to generate multiple wavelengths of continuous wave light from the continuous wave laser light at the single wavelength and convey the multiple wavelengths of continuous wave light through an optical output of the comb generator. The electro-optical chip includes a transmit macro that receives the multiple wavelengths of continuous wave light from the optical output of the comb generator. The transmit macro is configured to modulate one or more of the multiple wavelengths of continuous wave light to generate modulated light signals that convey digital data.

In an example embodiment, a method is disclosed for operating an optical data communication system. The method includes operating an optical power supply to generate continuous wave light at a single wavelength. The method also includes optically conveying the continuous wave light at the single wavelength from the optical power supply to an electro-optical chip. The method also includes operating the electro-optical chip to receive the continuous wave light at the single wavelength. The electro-optical chip is physically separate from the optical power supply. The method also includes operating a comb generator onboard the electro-optical chip to generate multiple wavelengths of continuous wave light from the continuous wave laser light at the single wavelength. The method also includes operating a transmit macro onboard the electro-optical chip to modulate one or more of the multiple wavelengths of continuous wave light as generated by the comb generator to generate modulated light signals that convey digital data.

In an example embodiment, an electro-optical chip is disclosed. The electro-optical chip includes an optical power supply, a comb generator, and a transmit macro. The optical power supply outputs continuous wave light at a single wavelength. The comb generator has an optical input optically connected to receive the continuous wave light at the single wavelength from the optical power supply. The comb generator is configured to generate multiple wavelengths of continuous wave light from the continuous wave laser light at the single wavelength and convey the multiple wavelengths of continuous wave light through an optical output of the comb generator. The transmit macro receives the multiple wavelengths of continuous wave light from the optical output of the comb generator. The transmit macro is configured to modulate one or more of the multiple wavelengths of continuous wave light to generate modulated light signals that convey digital data.

In an example embodiment, a method is disclosed for operating an electro-optical chip. The method includes operating an optical power supply onboard the electro-optical chip to generate continuous wave light at a single wavelength. The method also includes operating a comb generator onboard the electro-optical chip to generate multiple wavelengths of continuous wave light from the continuous wave laser light at the single wavelength. The method also includes operating a transmit macro onboard the electro-optical chip to modulate one or more of the multiple wavelengths of continuous wave light as generated by the comb generator to generate modulated light signals that convey digital data.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 10A shows an remote multi-wavelength optical power supply that includes a laser module having a single laser source (with optional spare laser source) configured to generate continuous wave laser light at a single wavelength $(\lambda i)$, in accordance with some embodiments.

FIG. 10B shows a multi-wavelength remote optical power supply that is a variation of the multi-wavelength remote optical power supply of FIG. 10A, in accordance with some embodiments.

FIG. 13A shows a remote (external to the electro-optical chip) single-wavelength optical power supply configured to supply continuous wave laser light at a single wavelength ($\lambda i$), in accordance with some embodiments.

FIG. 13B shows a remote (external to the electro-optical chip) single-wavelength optical power supply configured to supply continuous wave laser light at a single wavelength ($\lambda i$), in accordance with some embodiments.

FIG. 13C shows a diagram indicating how each of the optical fibers receives the single wavelengths ($\lambda i$) of continuous wave laser from each of the remote optical power supplies, in accordance with some embodiments.

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

High bandwidth, multi-wavelength WDM (Wavelength-Division Multiplexing) systems are necessary to meet the needs of increasing interconnect bandwidth requirements. In some implementations of these WDM systems, a laser source includes a remote laser array configured to generate multiple wavelengths of continuous wave (CW) laser light which are combined through an optical distribution network to provide multiple wavelengths of laser light to each of many optical output ports of the laser source. The multiple wavelengths of laser light are transmitted from any one or more of the optical output ports of the laser source to an electro-optical chip, such as to a CMOS (Complementary Metal Oxide Semiconductor) and/or an SOI (silicon-on-insulator) photonic/electronic chip, that sends and receives data in an optical data communication system. In some implementations, the multi-wavelength laser light source includes an array of lasers that have outputs optically connected to respective optical inputs of an optical distribution network that routes each incoming wavelength of CW laser light to each of multiple optical output ports of the optical distribution network. The multiple wavelengths of CW laser light are then routed from a given optical output port of the optical distribution network to a given optical input port of the electro-optical chip, such as the TeraPHY chip produced by Ayar Labs, Inc., of Santa Clara, California, as described in U.S. patent application Ser. No. 17/184,537, which is incorporated herein by reference in its entirety for all purposes.

Figure 1A:
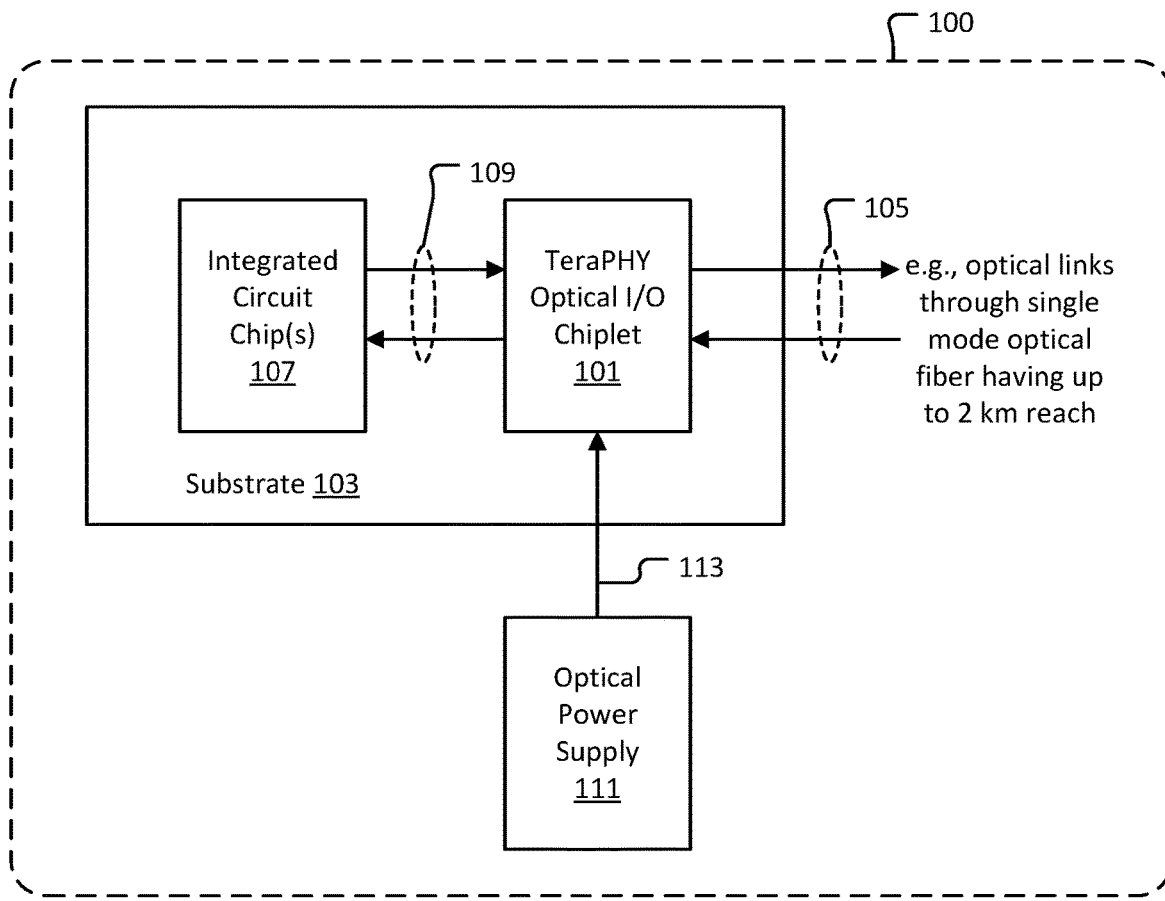
FIG. 1A shows an example block-level architecture of a system implementing a TeraPHY chiplet, in accordance with some embodiments.

FIG. 1A shows an example block-level architecture of a system 100 implementing a TeraPHY chiplet 101, in accordance with some embodiments. The system 100 shows a general representation of a multi-chip package (MCP) that is implemented to include the TeraPHY chiplet 101. The system 100 includes the TeraPHY chiplet 101 attached to a substrate 103. The TeraPHY chiplet 101 includes an optical interface that is optically connected to an optical link 105 through which bi-directional optical data communication is performed with another electro-optic device, such as with another TeraPHY chiplet. The system 100 also includes one or more integrated circuit chips 107 (semiconductor chips) attached to the substrate 103. In various embodiments, the one or more integrated circuit chips 107 includes one or more of a central processing unit (CPU), a graphics processing unit (GPU), a visual processing unit (VPU), an application specific integrated circuit (ASIC), a field programmable gate array (FPGA), a memory chip, an HBM stack, an SoC, a microprocessor, a microcontroller, a digital signal processor (DSP), an accelerator chip, and/or essentially any other type of semiconductor chip. In various embodiments, the substrate 103 is an organic package and/or interposer. In some embodiments, the substrate 103 includes electrical connections/routings 109 between the TeraPHY chiplet 101 and the one or more integrated circuit chips 107. In some embodiments, the electrical connections/routings 109 are formed within a redistribution layer (RDL) structure formed within the substrate 103. In various embodiments, the RDL structure is implemented in accordance with essentially any RDL structure topology and technology available within the semiconductor packaging industry. Some of the electrical connections/routings 109 within the substrate 103 are configured and used to provide electrical power and reference ground potential to the TeraPHY chiplet 101 and to each of the one or more semiconductor chips 107. Also, some electrical connections/routings 109 within the substrate 103 are configured and used to transmit electrical signals that provide for bi-directional digital data communication between the TeraPHY chiplet 101 and the one or more semiconductor chips 107. In various embodiments, digital data communication through the electrical connections/routings 109 between the TeraPHY chiplet 101 and the one or more semiconductor chips 107 is implemented in accordance with a digital data interconnect standard, such as the Peripheral Component Interconnect Express (PCIe) standard, the Compute Express Link (CXL) standard, the Gen-Z standard, the Open Coherent Accelerator Processor Interface (OpenCAPI), and/or the Open Memory Interface (OMI), among essentially any other digital data interconnect standard.

The system 100 also includes an optical power supply 111 optically connected to supply continuous wave laser light of one or more controlled wavelengths to the TeraPHY chiplet 101. In some embodiments, the optical power supply 111 is a SuperNova multi-wavelength, multi-port light supply provided by Ayar Labs, Inc. The optical power supply 111 supplies continuous wave (CW) light that optically powers the TeraPHY chiplet 101. In some embodiments, the optical power supply 111 is configured as a photonic integrated circuit (PIC) that generates multiple wavelengths of the CW light, multiplexes the multiple wavelengths of CW light onto a common optical fiber or optical waveguide, and splits and amplifies the multiplexed optical power to multiple output ports of the optical power supply 111 for transmission to multiple corresponding CW light input ports of the TeraPHY chiplet 101.

In various embodiments, the optical power supply 111 is optically connected to the TeraPHY chiplet 101 through one or more optical waveguides 113. In various embodiments, the one or more optical waveguides 113 includes one or more optical fibers and/or one or more optical waveguide structures formed within the substrate 103. In some embodiments, the optical power supply 111 is attached to the substrate 103. In some embodiments, the optical power supply 111 receives electrical power and electrical control signals through electrical connections/routings formed within the substrate 103. In some embodiments, the optical power supply 111 is implemented as a device physically separate from the substrate 103. In some of these embodiments, the optical power supply 111 is optically connected to the TeraPHY chiplet 101 through one or more optical fibers. In some of these embodiments, the optical power supply 111 is optically connected to the TeraPHY chiplet 101 through one or more optical fibers that are optically connected to the substrate 103 and through one or more optical waveguides formed within the substrate 103.

Figure 1B:
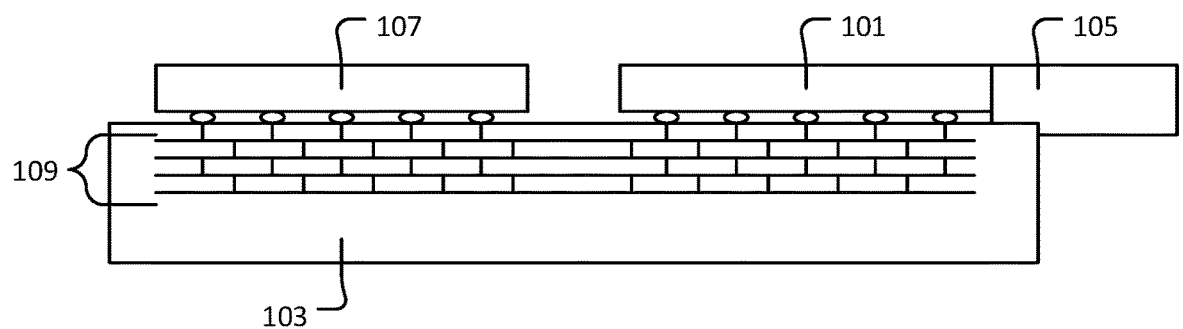
FIG. 1B shows a vertical cross-section diagram of the substrate of FIG. 1A, in accordance with some embodiments.

FIG. 1B shows a vertical cross-section diagram of the substrate 103 of FIG. 1A, in accordance with some embodiments. In some embodiments, the electrical connections/routings 109 of the RDL structure(s) are formed in multiple levels of the substrate 103. In some embodiments, the electrical connections/routings 109 include electrically conductive via structures formed to provide electrical connections between electrical traces formed in different levels of the substrate 103, as represented by the vertical lines between different levels of the electrical connections/routings 109 in FIG. 1B. It should be understood that in various embodiments the electrical connections/routings 109 are configured in essentially any manner as needed to provide required electrical connectivity between the integrated circuit chip(s) 107 and the TeraPHY optical I/O chiplet 101, and to provide electrical power to each of the integrated circuit chip(s) 107 and the TeraPHY optical I/O chiplet 101, and to provide a reference ground potential connection to each of the integrated circuit chip(s) 107 and the TeraPHY optical I/O chiplet 101.

Figure 2:
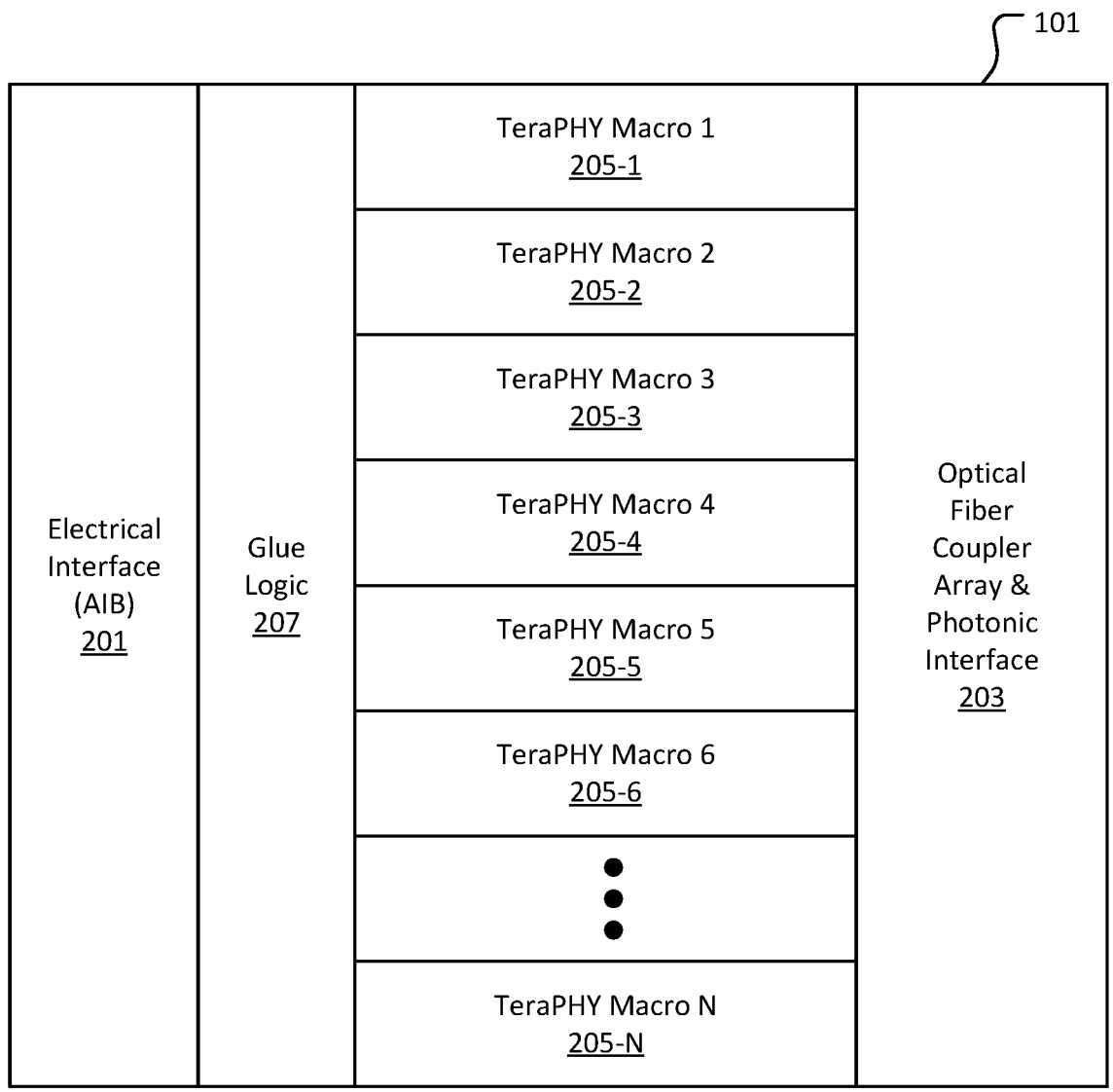
FIG. 2 shows an example organizational diagram of the TeraPHY chiplet referenced herein, in accordance with some embodiments.

FIG. 2 shows an example organizational diagram of the TeraPHY chiplet 101 referenced herein, in accordance with some embodiments. The organizational diagram has an electrical interface 201 separated (split) from a photonic interface 203. The photonic interface 203 is configured to optically couple with a fiber array. In the example of FIG. 2, the electrical interface 201 is on a left side of the TeraPHY chiplet 101, and the photonic interface 203 is on a right side of the TeraPHY chiplet 101. A number (1 to N) of optical macros 205-1 to 205-N are located between the photonic interface 203 and the electrical interface 201. The electrical interface 201 is connected to the optical macros 205-1 to 205-N by glue logic 207. The electrical interface 201 of the TeraPHY chiplet 101 is adaptable to the logic of an integrated circuit chip to which the TeraPHY chiplet 101 connects. In the example of FIG. 2, the flow of data from electronics-to-optics is from left-to-right, and the flow of data from optics-to-electronics is from right-to-left.

The electrical interface 201 is a block of circuitry configured to handle all electrical I/O to and from the integrated circuit chip to which the TeraPHY chiplet 101 connects, such as an Ethernet switch chip/die, or other type of integrated circuit chip. The optical macros 205-1 to 205-N are responsible for conversion of data signals between the optical and electrical domains. Specifically, each of the optical macros 205-1 to 205-N is configured to convert electrical data signals received through the electrical interface 201 into optical data signals for transmission through the photonic interface 203. Also, each of the optical macros 205-1 to 205-N is configured to convert optical data signals received through the photonic interface 203 into electrical data signals for transmission through the electrical interface 201. The photonic interface 203 is responsible for coupling optical signals to and from the optical macros 205-1 to 205-N. The glue logic 207 enables flexible (dynamic or static) mapping of the electrical interface 201 to the optical macros 205-1 to 205-N and associated optical wavelengths. In this manner, the glue logic 207 (also called crossbar circuitry) provides dynamic routing of electrical signals between the optical macros 205-1 to 205-N and the electrical interface 201. The glue logic 207 also provides for retiming, rebuffering, and flit reorganization functions at the phy-level. Also, in some embodiments, the glue logic 207 implements various error correction and data-level link protocols to offload some processing from the integrated circuit chip to which the TeraPHY chiplet 101 connects.

Figure 3:
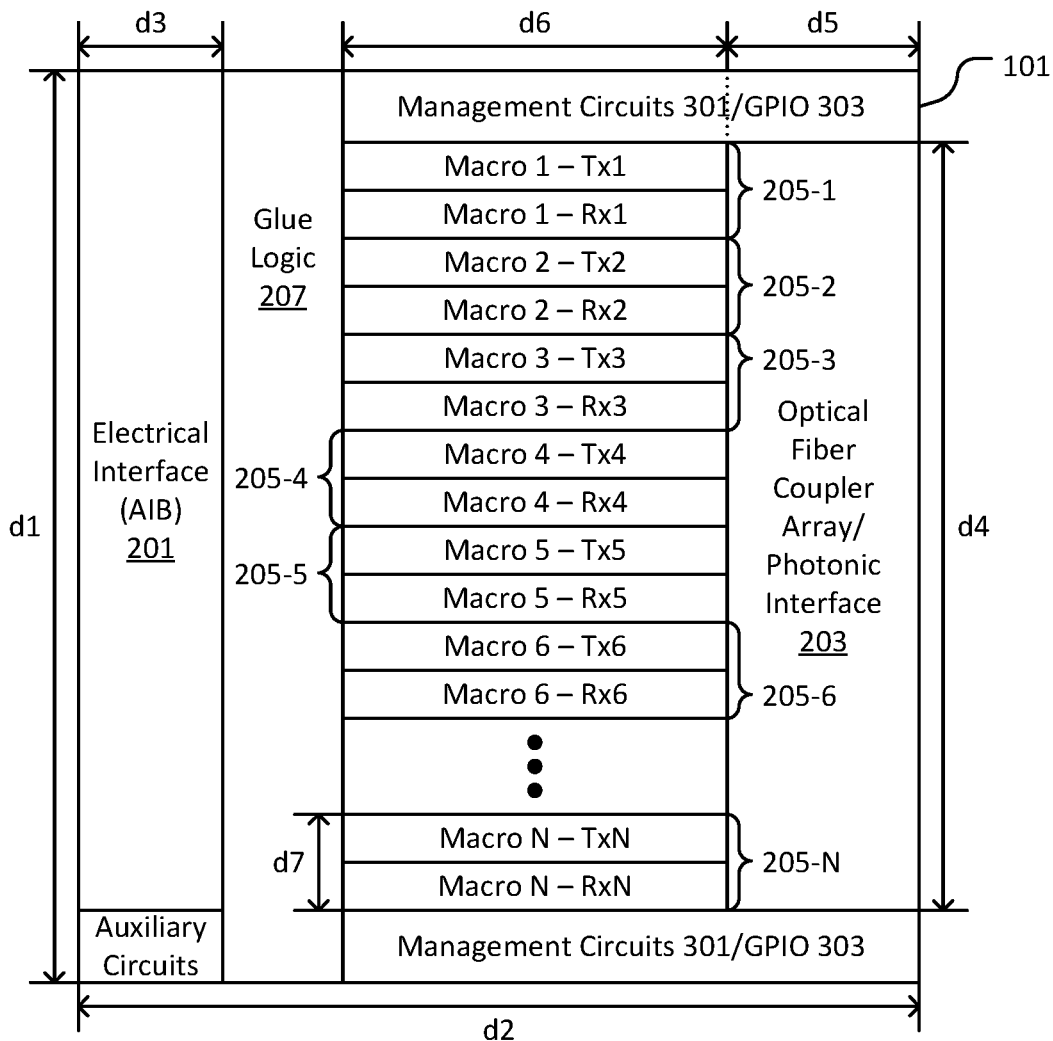
FIG. 3 shows an example layout of the TeraPHY chiplet, in accordance with some embodiments.

FIG. 3 shows an example layout of the TeraPHY chiplet 101, in accordance with some embodiments. The layout of the optical and electrical components of the TeraPHY chiplet 101 is designed to optimize area efficiency, energy efficiency, performance, and practical considerations such as avoiding optical waveguide crossings. In some embodiments, the electrical interface 201 is laid out along one chip edge (left side edge in FIG. 3), and the photonic interface 203 for optical coupling with the fiber array is laid out along the opposite chip edge (right side edge in FIG. 3). In some embodiments, the photonic interface 203 includes an optical grating coupler for each of the optical fibers in the fiber array. In various embodiments, the photonic interface 203 includes vertical optical grating couplers, edge optical couplers, or essentially any other type of optical coupling device, or combination thereof to enable optical coupling of the optical fibers in the fiber array with the optical macros 205-1 to 205-N. In some embodiments, the photonic interface 203 is configured to interface with 24 optical fibers within the fiber array. In some embodiments, the photonic interface 203 is configured to interface with 16 optical fibers within the fiber array. However, in various embodiments, the photonic interface 203 can be configured to interface with essentially any number of optical fibers within the fiber array.

The glue logic 207 routes data between the electrical interface 201 and the optical macros 205-1 to 205-N. The glue logic 207 includes cross-bar switches and other circuitry as needed to interface the electrical interface 201 connections with the optical macros 205-1 to 205-N. In some embodiments, the optical transmitters (Tx) and optical receivers (Rx) of the optical macros 205-1 to 205-N are combined in pairs, with each Tx/Rx pair forming an optical transceiver. The glue logic 207 enables dynamic mapping of electrical lanes/channels to optical lanes/channels. The optical macros 205-1 to 205-N (for data transmitting (Tx) and data receiving (Rx)) are laid out in between the glue logic 207 and the photonic interface 203 that couples with the optical fibers of the fiber array. The optical macros 205-1 to 205-N include both optical and electrical circuitry responsible for converting electrical signals to optical signals and for converting optical signals to electrical signals.

In some embodiments, the electrical interface 201 is configured to implement the Advanced Interface Bus (AIB) protocol to enable electrical interface between the TeraPHY chiplet 101 and one or more other integrated circuit chips. It should be understood, however, that in other embodiments the electrical interface 201 can be configured to implement essentially any electrical data communication interface other than AIB. For example, in some embodiments, the electrical interface 201 includes a High Bandwidth Memory (HBM) and Kandou Bus for serialization/deserialization of data.

In some embodiments, the TeraPHY chiplet 101 has a length d1 and a width d2, where d1 is about 8.9 millimeters (mm) and d2 is about 5.5 mm. It should be understood that the term "about," as used herein, means+/−10% of a given value. In some embodiments, the length d1 is less than about 8.9 mm. In some embodiments, the length d1 is greater than about 8.9 mm. In some embodiments, the width d2 is less than about 5.5 mm. In some embodiments, the width d2 is greater than about 5.5 mm. In some embodiments, the electrical interface 201 has a width d3 of about 1.3 mm. In some embodiments, the width d3 is less than about 1.3 mm. In some embodiments, the width d3 is greater than about 1.3 mm. In some embodiments, the photonic interface 203 for the optical fiber array has a length d4 of about 5.2 mm and a width d5 of about 2.3 mm. In some embodiments, the length d4 is less than about 5.2 mm. In some embodiments, the length d4 is greater than about 5.2 mm. In some embodiments, the optical macros 205-1 to 205-N have a width d6 of about 1.8 mm. In some embodiments, the width d6 is less than about 1.8 mm. In some embodiments, the width d6 is greater than about 1.8 mm. In some embodiments, each transmitter Tx and receiver Rx optical macro 205-1 to 205-N pair has a length d7 of about 0.75 mm. In some embodiments, the length d7 is less than about 0.75 mm. In some embodiments, the length d7 is greater than about 0.75 mm. In some embodiments, the transmitter Tx and receiver Rx optical macros 205-1 to 205-N are positioned to align with an optical fiber pitch within the photonic interface 203. In some embodiments, the length d7 of each optical macro 205-1 to 205-N (pair of transmitter (Tx) and receiver (Rx) optical macros) is matched to the pitch of the optical fibers in a standard optical fiber ribbon. For example, if the optical fiber pitch is 250 micrometers, and three of the optical fibers in the optical fiber ribbon correspond to one optical macro 205-1 to 205-N (one optical fiber brings continuous wave light to the transmitter (Tx) optical macro from a laser, one optical fiber carries modulated light from the transmitter (Tx) optical macro, and one optical fiber brings modulated light representing encoded data to the receiver (Rx) optical macro), then the optical macro length d7 is 750 micrometers.

In some embodiments, the number N of optical macros 205-1 to 205-N is 8. In some embodiments, the number N of optical macros 205-1 to 205-N is less than 8. In some embodiments, the number N of optical macros 205-1 to 205-N is greater than 8. Also, each of the optical macros 205-1 to 205-N represents at least one optical port. In some embodiments, a dual phase lock loop (PLL) circuit is shared by each transmitter Tx/receiver Rx pair within the optical macros 205-1 to 205-N. In some embodiments, the dual PLL includes a PLLU that covers a frequency range from 24 GigaHertz (GHz) to 32 GHz, and a PLLD that covers a frequency range from 15 GHz to 24 GHz.

The TeraPHY chiplet 101 also includes management circuits 301 and general purpose input/output (GPIO) components 303 for communicating electrical data signals to and from the TeraPHY chiplet 101. In various embodiments, the GPIO components 303 include Serial Peripheral Interface (SPI) components and/or another type of component to enable off-chip data communication. Also, in some embodiments, the TeraPHY chiplet 101 includes many other circuits, such as memory (e.g., SRAM), a CPU, analog circuits, and/or any other circuit that is implementable in CMOS. In some embodiments, the TeraPHY optical I/O chiplet 101 has a coarse wavelength division multiplexing 4-lane (CWDM4) configuration in which each of the optical macros 205-1 to 205-N includes four serializer/deserializer (SerDes) slices (FR-4) or eight SerDes slices (FR-8). In some embodiments, the optical macros 205-1 to 205-N are divided into wavelength transmit (Tx)/receive (Rx) slices, with each Tx/Rx slice including fully integrated analog Tx/Rx front-ends, serialization/deserialization, clock-data-recovery, and microring resonator thermal tuning digital control. In some embodiments, the photonic components integrated in each Tx/Rx slice/optical macro 205-$x$ optical port are based on microring resonators (such as modulators, filters, etc.). In some embodiments, the TeraPHY optical I/O chiplet 101 optically couples to the optical fiber of the fiber array through edge-coupled V-groove structures with embedded mode-converters.

Figure 4:
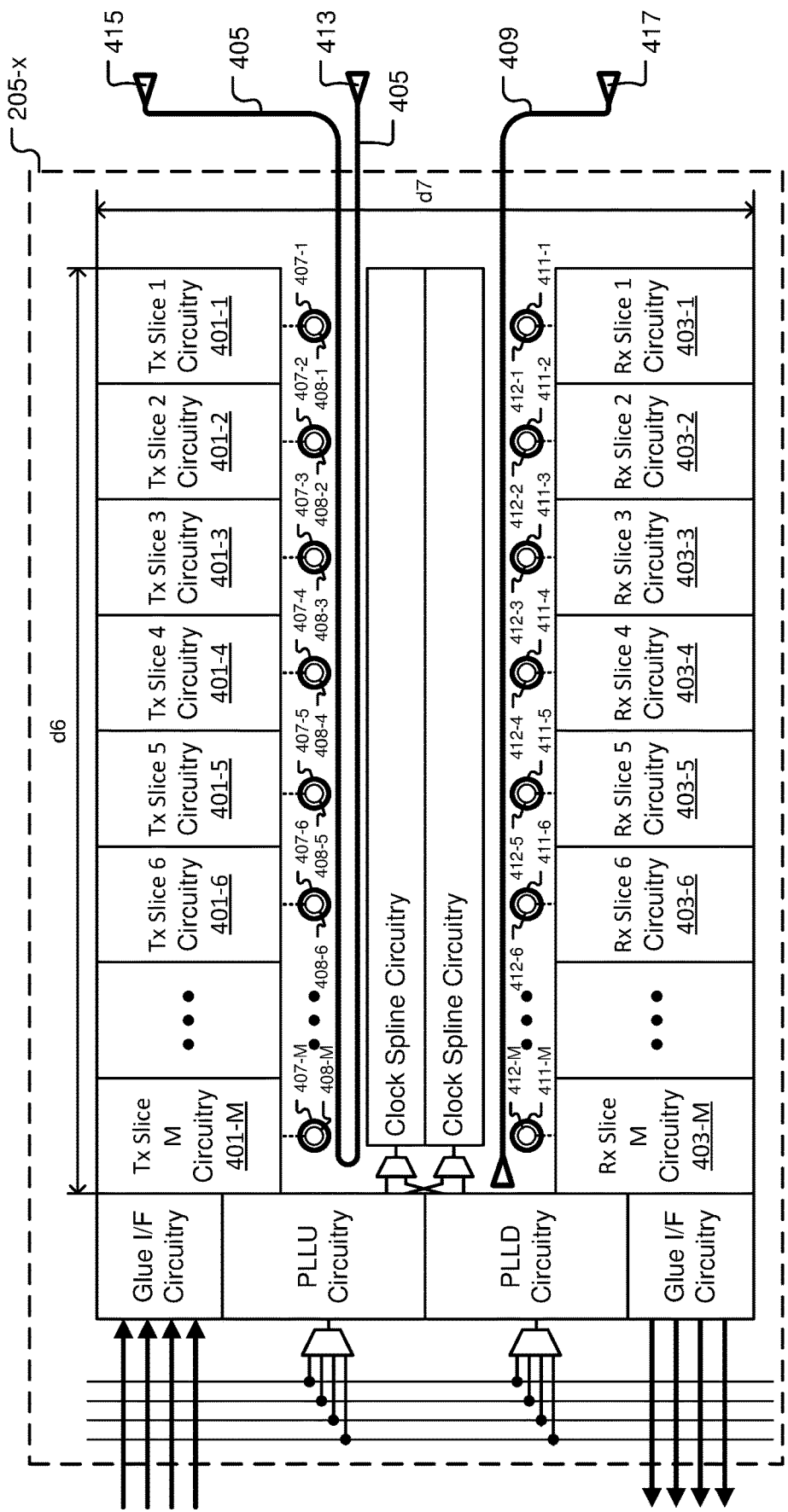
FIG. 4 shows an example layout of a given one of the optical macros, in accordance with some embodiments.

FIG. 4 shows an example layout of a given one of the optical macros 205-1 to 205-N, referred to as optical macro 205-$x$, in accordance with some embodiments. The optical macro 205-$x$ includes a number M of transmit (Tx) slices 401-1 to 401-M and a number M of receive (Rx) slices 403-1 to 403-M. An optical slice of the optical macro 205-$x$ refers to either a single one of the optical transmitter slices 401-1 to 401-M, or a single one of the optical receiver slices 403-1 to 403-M, or a combination of a single one of the optical transmitter slices 401-1 to 401-M and a corresponding single one of the optical receiver slices 403-1 to 403-M, where the single one of the optical transmitter slices 401-1 to 401-M and the single one of the optical receiver slices 403-1 to 403-M are controlled to operate on a single wavelength of light. The example layout of FIG. 4 shows the routing of an optical waveguide 405 and the placement of optical microring resonators 407-1 to 407-M within the transmit (Tx) portion of the optical macro 205-$x$. The microring resonators 407-1 to 407-M function as modulators. The example layout of FIG. 4 also shows the routing of an optical waveguide 409 and the placement of optical microring resonators 411-1 to 411-M within the receive (Rx) portion of the optical macro 205-$x$. The microring resonators 411-1 to 411-M function as photodetectors. In some embodiments, one or more of the microring resonators 407-1 to 407-M and 411-1 to 411-M are controlled to function as an optical multiplexer and/or as an optical demultiplexer.

Each corresponding pair of the transmit (Tx) slices 401-1 to 401-M and the receive (Rx) slices 403-1 to 403-M forms a Tx/Rx slice of the optical macro 205-x. For example, Tx Slice 1 401-1 and Rx Slice 1 403-1 together form a Slice 1 of the optical macro 205-x. The transmit (Tx) slices 401-1 to 401-M include electrical circuitry for directing translation of electrical data in the form of a bit stream into a stream of modulated light by operating the microring resonators 407-1 to 407-M to modulate the continuous wave laser light at a given wavelength incoming through the optical waveguide 405 from the optical grating coupler 413 into a stream of modulated light at the given wavelength, with the stream of modulated light at the given wavelength being transmitted from the optical macro 205-x through the optical waveguide 405 to the optical grating coupler 415. In some embodiments, each of the transmit (Tx) slices 401-1 to 401-M includes electrical circuitry for inphase signal generation and/or quadrature signal generation, injection locked oscillator circuitry, and phase interpolator circuitry. The receive (Rx) slices 403-1 to 403-M include electrical circuitry for detecting light of a given wavelength within a stream of modulated light incoming through the optical waveguide 409 from the optical grating coupler 417 by operating the microring resonators 411-1 to 411-M. The electrical circuitry within the receive (Rx) slices 403-1 to 403-M translate the light that is detected by the microring resonators 411-1 to 411-M at a corresponding wavelength into a bit stream in the electrical domain. In some embodiments, each of the receive (Rx) slices 403-1 to 403-M includes electrical circuitry for inphase signal generation and/or quadrature signal generation (I/Q signal generation), injection locked oscillator (ILO) circuitry, phase interpolator (PI) circuitry, transimpedance amplifier (TIA) circuitry, and signal equalization (EQ) circuitry. In some embodiments, the receive (Rx) slices 403-1 to 403-M utilize a respective dummy microring photodetector (PD) for better matching in the receiver analog front-end and for robustness to common-mode noise (e.g., supply).

The optical waveguide 405 routes continuous wave laser light from the optical grating coupler 413 to each of the microring resonators 407-1 to 407-M within the transmit (Tx) slices 401-1 to 401-M. The optical waveguide 405 also routes modulated light from the microring resonators 407-1 to 407-M within the transmit (Tx) slices 401-1 to 401-M to the optical grating coupler 415 for transmission out of the TeraPHY optical I/O chiplet 205-x. In some embodiments, each of the microring resonators 407-1 to 407-M within the transmit (Tx) slices 401-1 to 401-M is tunable to operate at a specified wavelength of light. Also, in some embodiments, the specified wavelength of light at which a given microring resonator 407-x is tuned to operate is different than the specified wavelengths at which the other microring resonators 407-1 to 407-M, excluding 407-x, are tuned to operate. In some embodiments, a corresponding heating device 408-1 to 408-M is positioned near each of the microring resonators 407-1 to 407-M to provide for thermal tuning of the resonant wavelength of the microring resonator. In some embodiments, a corresponding heating device 408-1 to 408-M is positioned within an inner region circumscribed by a given microring resonator 407-x to provide for thermal tuning of the resonant wavelength of the given microring resonator 407-x. In some embodiments, the heating device 408-1 to 408-M of each of the microring resonators 407-1 to 407-M is connected to corresponding electrical control circuitry within the corresponding transmit (Tx) slice that is operated to thermally tune the resonant wavelength of the microring resonator. In some embodiments, each of the microring resonators 407-1 to 407-M is connected to corresponding electrical tuning circuitry within the corresponding transmit (Tx) slice that is operated to electrically tune the resonant wavelength of the microring resonator. In various embodiments, each of the microring resonators 407-1 to 407-M operates as part of an optical modulator and/or optical multiplexer.

The optical waveguide 409 mutes incoming modulated light from the optical grating coupler 417 to the microring resonators 411-1 to 411-M within the receive (Rx) slices 403-1 to 403-M. In some embodiments, each of the microring resonators 411-1 to 411-M within the receive (Rx) slices 403-1 to 403-M is tunable to operate at a specified wavelength of light. Also, in some embodiments, the specified wavelength of light at which a given microring resonator 411-x is tuned to operate is different than the specified wavelengths at which the other microring resonators 411-1 to 411-M, excluding 411-x, are tuned to operate. In some embodiments, a corresponding heating device 412-1 to 412-M is positioned near each of the microring resonators 411-1 to 411-M to provide for thermal tuning of the resonant wavelength of the microring resonator. In some embodiments, a corresponding heating device 412-1 to 412-M is positioned within an inner region circumscribed by a given microring resonator 411-x to provide for thermal tuning of the resonant wavelength of the given microring resonator 411-x. In some embodiments, the heating device 412-1 to 412-M of each of the microring resonators 411-1 to 411-M is connected to corresponding electrical control circuitry within the corresponding receive (Rx) slice that is operated to thermally tune the resonant wavelength of the microring resonator. In some embodiments, each of the microring resonators 411-1 to 411-M is connected to corresponding electrical tuning circuitry within the corresponding receive (Rx) slice that is operated to electrically tune the resonant wavelength of the microring resonator. In various embodiments, each of the microring resonators 411-1 to 411-M operates as part of a photodetector and/or optical demultiplexer.

In some embodiments, the architecture and floorplan of the optical macro 205-x is variable by including a different number of PLLs at various positions within the optical macro 205-x. For example, in some embodiments, a centralized PLL is positioned within the clock spine and fans out to the slices at both sides of the optical macro 205-x. In various embodiments, the PLL is replicated as multiple PLL instances across the optical macro 205-x, with each PLL instance either dedicated to a given transmit (Tx)/receive (Rx) slice or shared with a subset of transmit (Tx)/receive (Rx) slices. In various embodiments, other floorplan configurations of the optical macro 205-x include multiple columns of optical macros with pass-through photonic rows, to increase the edge bandwidth density, and/or staggering of the transmit (Tx) and receive (Rx) optical macros side-by-side to increase the edge bandwidth density.

The optical macro 205-x includes both photonic and electronic components. The optical waveguides 405 and 409 are laid out in the optical macro 205-x so as to avoid optical waveguide crossings and so as to minimize optical waveguide length, which minimizes optical losses, and correspondingly improves the energy efficiency of the system. The optical macro 205-x is laid out in such a way as to minimize the distance between the electronic components and the optical components in order to minimize electrical trace length, which improves the energy efficiency of the optical macro 205-$x$, enables faster signal transmission, and reduces chip size.

The TeraPHY optical I/O chiplet 101 includes the set of (N) optical macros 205-1 to 205-N. Each optical macro 205-$x$ includes the set of (M) optical transmitter slices 401-1 to 401-M and optical receiver slices 403-1 to 403-M that are logically grouped together to transmit or receive bits on a number (W) of different optical wavelengths on the respective optical waveguide 405 and 409. In various embodiments, the number (M) of optical transmitter slices 401-1 to 401-M and optical receiver slices 403-1 to 403-M and the number (W) of different optical wavelengths can be defined as needed, considering that any number of optical transmitter slices 401-1 to 401-M and/or optical receiver slices 403-1 to 403-M is tunable to a given one of the number (W) of optical wavelengths. However, if data bits are being transmitted or received by multiple ones of the optical microring resonators 407-1 to 407-M, or by multiple ones of the optical microring resonators 411-1 to 411-M, tuned to the same optical wavelength, channel/wavelength contention is managed. The floorplan and organization of the optical macro 205-$x$ represent adjustable degrees of freedom for controlling the following metrics: length of optical waveguides 405 and 409 (which directly correlates with optical loss); optical macro 205-$x$ area (which correlates with manufacturing cost); energy consumed per bit (energy efficiency); electrical signaling integrity (which correlates with performance); electrical package escape (the amount of electrical data input and output that is physically available for a given set of chip dimensions and for a given spacing/pitch of electrical bumps); and optical package escape (the amount of optical data input and output that is physically available for a given set of chip dimensions and for a given spacing/pitch of optical fibers).

Figure 5A:
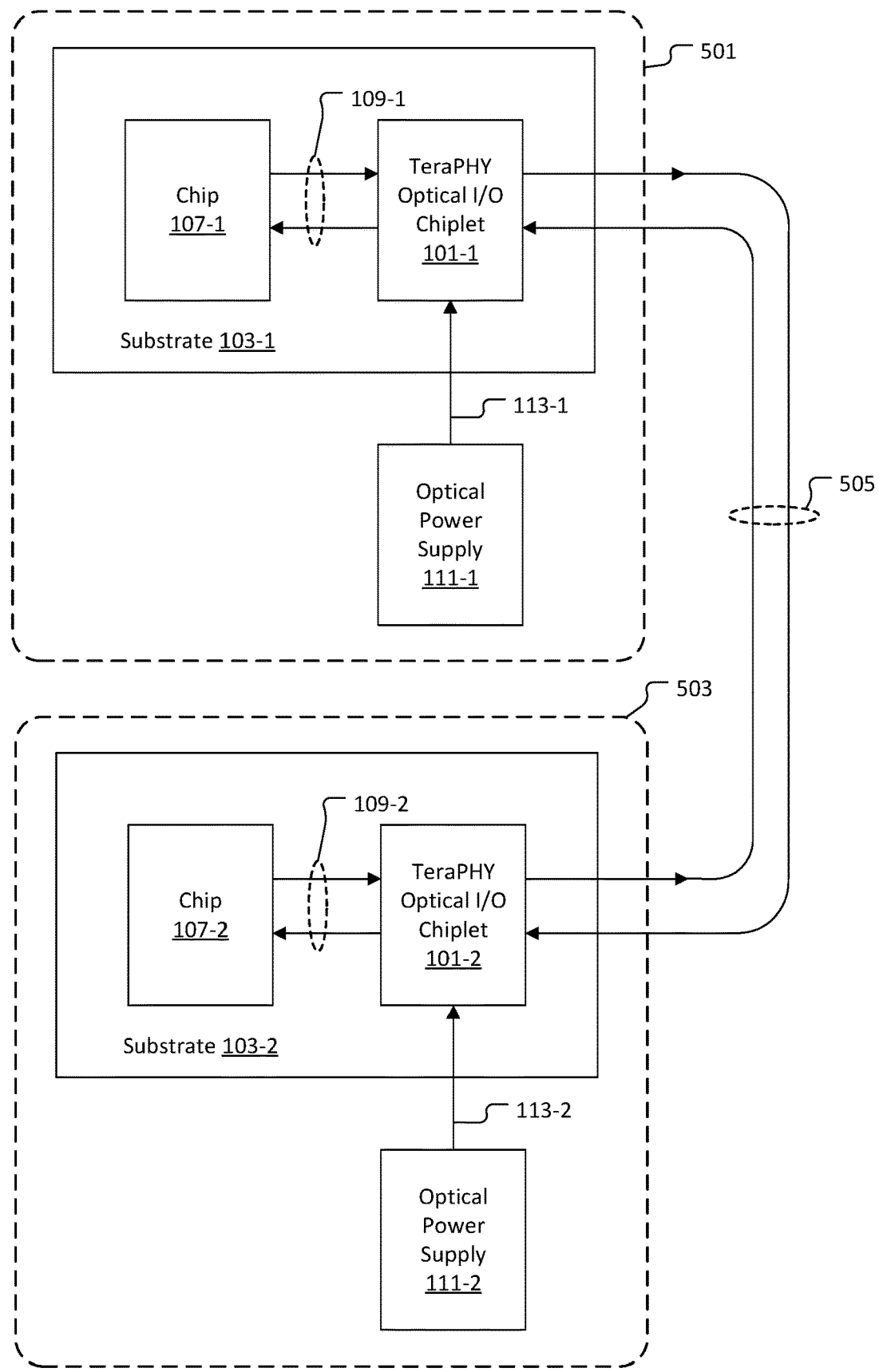
FIG. 5A shows a diagram of a first computer system optically connected to a second computer system through an optical link, in accordance with some embodiments.

FIG. 5A shows a diagram of a first computer system 501 optically connected to a second computer system 503 through an optical link 505, in accordance with some embodiments. In various embodiments, the first computer system 501 represents essentially any packaged set of semiconductor chips that includes at least one integrated circuit chip 107-1 electrically connected to at least one TeraPHY optical I/O chiplet 101-1, as indicated by electrical connections/routings 109-1. In some embodiments, the at least one integrated circuit chip 107-1 and the at least one TeraPHY optical I/O chiplet 101-1 are packaged on a common substrate 103-1. The at least one TeraPHY optical I/O chiplet 101-1 is connected to receive optical power from an optical power supply 111-1 through one or more optical waveguides 113-1. The at least one TeraPHY optical I/O chiplet 101-1 corresponds to the TeraPHY chiplet 101 discussed herein. The optical power supply 111-1 is that same as the optical power supply 111 described with regard to FIG. 1A.

In various embodiments, the second computer system 503 represents essentially any packaged set of semiconductor chips that includes at least one integrated circuit chip 107-2 electrically connected to at least one TeraPHY optical I/O chiplet 101-2, as indicated by electrical connections/routings 109-2. In some embodiments, the at least one integrated circuit chip 107-2 and the at least one TeraPHY optical I/O chiplet 101-2 are packaged on a common substrate 103-2. The at least one TeraPHY optical I/O chiplet 101-2 is connected to receive optical power from an optical power supply 111-2 through one or more optical waveguides 113-2. The at least one TeraPHY optical I/O chiplet 101-2 corresponds to the TeraPHY chiplet 101 discussed herein. The optical power supply 111-2 is that same as the optical power supply 111 described with regard to FIG. 1A. Also, in some embodiments, the optical power supplies 111-1 and 111-2 are the same optical power supply. The TeraPHY optical I/O chiplet 101-1 of the first computer system 501 is optically connected to the TeraPHY optical I/O chiplet 101-2 of the second computer system 503 through the optical link 505. In some embodiments, the optical link 505 is an optical fiber array.

Figure 5B:
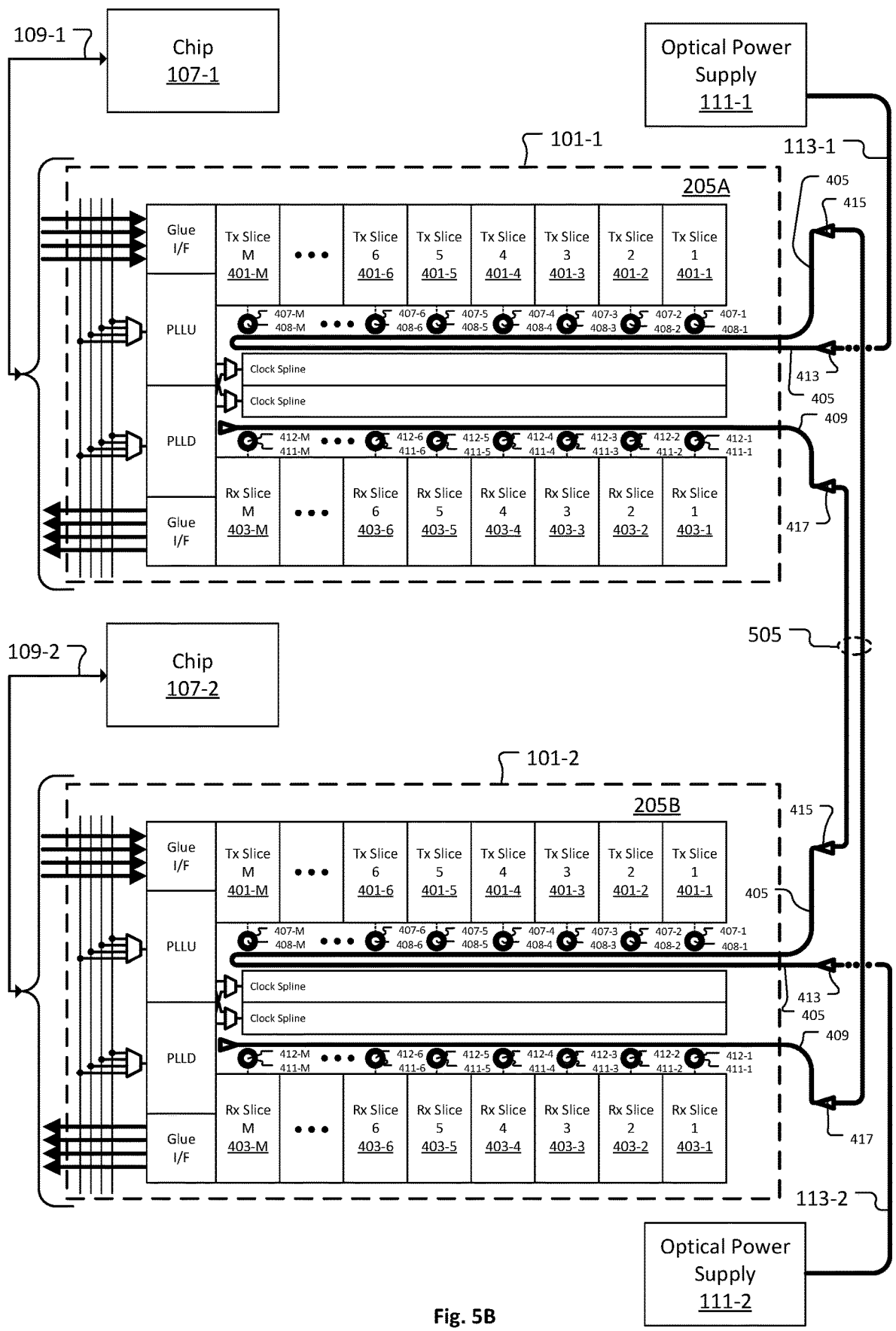
FIG. 5B shows a more detailed view of the optical connections between the TeraPHY optical I/O chiplet of the first computer system and the TeraPHY optical I/O chiplet of the second computer system, in accordance with some embodiments.

FIG. 5B shows a more detailed view of the optical connections between the TeraPHY optical I/O chiplet 101-1 of the first computer system 501 and the TeraPHY optical I/O chiplet 101-2 of the second computer system 503, in accordance with some embodiments. In some embodiments, each of the TeraPHY optical I/O chiplets 101-1 and 101-2 is configured in the same manner as TeraPHY optical I/O chiplet 101 described herein. The TeraPHY optical I/O chiplet 101-1 includes at least one optical macro 205A. The TeraPHY optical I/O chiplet 101-2 includes at least one optical macro 205B. Each of the optical macros 205A and 205B is configured in the same manner as the optical macro 205-$x$ described herein.

The optical grating coupler 413 of the optical macro 205A is optically connected to the optical power supply 111-1 through one or more optical waveguides 113-1, e.g., optical fibers. The optical grating coupler 415 of the optical macro 205A is optically connected to the optical grating coupler 417 of the optical macro 205B. In this manner, modulated optical signals generated by the transmitter slices 401-1 through 401-M of the optical macro 205A are transmitted to the receiver slices 403-1 through 403-M of the optical macro 205B. In some embodiments, the modulated optical signals generated by the transmitter slices 401-1 through 401-M convey data received by the optical macro 205A from the integrated circuit chip 107-1 in the form of electrical signals. The modulated optical signals that convey the data are optically coupled into the optical microring resonators 411-1 through 411-M of the optical macro 205B and are de-modulated by the receiver slices 403-1 through 403-M of the optical macro 205B into electrical signals that are transmitted to the integrated circuit chip 107-2 through the electrical connections/routings 109-2.

The optical grating coupler 413 of the optical macro 205B is optically connected to the optical power supply 111-2 through one or more optical waveguides 113-2, e.g., optical fibers. The optical grating coupler 415 of the optical macro 205B is optically connected to the optical grating coupler 417 of the optical macro 205A. In this manner, modulated optical signals generated by the transmitter slices 401-1 through 401-M of the optical macro 205B are transmitted to the receiver slices 403-1 through 403-M of the optical macro 205A. In some embodiments, the modulated optical signals generated by the transmitter slices 401-1 through 401-M of the optical macro 205B convey data provided by the integrated circuit chip 107-2 through the electrical connections/routings 109-2 to the optical macro 205B. The modulated optical signals that convey the data provided by the integrated circuit chip 107-2 are optically coupled into the optical microring resonators 411-1 through 411-M of the optical macro 205A and are de-modulated by the receiver slices 403-1 through 403-M of the optical macro 205A into electrical signals that are transmitted to chip 107-1 through the electrical connections/routings 109-1.

The TeraPHY optical I/O chiplet 101 has a small footprint because the intellectual property (IP) building blocks on the chiplet are dense. These IP building blocks include the optical microring resonators, which are used for multiplexing and demultiplexing multiple wavelengths of light onto optical waveguides, as well as modulating light and functioning as photodetectors, in a very small chip area (for example 10 micrometer diameter per microring resonator). The IP building blocks on the chip are also dense because the electrical circuitry that controls the optical devices is closely integrated on the same chip with the optical devices that they control, making it possible to optimize space efficiency.

Figure 6A:
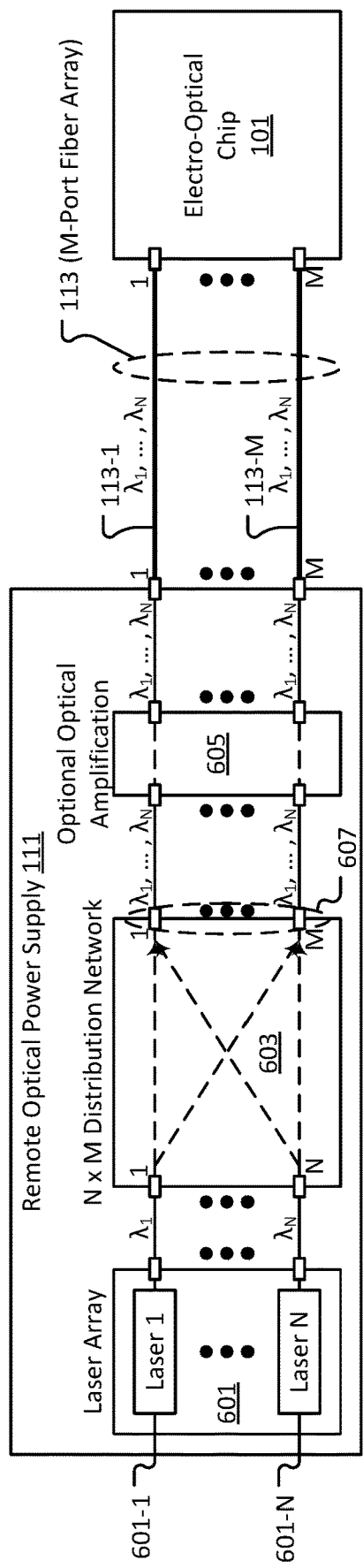
FIG. 6A shows an example implementation of the remote optical power supply for an optical data communication system, in accordance with some embodiments.
Figure 6B:
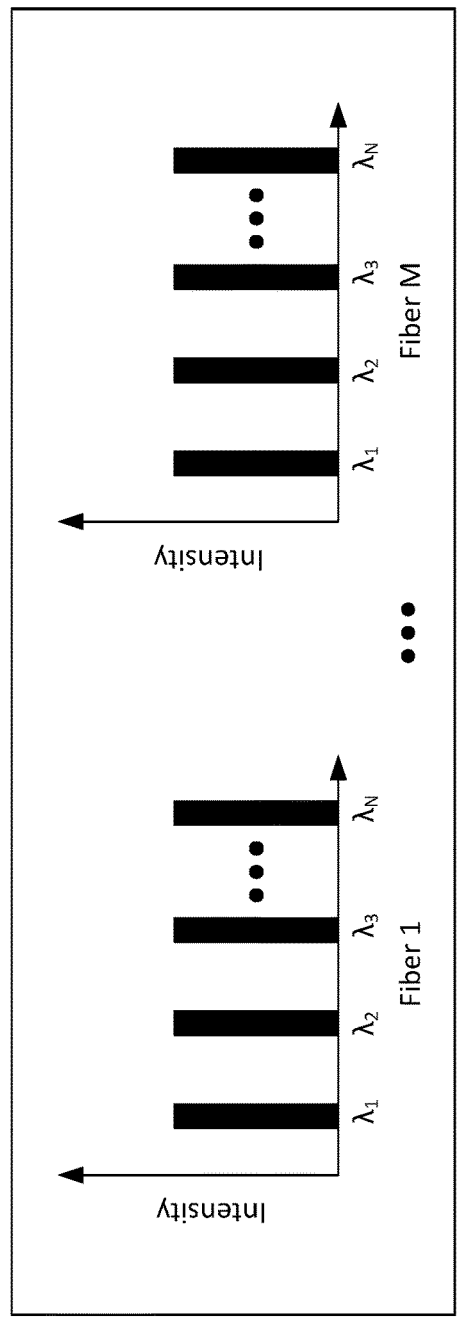
FIG. 6B shows a diagram indicating how each of the optical fibers of the fiber array receives each of the multiple wavelengths $\lambda 1$ to $\lambda N$ of continuous wave laser light at a substantially equal intensity (power) from the remote optical power supply, in accordance with some embodiments.

FIG. 6A shows an example implementation of the remote optical power supply 111 for an optical data communication system, in accordance with some embodiments. The remote optical power supply 111 includes a laser array 601, an optical distribution network 603, and an optional optical amplification module 605. The laser array 601 includes a number (N) of lasers 601-1 to 601-N, where N is greater than one. Each laser 601-1 to 601-N is configured to generate and output continuous wave laser light of a different wavelength λ1 to λN, respectively. The optical distribution network 603 routes the laser light at each of the N wavelengths, as generated by the multiple laser elements 601-1 through 601-N, to each of a number (M) of optical output ports 607 of the optical distribution network 603. In some embodiments, the optional optical amplification module 605 is not present and the multiple wavelengths λ1 to λN of laser light that are directed to a given one of the (M) optical output ports 607 of the optical distribution network 603 are transmitted directly into a corresponding one of the optical fibers 113-1 to 113-M of the M-port fiber array 113. In some embodiments, the optional optical amplification module 605 is present and the multiple wavelengths λ1 to λN of laser light that are directed to a given one of the (M) optical output ports 607 of the optical distribution network 603 are transmitted through the optical amplification module 605 for amplification in route to a corresponding one of the optical fibers 113-1 to 113-M of the M-port fiber array 113. In this manner, the remote optical power supply 111 operates to provide multiple wavelengths λ1 to λN of continuous wave laser light on each of the multiple optical fibers 113-1 to 113-M of the fiber array 113. Each of the optical fibers 113-1 to 113-M of the fiber array 113 can be connected to route the multiple wavelengths λ1 to λN of continuous wave laser light that it receives from the remote optical power supply 111 to a corresponding optical port on the electro-optical chip 101, such as to the laser light input optical ports 413 corresponding to the transmit macros on the electro-optical chip 101 as described with regard to FIG. 4. FIG. 6B shows a diagram indicating how each of the optical fibers 113-1 to 113-M of the fiber array 113 receives each of the multiple wavelengths λ1 to λN of continuous wave laser light at a substantially equal intensity (power) from the remote optical power supply 111, in accordance with some embodiments.

Figure 6C:
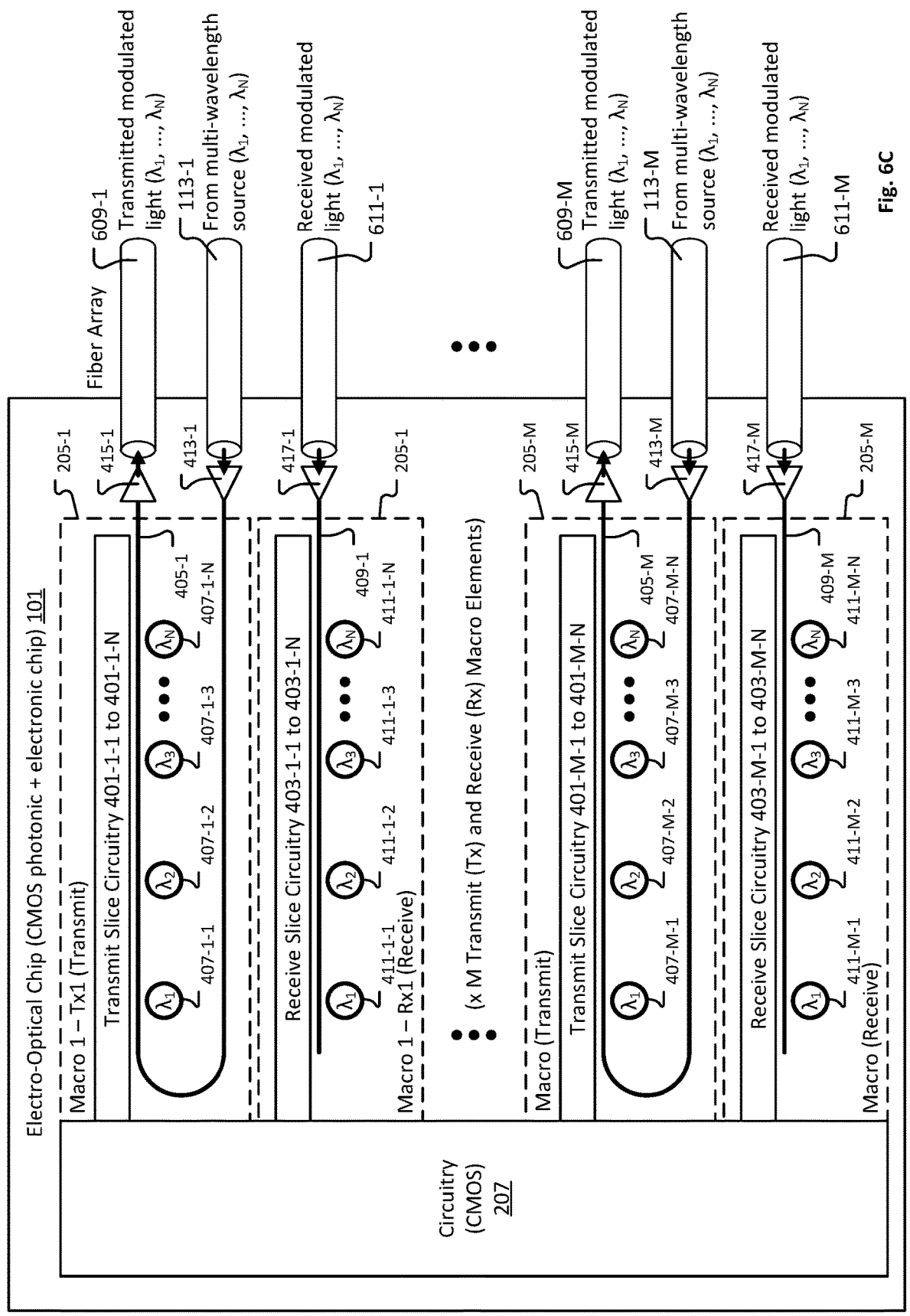
FIG. 6C shows an example diagram of the electro-optical chip connected to the fiber array that includes optical fibers, in accordance with some embodiments.

FIG. 6C shows an example diagram of the electro-optical chip 101 connected to the fiber array 113 that includes optical fibers 113-1 to 113-M, in accordance with some embodiments. The electro-optical chip 101 includes the number (M) of transmit/receive macros 205-1 to 205-M. Each transmit/receive macro 205-1 to 205-M includes a transmit macro having the microring resonators 407-$x$-1 to 407-$x$-M and corresponding transmit slice circuitry 401-$x$-1 to 401-$x$-N, where x identifies the particular one of the M transmit/receive macros 205-1 to 205-M. Each transmit/receive macro 205-1 to 205-M also includes a receive macro having the microring resonators 411-$x$-1 to 411-$x$-M and corresponding receive slice circuitry 403-$x$-1 to 403-$x$-N, where x identifies the particular one of the M transmit/receive macros 205-1 to 205-M. Each transmit/receive macro 205-1 to 205-M includes an optical input port 413-1 to 413-M, respectively, that is connected to a corresponding one of the optical fibers 113-1 to 113-M, respectively, to receive the multi-wavelength continuous wave laser light from the remote optical power supply 111. In some embodiments, the number (M) of optical fibers 113-1 to 113-M required from the remote optical power supply 111 equals the number of transmit/receive macros 205-1 to 205-M of the electro-optical chip 101.

The optical input ports 413-1 to 413-M are connected to optical waveguides 405-1 to 405-M, respectively. Each of the optical waveguides 405-1 to 405-M extends past the number (N) of microring resonators 407-$x$-1 to 407-$x$-N, where x identifies the particular one of the M transmit/receive macros 205-1 to 205-M, so as to enable evanescent coupling of light between the optical waveguides 405-1 to 405-M and the corresponding set of microring resonators 407-$x$-1 to 407-$x$-N. Each of the microring resonators 407-$x$-1 to 407-$x$-N is operated as an optical ring modulator tuned to a corresponding one of the N wavelengths λ1 to λN of the incoming continuous wave laser light. Each of the microring resonators 407-$x$-1 to 407-$x$-N is controlled by the corresponding transmit slice circuitry 401-$x$-1 to 401-$x$-N to function as an optical ring modulator to modulate the incoming continuous wave laser light of a particular wavelength λy (where y is in the set of 1 to N) on the corresponding optical waveguide 405-1 to 405-M in accordance with electrical signals that represent digital data, so as to generate modulated light of the corresponding wavelength λy that has a modulation pattern that conveys the digital data represented by the electrical signals. After extending past each of the microring resonators 407-$x$-1 to 407-$x$-N, each of the optical waveguides 405-1 to 405-M extends to a respective optical output port 415-1 to 415-M. The modulated light is transmitted from the optical output ports 415-1 to 415-M into respective optical fibers 609-1 to 609-M that carry the modulated light to a destination somewhere within the optical data communication system.

Each receive macro of the transmit/receive macros 205-1 to 205-M includes an optical input port 417-1 to 417-M, respectively, that is connected to a corresponding one of optical fibers 611-1 to 611-M, respectively, to receive modulated light of various wavelengths from other devices within the optical data communication system. The optical input ports 417-1 to 417-M are connected to optical waveguides 409-1 to 409-M, respectively. Each of the optical waveguides 409-1 to 409-M extends past the number (N) of microring resonators 411-$x$-1 to 411-$x$-N, where x identifies the particular one of the M transmit/receive macros 205-1 to 205-M, so as to enable evanescent coupling of light between the optical waveguides 409-1 to 409-M and the corresponding set of microring resonators 411-$x$-1 to 411-$x$-N. Each of the microring resonators 411-$x$-1 to 411-$x$-N is operated as an optical ring detector (photodetector) tuned to a corresponding one of the N wavelengths λ1 to λN of the incoming modulated light. Each of the microring resonators 411-$x$-1 to 411-$x$-N is controlled by the corresponding receive slice circuitry 403-$x$-1 to 403-$x$-N to function as an optical ring detector (photodetector) to detect the incoming modulated light of a particular wavelength λy (where y is in the set of 1 to N) on the corresponding optical waveguide 409-1 to 409-M. The microring resonators 411-$x$-1 to 411-$x$-N in conjunction with the corresponding receive slice circuitry 403-$x$-1 to 403-$x$-N functions to convert the incoming modulated light signals into corresponding electrical signals in accordance with the modulation pattern of the incoming light. The resulting electrical signals are processed by receive slice circuitry 403-*x*-1 to 403-*x*-N to recreate the digital data upon which the incoming modulated light was modulated.

WDM optical data communication systems and associated methods are disclosed herein that include a modified version of the remote optical power supply 111, where the laser light generation, e.g., laser array 601, and optical distribution network, e.g., 603, is replaced and/or simplified by implementing a comb laser generator that is integrated either on the modified version of the remote optical power supply 111 or on the electro-optical chip 101 that is optically connected to the modified version of the remote optical power supply 111. Replacing the laser array 601 and optical distribution network 603 significantly drives down the cost and complexity of the remote optical power supply 111, greatly improves remote laser source yield, improves optical source efficiency, and enables essentially any laser supplier to provide an optical source for WDM optical systems. In various embodiments, the comb laser generator is either active or passive.

In various embodiments disclosed herein, one or more comb generator(s) is/are implemented onboard a remote optical power supply, where the remote optical power supply is optically connected to supply laser light of multiple wavelengths ($\lambda 1$ to $\lambda N$) to the electro-optical chip 101. In various embodiments disclosed herein, one or more comb generator(s) is/are implemented onboard the electro-optical chip 101 to generate multiple wavelengths ($\lambda 1$ to $\lambda N$) of light onboard the electro-optical chip 101 from a single wavelength of light ($\lambda i$) that is supplied from either a remote optical power supply or from an optical power supply onboard the electro-optical chip 101. Each of the comb generators referred to herein can be either a passive type of comb generator or an active type of comb generator. In various embodiments, the comb generators referred to herein are implemented using microring resonators, and optionally using optical filters, to produce a target comb spectra for achieving optimal performance of the electro-optical chip 101.

In various embodiments, active type comb generators are configured to perform various types of active comb generation, such as single-pass, or resonant electro-optic modulation with optical microring resonators, or resonant electro-optic modulation with lumped element modulators. Examples of active type comb generators are described in: "Phase-Noise Characteristics of a 25-GHz-Spaced Optical Frequency Comb Based on a Phase—and Intensity-Modulated Laser," by Atsushi Ishizawa et al., Optics Express, Vol. 21, No. 24, Dec. 2, 2013, which is incorporated herein by reference in its entirety for all purposes. Examples of active type comb generators are also described in: "Broadband Electro-Optic Frequency Comb Generation in a Lithium Niobate Microring Resonator," by Mian Zhang et al., Nature, Vol. 568, pp. 373-377, Apr. 18, 2019, which is incorporated herein by reference in its entirety for all purposes. Examples of active type comb generators are also described in: "Frequency Comb Generation in a Silicon Ring Resonator Modulator," by Iosif Demirtzioglou et al., Optics Express, Vol. 26, No. 2, Jan. 22, 2018, which is incorporated herein by reference in its entirety for all purposes. Examples of active type comb generators are also described in: "Generation of Wideband Frequency Combs by Continuous-Wave Seeding of Multistage Mixers with Synthesized Dispersion" by Evgeny Myslivets et al., Optics Express, Vol. 20, No. 3, Jan. 30, 2012, which is incorporated herein by reference in its entirety for all purposes. It should be understood that any of the comb generators mentioned herein can be an active type comb generator as described in the above-mentioned references or any other active type of comb generator implementable in an integrated photonics device.

In various embodiments, passive type comb generators are configured to perform various types of passive comb generation, such as with Kerr non-linear waveguides, fibers, or resonators. Examples of passive type comb generators are described in: "Generation of Wideband Frequency Combs by Continuous-Wave Seeding of Multistage Mixers with Synthesized Dispersion" by Evgeny Myslivets et al., Optics Express, Vol. 20, No. 3, Jan. 30, 2012, which is incorporated herein by reference in its entirety for all purposes. Examples of passive type comb generators are also described in: "CMOS-Compatible Multiple-Wavelength Oscillator for On-Chip Optical Interconnects," by Jacob S. Levy et al., Nature Photonics, Vol. 4, pp. 37-40, January 2010, which is incorporated herein by reference in its entirety for all purposes. Examples of passive type comb generators are also described in: "Microresonator-Based Solitons for Massively Parallel Coherent Optical Communications," by Pablo Marin-Palomo, Nature, Vol. 546, pp. 274-279, Jun. 8, 2017, which is incorporated herein by reference in its entirety for all purposes. It should be understood that any of the comb generators mentioned herein can be a passive type comb generator as described in the above-mentioned references or any other passive type of comb generator implementable in an integrated photonics device.

In various embodiments, the comb generators referenced herein can include lasers that are specially designed for performance on the electro-optical chip. These lasers may be implemented by applying a modulated current to the laser gain medium or by using a mode-locked laser. Examples of comb generators that include lasers are described in: "Generation of Coherent Multicarrier Signals by Gain Switching of Discrete Mode Lasers," by P. M. Anandarajah et al., IEEE Photonics Journal, Vol. 3, No. 1, pp. 112-122, February 2011, which is incorporated herein by reference in its entirety for all purposes. Examples of comb generators that include lasers are described in: "Single-Laser 32.5 Tbit/s Nyquist WDM Transmission," by David Hillerkuss et al., Journal of Optical Communications and Networking, Vol. 4, No. 10, pp. 715-723, October 2012, which is incorporated herein by reference in its entirety for all purposes. It should be understood that any of the comb generators mentioned herein can be a laser-implementing comb generator as described in the above-mentioned references or any other laser-implementing comb generator implementable in an integrated photonics device.

Figure 7A:
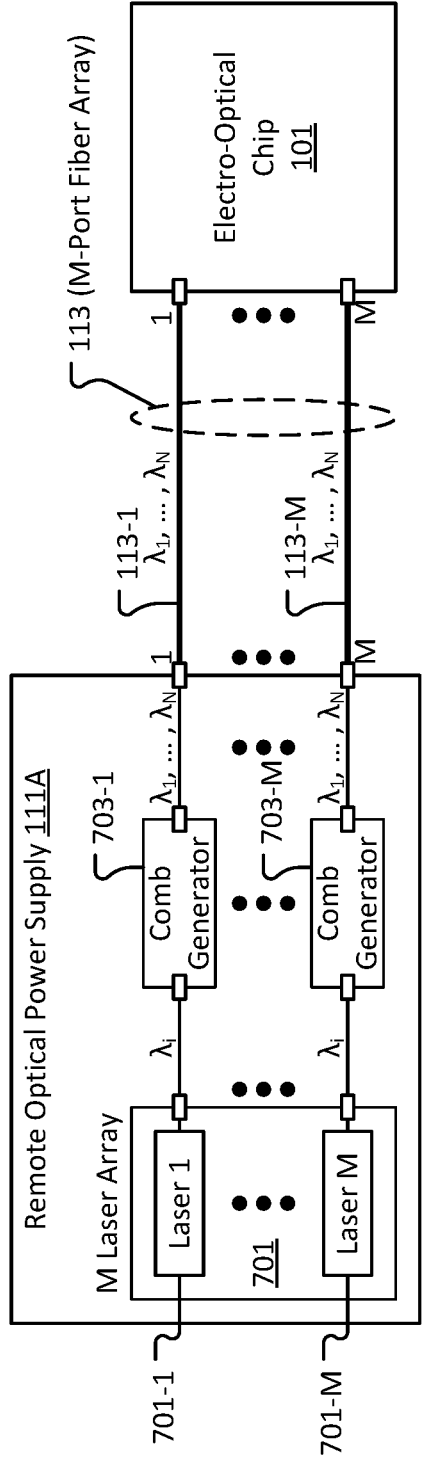
FIG. 7A shows a multi-wavelength remote optical power supply, in accordance with some embodiments.

FIG. 7A shows a multi-wavelength remote optical power supply 111A, in accordance with some embodiments. The remote optical power supply 111A includes a laser array 701 having a number (M) of lasers 701-1 to 701-M that are each configured to generate continuous wave laser light of the same wavelength ($\lambda i$). The laser light output of each of the lasers 701-1 to 701-M is optically connected to an optical input of a corresponding one of a number (M) of comb generators 703-1 to 703-M. In this manner, a given one of the lasers 701-1 to 701-M is optically connected to a given one of the comb generators 703-1 to 703-M. Each of the comb generators 703-1 to 703-M is configured to generate and output a number (N) of wavelengths ($\lambda 1, \ldots, \lambda N$) of laser light from the single wavelength ($\lambda i$) of laser light that the comb generator receives as input light from the corresponding one of the lasers 701-1 to 701-M. In the example embodiment of FIG. 7A, each of the comb generators 703-1 through 703-M has an optical output that is optically connected to a corresponding one of a number (M) of optical outputs of the remote optical power supply 111A. Each of the M output outputs of the remote optical power supply 111A is connected to a corresponding one of the number M of optical fibers 113-1 to 113-M. Each of the number M of optical fibers 113-1 to 113-M is optically connected to a corresponding optical input of the electro-optical chip 101, such as to the corresponding optical grating coupler 413-1 to 413-M as shown in FIG. 6C.

FIG. 7A shows a portion of an optical data communication system that includes the optical power supply 111A and the electro-optical chip 101, where the electro-optical chip 101 is physically separate from the optical power supply 111A. The optical power supply 111A is configured to output the multiple wavelengths ($\lambda 1, \ldots, \lambda N$) of continuous wave light. The electro-optical chip 101 is optically connected to the optical power supply 111A to receive the multiple wavelengths ($\lambda 1, \ldots, \lambda N$) of continuous wave light from the optical power supply 111A. The electro-optical chip 101 includes at least one transmit macro 205-1 to 205-M that receives the multiple wavelengths ($\lambda 1, \ldots, \lambda N$) of continuous wave light and that modulates one or more of the multiple wavelengths ($\lambda 1, \ldots, \lambda N$) of continuous wave light to generate modulated light signals that convey digital data.

Figure 7B:
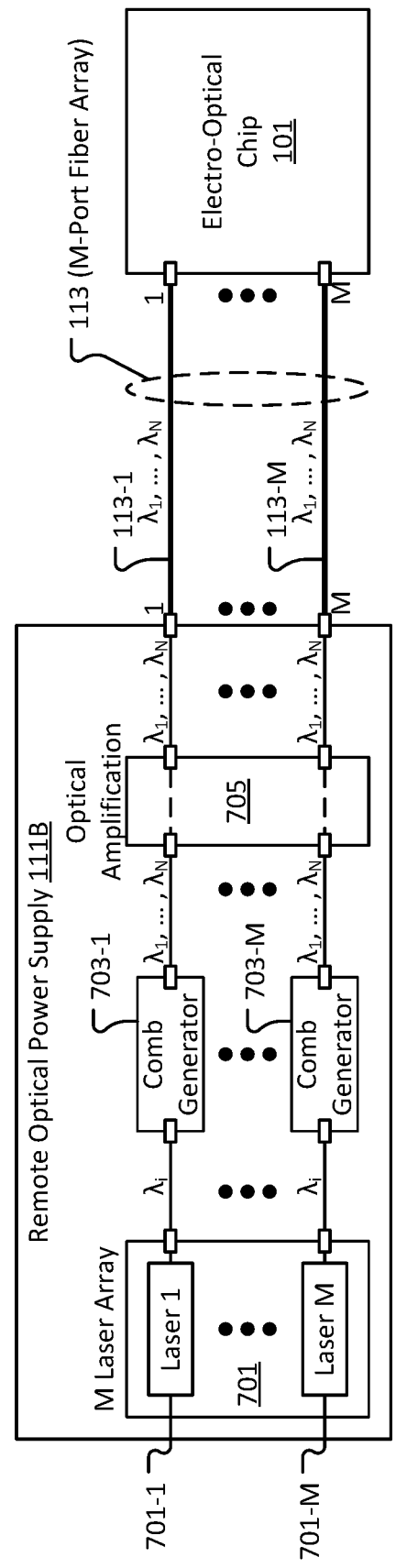
FIG. 7B shows a multi-wavelength remote optical power supply that is a variation of the multi-wavelength remote optical power supply of FIG. 7A, in accordance with some embodiments.

FIG. 7B shows a multi-wavelength remote optical power supply 111B that is a variation of the multi-wavelength remote optical power supply 111A of FIG. 7A, in accordance with some embodiments. In the remote optical power supply 111B, the optical outputs of the comb generators 703-1 to 703-M are optically connected to corresponding optical inputs of an optical amplification device 705. The optical amplification device 705 has a number M of optical outputs respectively corresponding to the number M of optical inputs of the optical amplification device 705. Each of the M optical outputs of the optical amplification device 705 is connected to a corresponding one of the number M of optical fibers 113-1 to 113-M, which is in turn optically connected to the electro-optical chip 101. The optical amplification device 705 amplifies the optical signals received from each of the comb generators 703-1 to 703-M, such that amplified versions of the light received at a given optical input of the optical amplifying device 705 are transmitted through the corresponding optical output of the optical amplification device 705. In this manner, the light output from a given one of the optical outputs of the optical amplification device 705 is an amplified version of the light output by a corresponding one of the number M of comb generators 703-1 to 703-M. The optical amplification device 705 operates to offset optical power losses in the optical data communication system that includes the remote optical power supply 111B, the fiber array 113, and the electro-optical chip 101.

FIG. 7B shows a portion of an optical data communication system that includes the optical power supply 111B and the electro-optical chip 101, where the electro-optical chip 101 is physically separate from the optical power supply 111B. The optical power supply 111B is configured to output the multiple wavelengths ($\lambda 1, \ldots, \lambda N$) of continuous wave light. The electro-optical chip 101 is optically connected to the optical power supply 111B to receive the multiple wavelengths ($\lambda 1, \ldots, \lambda N$) of continuous wave light from the optical power supply 111B. The electro-optical chip 101 includes at least one transmit macro 205-1 to 205-M that receives the multiple wavelengths ($\lambda 1, \ldots, \lambda N$) of continuous wave light and that modulates one or more of the multiple wavelengths ($\lambda 1, \ldots, \lambda N$) of continuous wave light to generate modulated light signals that convey digital data.

Figure 7C:
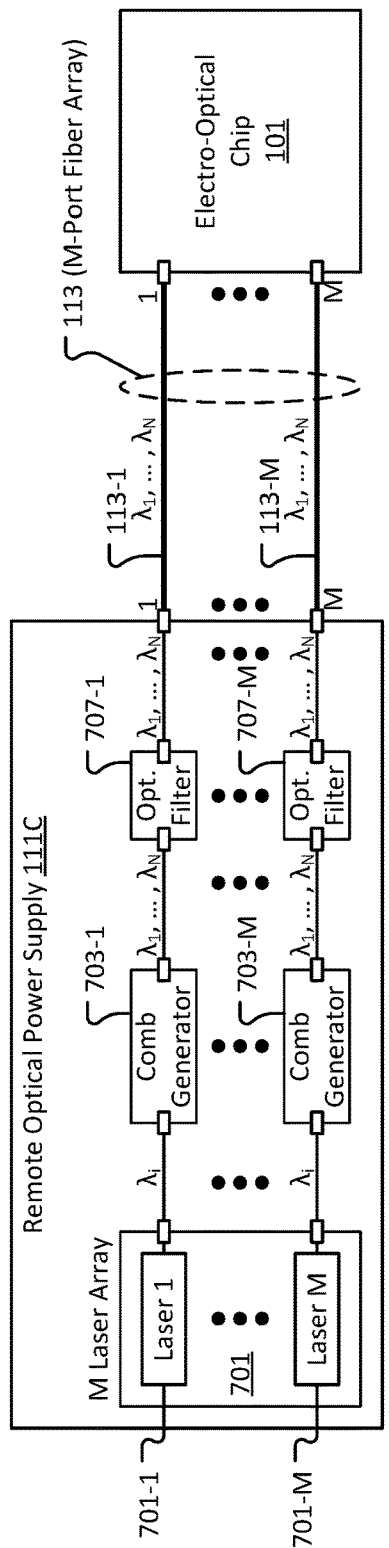
FIG. 7C shows a multi-wavelength remote optical power supply that is a variation of the multi-wavelength remote optical power supply of FIG. 7A, in accordance with some embodiments.

FIG. 7C shows a multi-wavelength remote optical power supply 111C that is a variation of the multi-wavelength remote optical power supply 111A of FIG. 7A, in accordance with some embodiments. In the remote optical power supply 111B, the optical output of each of the number M of comb generators 703-1 to 703-M is optically connected to an optical input of a corresponding one of a number M of optical filter devices 707-1 to 707-M. Each of the optical filter devices 707-1 through 707-M has an optical output optically connected to a corresponding one of the optical fibers 107-1 through 107-M, which is in turn optically connected to the electro-optical chip 101. The optical filter devices 707-1 through 707-M operate to remove imperfections in the comb generation process performed by the comb generators 703-1 through 703-M.

FIG. 7C shows a portion of an optical data communication system that includes the optical power supply 111C and the electro-optical chip 101, where the electro-optical chip 101 is physically separate from the optical power supply 111C. The optical power supply 111C is configured to output the multiple wavelengths ($\lambda 1, \ldots, \lambda N$) of continuous wave light. The electro-optical chip 101 is optically connected to the optical power supply 111C to receive the multiple wavelengths ($\lambda 1, \ldots, \lambda N$) of continuous wave light from the optical power supply 111C. The electro-optical chip 101 includes at least one transmit macro 205-1 to 205-M that receives the multiple wavelengths ($\lambda 1, \ldots, \lambda N$) of continuous wave light and that modulates one or more of the multiple wavelengths ($\lambda 1, \ldots, \lambda N$) of continuous wave light to generate modulated light signals that convey digital data.

Figure 7D:
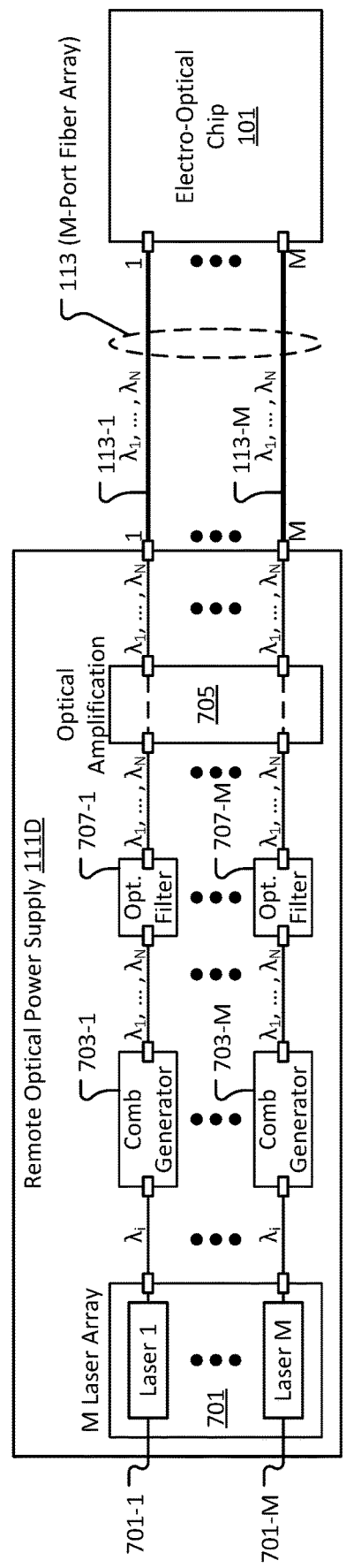
FIG. 7D shows a multi-wavelength remote optical power supply that is a variation of the multi-wavelength remote optical power supply of FIG. 7A, in accordance with some embodiments.

FIG. 7D shows a multi-wavelength remote optical power supply 111D that is a variation of the multi-wavelength remote optical power supply 111A of FIG. 7A, in accordance with some embodiments. In the remote optical power supply 111D, the optical output of each of the number M of comb generators 703-1 to 703-M is optically connected to an optical input of a corresponding one of the number M of optical filter devices 707-1 to 707-M. Each of the optical filter devices 707-1 through 707-M has an optical output optically connected to a corresponding optical input of the optical amplification device 705. Each of the M output outputs of the optical amplification device 705 is connected to a corresponding one of the number M of optical fibers 113-1 to 113-M, which is in turn optically connected to the electro-optical chip 101. The optical filter devices 707-1 through 707-M operate to remove imperfections in the comb generation process performed by the comb generators 703-1 through 703-M. The optical filter devices 707-1 through 707-M operate to remove imperfections in the comb generation process performed by the comb generators 703-1 through 703-M. The optical amplification device 705 amplifies the optical signals received from each of the optical filter devices 707-1 to 707-M, such that amplified versions of the light received at a given optical input of the optical amplifying device 705 are transmitted through the corresponding optical output of the optical amplification device 705. In this manner, the light output from a given one of the optical outputs of the optical amplification device 705 is a filtered and amplified version of the light output by a corresponding one of the number M of comb generators 703-1 to 703-M.

FIG. 7D shows a portion of an optical data communication system that includes the optical power supply 111D and the electro-optical chip 101, where the electro-optical chip 101 is physically separate from the optical power supply 111D. The optical power supply 111D is configured to output the multiple wavelengths ($\lambda 1, \ldots, \lambda N$) of continuous wave light. The electro-optical chip 101 is optically connected to the optical power supply 111D to receive the multiple wavelengths (λ1, . . . , λN) of continuous wave light from the optical power supply 111D. The electro-optical chip 101 includes at least one transmit macro 205-1 to 205-M that receives the multiple wavelengths (λ1, . . . , λN) of continuous wave light and that modulates one or more of the multiple wavelengths (λ1, . . . , λN) of continuous wave light to generate modulated light signals that convey digital data.

Figure 8:
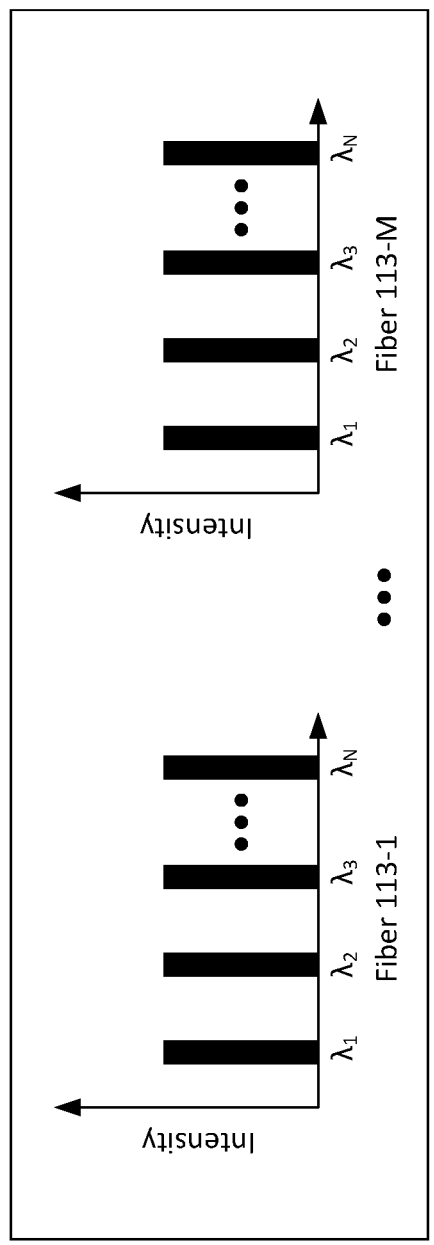
FIG. 8 shows a diagram indicating how each of the optical fibers receives each of the multiple wavelengths $(\lambda 1, \ldots, \lambda N)$ of continuous wave laser from each of the remote optical power supplies, in accordance with some embodiments.

FIG. 8 shows a diagram indicating how each of the optical fibers 113-1 to 113-M receives each of the multiple wavelengths (λ1, . . . , λN) of continuous wave laser from each of the remote optical power supplies 111A-111D, in accordance with some embodiments. Each of the remote optical power supplies 111A-111D operates to supply continuous wave light at a substantially equal intensity (power) at each of the multiple wavelengths (λ1, . . . , λN) to each of the optical fibers 113-1 to 113-M and in turn to the electro-optical chip 101.

It should be understood that the remote (external to the electro-optical chip 101) multi-wavelength optical power supplies 111A-111D use comb generators 703-1 to 703-M instead of the optical distribution network 603 as used in the remote optical power supply 101 of FIG. 6A. In the remote multi-wavelength optical power supplies 111A-111D, the lasers 601-1 to 601-M operate to generate continuous wave laser light at the single wavelength (λi) for input to the respective comb generators 703-1 to 703-M. Each of the comb generators 703-1 to 703-M operates to use the continuous wave laser light at the single wavelength (λi) to create continuous wave light at multiple wavelengths (λ1, . . . , λN) corresponding to a desired wavelength spacing, such as the WDM wavelength/frequency grid. Each of the comb generators 703-1 to 703-M is configured to generate the desired WDM wavelength/frequency grid of continuous wave light, which defines a WDM light source that is ultimately transmitted through each of the optical fibers 113-1 to 113-M of the optical fiber array 113 to the electro-optical chip 101. In some embodiments, after the optional optical filtering by the optical filtering devices 707-1 to 707-M and/or after the optional optical amplification by the optical amplification device 705, the continuous wave light at the multiple wavelengths (λ1, . . . , λN) define a WDM light source that is transmitted through each of the optical fibers 113-1 to 113-M of the optical fiber array 113 to the electro-optical chip 101. In some embodiments, the electro-optical chip 101 uses the WDM light source as continuous wave laser light input to one or more of the transmit macros in the macros 205-1 to 205-M as shown in FIG. 6C. Also, in some embodiments, the electro-optical chip 101 is configured to further manipulate the WDM light source signals, such as through wavelength/frequency-selective splitting, before sending the WDM light source signals as continuous wave laser light input to one or more of the transmit macros in the macros 205-1 to 205-M.

It should be noted that because the lasers 701-1 to 701-M of the laser array 701 generate continuous wave laser light at the same wavelength (λi), the laser array 701 can be advantageously aligned with a single laser gain region, which makes the configuration of the remote multi-wavelength optical power supplies 111A-111D particularly useful for high temperature operation. Also, it should be noted that the continuous wave laser light wavelength (λi) generated by the lasers 701-1 to 701-M can be in the general wavelength range of the desired WDM wavelength/frequency grid and still be used by the comb generators 703-1 to 703-M to generate the desired WDM wavelength/frequency grid.

Figure 9A:
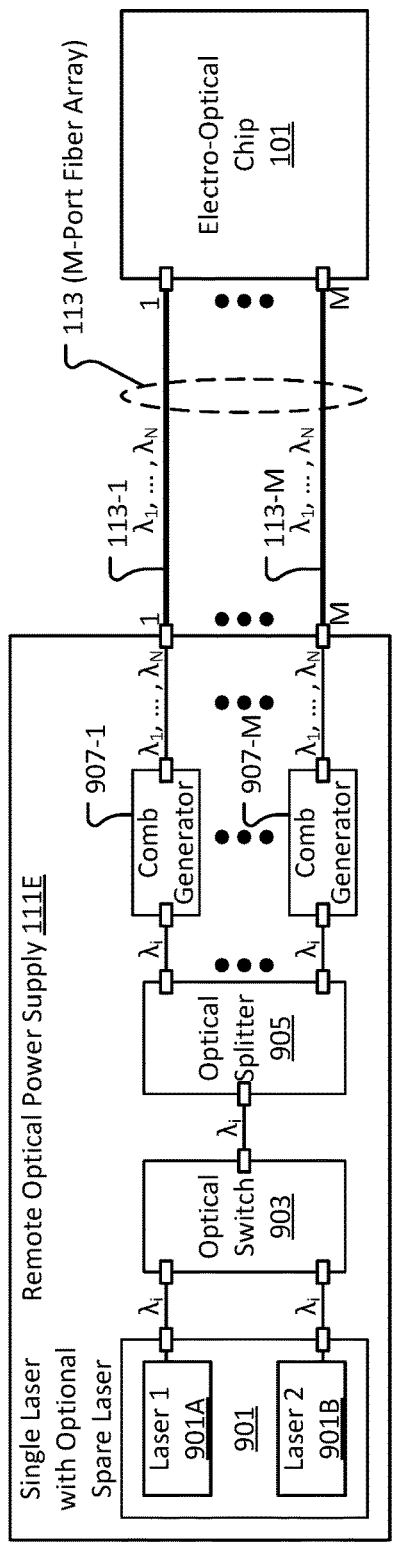
FIG. 9A shows a remote multi-wavelength optical power supply that includes a laser module having a single laser source (with optional spare laser source) configured to generate continuous wave laser light at a single wavelength $(\lambda i)$, in accordance with some embodiments.

FIG. 9A shows a remote multi-wavelength optical power supply 111E that includes a laser module 901 having a single laser source 901A (with optional spare laser source 901B) configured to generate continuous wave laser light at a single wavelength (λi), in accordance with some embodiments. In some embodiments, the remote optical power supply 901 is optically connected to an optical switch 903 that provides for controlled connection of either the laser source 901A or the laser source 901B to the output of the optical switch 903 at a given time. In some embodiments, the optical switch 903 is an active photonic device. In some embodiments, the optical switch 903 is a passive photonic device. In some embodiments, the optical switch 903 is an optical waveguide that connects both the laser source 901A and the laser source 901B to the optical output of the optical switch 903, with control of the laser sources 901A and 901B determining which laser is operating to supply laser light to the output of the optical switch 903 at a given time. In some embodiments, the laser source 901B is a backup for the laser source 901A. In some embodiments, the optical switch 903 enables switching between the laser source 901A and the backup laser source 901B in the event that the laser source 901A fails. In some embodiments, only the laser source 901A or the backup laser source 901B operates at a given time. Also, in some embodiments, the laser module 901 includes more than one of the backup laser sources 901B, with each of the multiple backup laser sources, e.g., 901B, optically connected to a respective optical input of the optical switch 903.

The output of the optical switch 903 is connected to an optical input of an optical splitter 905. The optical splitter 905 is configured to divide the light received through the optical input of the optical splitter 905 and direct portions of this incoming light to each of a number (M) of optical outputs of the optical splitter 905. Each of the optical outputs of the optical splitter 905 is optically connected to an optical input of one of a number (M) of comb generators 907-1 to 907-M. In this manner, the remote optical power supply 111E transmits the continuous wave laser light of the single wavelength (λi) generated by either the laser source 901A or the laser source 901B to the optical input of each of the number (M) of comb generators 907-1 to 907-M at a given time. Each comb generator 907-1 to 907-M is configured to generate and output the number (N) of wavelengths (λ1, . . . , λN) of continuous wave laser light from the single wavelength (λi) of laser light. In the example remote optical power supply 111E, the optical outputs of the comb generators 901-1 to 907-M are optically connected to respective optical outputs of the remote optical power supply 111E, which are in turn optically connected to respective optical fibers 113-1 to 113-M of the fiber array 113 to provide the number (N) of wavelengths (λ1, . . . , λN) of continuous wave laser light from the remote optical power supply 111E to the electro-optical chip 101.

Figure 9B:
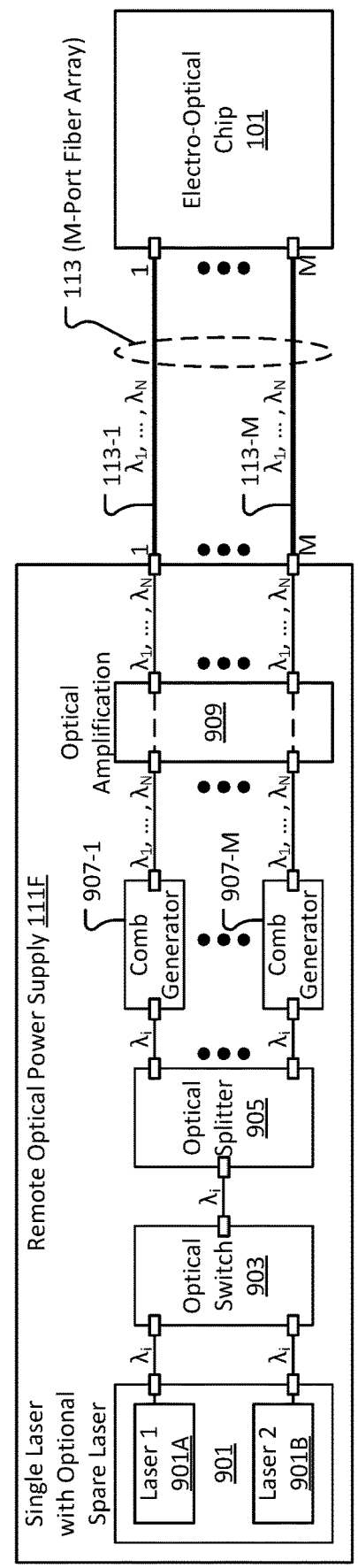
FIG. 9B shows a multi-wavelength remote optical power supply that is a variation of the multi-wavelength remote optical power supply of FIG. 9A, in accordance with some embodiments.

FIG. 9B shows a multi-wavelength remote optical power supply 111F that is a variation of the multi-wavelength remote optical power supply 111E of FIG. 9A, in accordance with some embodiments. In the remote optical power supply 111F, the optical outputs of the comb generators 907-1 to 907-M are optically connected to corresponding optical inputs of an optical amplification device 909. The optical amplification device 909 has a number M of optical outputs respectively corresponding to the number M of optical inputs of the optical amplification device 909. Each of the M optical outputs of the optical amplification device 909 is connected to a corresponding one of the M optical outputs of the remote optical power supply 111F, which are in turn respectively connected to the M optical fibers 113-1 to 113-M, which are in turn optically connected to the electro-optical chip 101. The optical amplification device 909 amplifies the optical signals received from each of the comb generators 907-1 to 907-M, such that amplified versions of the light received at a given optical input of the optical amplifying device 909 are transmitted through the corresponding optical output of the optical amplification device 909. In this manner, the light output from a given one of the optical outputs of the optical amplification device 909 is an amplified version of the light output by a corresponding one of the number M of comb generators 907-1 to 907-M. The optical amplification device 909 operates to offset optical power losses in the optical data communication system that includes the remote optical power supply 111F, the fiber array 113, and the electro-optical chip 101.

Figure 9C:
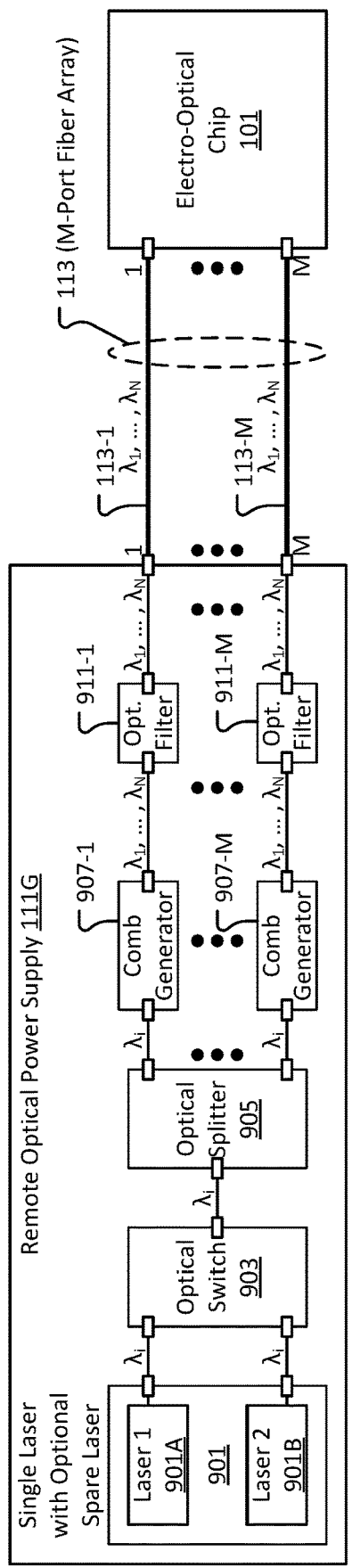
FIG. 9C shows a multi-wavelength remote optical power supply that is a variation of the multi-wavelength remote optical power supply of FIG. 9A, in accordance with some embodiments.

FIG. 9C shows a multi-wavelength remote optical power supply 111G that is a variation of the multi-wavelength remote optical power supply 111E of FIG. 9A, in accordance with some embodiments. In the remote optical power supply 111G, the optical output of each of the number M of comb generators 907-1 to 907-M is optically connected to an optical input of a corresponding one of a number M of optical filter devices 911-1 to 911-M. Each of the optical filter devices 911-1 through 911-M has an optical output optically connected to a corresponding one of the M optical outputs of the remote optical power supply 111G, which are in turn respectively connected to the M optical fibers 113-1 to 113-M, which are in turn optically connected to the electro-optical chip 101. The optical filter devices 911-1 through 911-M operate to remove imperfections in the comb generation process performed by the comb generators 907-1 to 907-M.

Figure 9D:
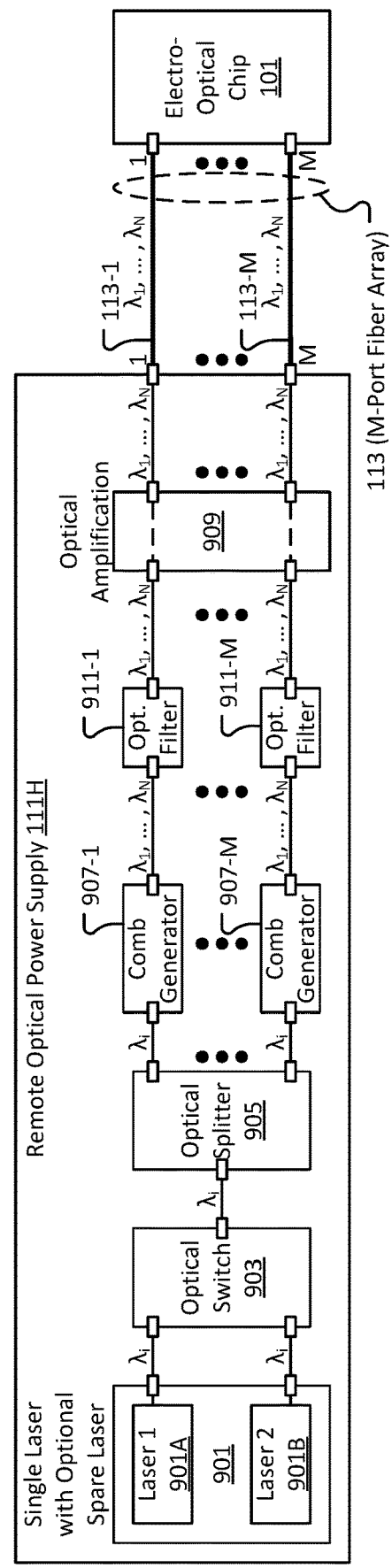
FIG. 9D shows a multi-wavelength remote optical power supply that is a variation of the multi-wavelength remote optical power supply of FIG. 9A, in accordance with some embodiments.

FIG. 9D shows a multi-wavelength remote optical power supply 111H that is a variation of the multi-wavelength remote optical power supply 111E of FIG. 9A, in accordance with some embodiments. In the remote optical power supply 111H, the optical output of each of the number M of comb generators 907-1 to 907-M is optically connected to an optical input of a corresponding one of the number M of optical filter devices 911-1 to 911-M. Each of the optical filter devices 911-1 through 911-M has an optical output optically connected to a corresponding optical input of the optical amplification device 909. Each of the M optical outputs of the optical amplification device 909 is connected to a corresponding one of the M optical outputs of the remote optical power supply 111F, which are in turn respectively connected to the M optical fibers 113-1 to 113-M, which are in turn optically connected to the electro-optical chip 101. The optical filter devices 911-1 to 911-M operate to remove imperfections in the comb generation process performed by the comb generators 907-1 to 907-M. The optical amplification device 909 amplifies the optical signals received from each of the optical filter devices 911-1 to 911-M, such that amplified versions of the light received at a given optical input of the optical amplification device 909 are transmitted through the corresponding optical output of the optical amplification device 909. The optical amplification device 909 operates to offset optical power losses in the optical data communication system that includes the remote optical power supply 111H, the fiber array 113, and the electro-optical chip 101. In this manner, the light output from each of the optical outputs of the optical amplification device 909 is a filtered and amplified version of the multiple wavelengths ($\lambda 1, \ldots, \lambda N$) of continuous wave light output by a corresponding one of the M comb generators 907-1 to 907-M.

It should be understood that the remote (external to the electro-optical chip 101) multi-wavelength optical power supplies 111E-111H use comb generators 907-1 to 907-M instead of the optical distribution network 603 as used in the remote optical power supply 101 of FIG. 6A. In the remote multi-wavelength optical power supplies 111E-111H, the lasers 901A and 901B operate to generate continuous wave laser light at the single wavelength ($\lambda i$) for input to the comb generators 907-1 to 907-M. Each of the comb generators 907-1 to 907-M operates to use the continuous wave laser light at the single wavelength ($\lambda i$) to create continuous wave light at multiple wavelengths ($\lambda 1, \ldots, \lambda N$) corresponding to a desired wavelength spacing, such as the WDM wavelength/frequency grid. It should be noted that the continuous wave laser light wavelength ($\lambda i$) generated by the lasers 901A and 901B can be in the general wavelength range of the desired WDM wavelength/frequency grid and still be used by the comb generators 907-1 to 907-M to generate the desired WDM wavelength/frequency grid. Each of the comb generators 907-1 to 907-M is configured to generate the desired WDM wavelength/frequency grid of continuous wave light, which defines a WDM light source that is ultimately transmitted through each of the optical fibers 113-1 to 113-M of the optical fiber array 113 to the electro-optical chip 101. In some embodiments, after the optional optical filtering by the optical filtering devices 911-1 to 911-M and/or after the optional optical amplification by the optical amplification device 909, the continuous wave light at the multiple wavelengths ($\lambda 1, \ldots, \lambda N$) define a WDM light source that is transmitted through each of the optical fibers 113-1 to 113-M of the optical fiber array 113 to the electro-optical chip 101. In some embodiments, the electro-optical chip 101 uses the WDM light source as continuous wave laser light input to one or more of the transmit macros in the macros 205-1 to 205-M as shown in FIG. 6C. Also, in some embodiments, the electro-optical chip 101 is configured to further manipulate the WDM light source signals, such as through wavelength/frequency-selective splitting, before sending the WDM light source signals as continuous wave laser light input to one or more of the transmit macros in the macros 205-1 to 205-M.

FIG. 10A shows an remote multi-wavelength optical power supply 111I that includes a laser module 1001 having a single laser source 1001A (with optional spare laser source 1001B) configured to generate continuous wave laser light at a single wavelength ($\lambda i$), in accordance with some embodiments. In some embodiments, the remote optical power supply 1001 is optically connected to an optical switch 1003 that provides for controlled connection of either the laser source 1001A or the laser source 1001B to the output of the optical switch 1003 at a given time. In some embodiments, the optical switch 1003 is an active photonic device. In some embodiments, the optical switch 1003 is a passive photonic device. In some embodiments, the optical switch 1003 is an optical waveguide that connects both the laser source 1001A and the laser source 1001B to the optical output of the optical switch 1003, with on/off control of the laser sources 1001A and 1001B determining which laser is operating to supply laser light to the output of the optical switch 1003 at a given time. In some embodiments, the laser source 1001B is a backup for the laser source 1001A. In some embodiments, the optical switch 1003 enables switching between the laser source 1001A and the backup laser source 1001B in the event that the laser source 1001A fails. In some embodiments, only the laser source 1001A or the backup laser source 1001B operates at a given time. Also, in some embodiments, the laser module 1001 includes more than one of the backup laser sources, e.g., 1001B, with each of the multiple backup laser sources 1001B optically connected to a respective optical input of the optical switch 1003.

The output of the optical switch 1003 is connected to an optical input of a comb generator 1005, so that the single wavelength (λi) of laser light generated by the laser module 1001 is provided as input light to the comb generator 1005. The comb generator 1005 is configured to generate and output the number (N) of wavelengths (λ1, . . . , λN) of continuous wave laser light from the single wavelength (λi) of laser light. In the example remote optical power supply 111I, the optical output of the comb generators 1005 is optically connected to an optical input of an optical splitter 1007. The optical splitter 1007 is configured to divide the light received through the optical input of the optical splitter 1007 and direct portions of this incoming light to each of a number (M) of optical outputs of the optical splitter 1007. In the example remote optical power supply 111I, the M optical outputs of the optical splitter 1007 are optically connected to respective optical outputs of the remote optical power supply 111I, which are in turn optically connected to respective optical fibers 113-1 to 113-M of the fiber array 113 to provide the number (N) of wavelengths (λ1, . . . , λN) of continuous wave laser light from the remote optical power supply 111I to the electro-optical chip 101.

FIG. 10B shows a multi-wavelength remote optical power supply 111J that is a variation of the multi-wavelength remote optical power supply 111I of FIG. 10A, in accordance with some embodiments. In the remote optical power supply 111J, the optical outputs of the optical splitter 1007 are optically connected to corresponding optical inputs of an optical amplification device 1009. The optical amplification device 1009 has a number M of optical outputs respectively corresponding to the number M of optical inputs of the optical amplification device 1009. Each of the M optical outputs of the optical amplification device 1009 is connected to a corresponding one of the M optical outputs of the remote optical power supply 111J, which are in turn respectively connected to the M optical fibers 113-1 to 113-M, which are in turn optically connected to the electro-optical chip 101. The optical amplification device 1009 amplifies the optical signals received from the optical splitter 1007, such that amplified versions of the light received at a given optical input of the optical amplifying device 1009 are transmitted through the corresponding optical output of the optical amplification device 1009. In this manner, the light output from a given one of the optical outputs of the optical amplification device 1009 is an amplified version of the light output by the comb generator 1005. The optical amplification device 1009 operates to offset optical power losses in the optical data communication system that includes the remote optical power supply 111J, the fiber array 113, and the electro-optical chip 101.

Figure 10C:
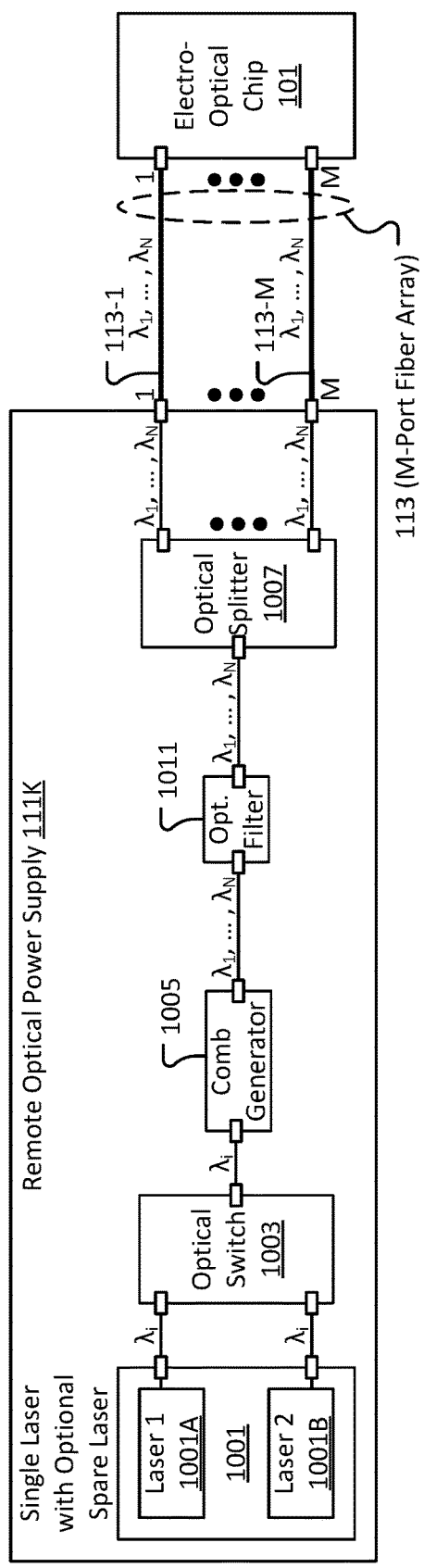
FIG. 10C shows a multi-wavelength remote optical power supply that is a variation of the multi-wavelength remote optical power supply of FIG. 10A, in accordance with some embodiments.

FIG. 10C shows a multi-wavelength remote optical power supply 111K that is a variation of the multi-wavelength remote optical power supply 111I of FIG. 10A, in accordance with some embodiments. In the remote optical power supply 111K, the optical output of the comb generator 1005 is optically connected to an optical input of an optical filter device 1011. The optical filter device 1011 operates to remove imperfections in the comb generation process performed by the comb generator 1005. An optical output of the optical filter device 1011 is optically connected to the optical input of the optical splitter 1007. The M optical outputs of the optical splitter 1007 are respectively optically connected to the M optical outputs of the remote optical power supply 111K, which are in turn respectively connected to the M optical fibers 113-1 to 113-M, which are in turn optically connected to the electro-optical chip 101.

Figure 10D:
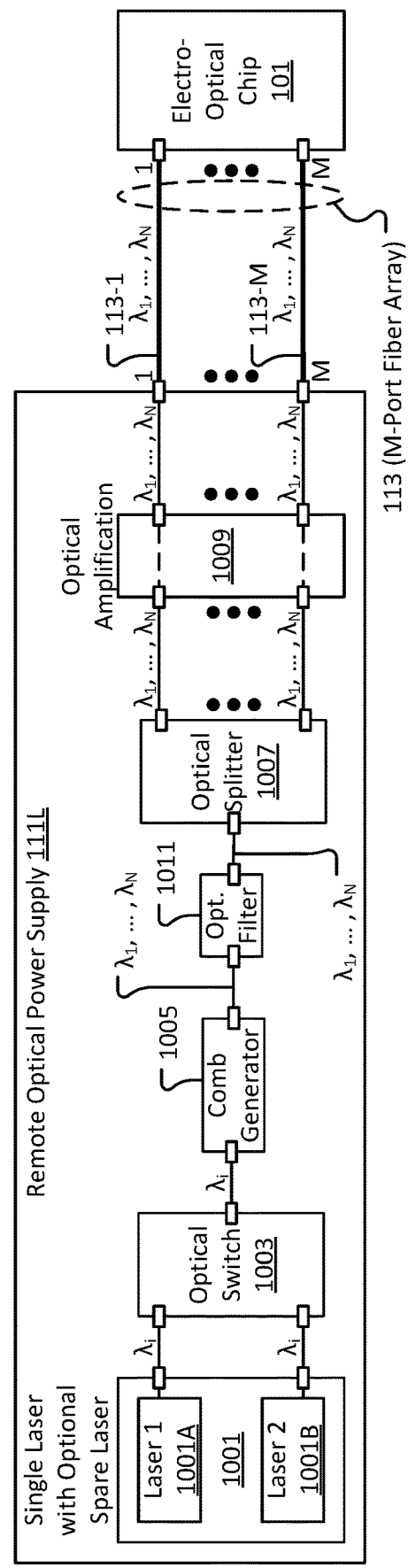
FIG. 10D shows a multi-wavelength remote optical power supply that is a variation of the multi-wavelength remote optical power supply of FIG. 10A, in accordance with some embodiments.

FIG. 10D shows a multi-wavelength remote optical power supply 111L that is a variation of the multi-wavelength remote optical power supply 111I of FIG. 10A, in accordance with some embodiments. In the remote optical power supply 111L, the optical output of each of the comb generator 1005 is optically connected to the optical input of the optical filter device 1011. The optical output of the optical filter device 1011 is optically connected to the optical input of the optical splitter 1007. The M optical outputs of the optical splitter 1007 are respectively optically connected to the M optical inputs of the optical amplification device 1009. Each of the M optical outputs of the optical amplification device 909 is connected to a corresponding one of the M optical outputs of the remote optical power supply 111L, which are in turn respectively connected to the M optical fibers 113-1 to 113-M, which are in turn optically connected to the electro-optical chip 101. The optical filter device 1011 operates to remove imperfections in the comb generation process performed by the comb generator 1005. The optical amplification device 1009 amplifies the optical signals received from the optical filter device 1011 by way of the optical splitter 1007, such that amplified versions of the light received at a given optical input of the optical amplification device 1009 are transmitted through the corresponding optical output of the optical amplification device 1009. The optical amplification device 1009 operates to offset optical power losses in the optical data communication system that includes the remote optical power supply 111L, the fiber array 113, and the electro-optical chip 101. In this manner, the light output from each of the optical outputs of the optical amplification device 1009 is a filtered and amplified version of the multiple wavelengths (λ1, . . . , λN) of continuous wave light output by the comb generator 1005.

It should be understood that the remote (external to the electro-optical chip 101) multi-wavelength optical power supplies 1111-111L use the comb generator 1005 instead of the optical distribution network 603 as used in the remote optical power supply 101 of FIG. 6A. In the remote multi-wavelength optical power supplies 1111-111L, the lasers 1001A and 1001B operate to generate continuous wave laser light at the single wavelength (λi) for input to the comb generator 1005. The comb generator 1005 operates to use the continuous wave laser light at the single wavelength (λi) to create continuous wave light at multiple wavelengths (λ1, . . . , λN) corresponding to a desired wavelength spacing, such as the WDM wavelength/frequency grid. It should be noted that the continuous wave laser light wavelength (λi) generated by the lasers 1001A and 1001B can be in the general wavelength range of the desired WDM wavelength/frequency grid and still be used by the comb generator 1005 to generate the desired WDM wavelength/frequency grid. The comb generator 1005 is configured to generate the desired WDM wavelength/frequency grid of continuous wave light, which defines a WDM light source that is ultimately transmitted through each of the optical fibers 113-1 to 113-M of the optical fiber array 113 to the electro-optical chip 101. In some embodiments, after the optional optical filtering by the optical filtering device 1011 and/or after the optional optical amplification by the optical amplification device 1009, the continuous wave light at the multiple wavelengths (λ1, . . . , λN) define a WDM light source that is transmitted through each of the optical fibers 113-1 to 113-M of the optical fiber array 113 to the electro-optical chip 101. In some embodiments, the electro-optical chip 101 uses the WDM light source as continuous wave laser light input to one or more of the transmit macros in the macros 205-1 to 205-M as shown in FIG. 6C. Also, in some embodiments, the electro-optical chip 101 is configured to further manipulate the WDM light source signals, such as through wavelength/frequency-selective splitting, before sending the WDM light source signals as continuous wave laser light input to one or more of the transmit macros in the macros 205-1 to 205-M.

Figure 11:
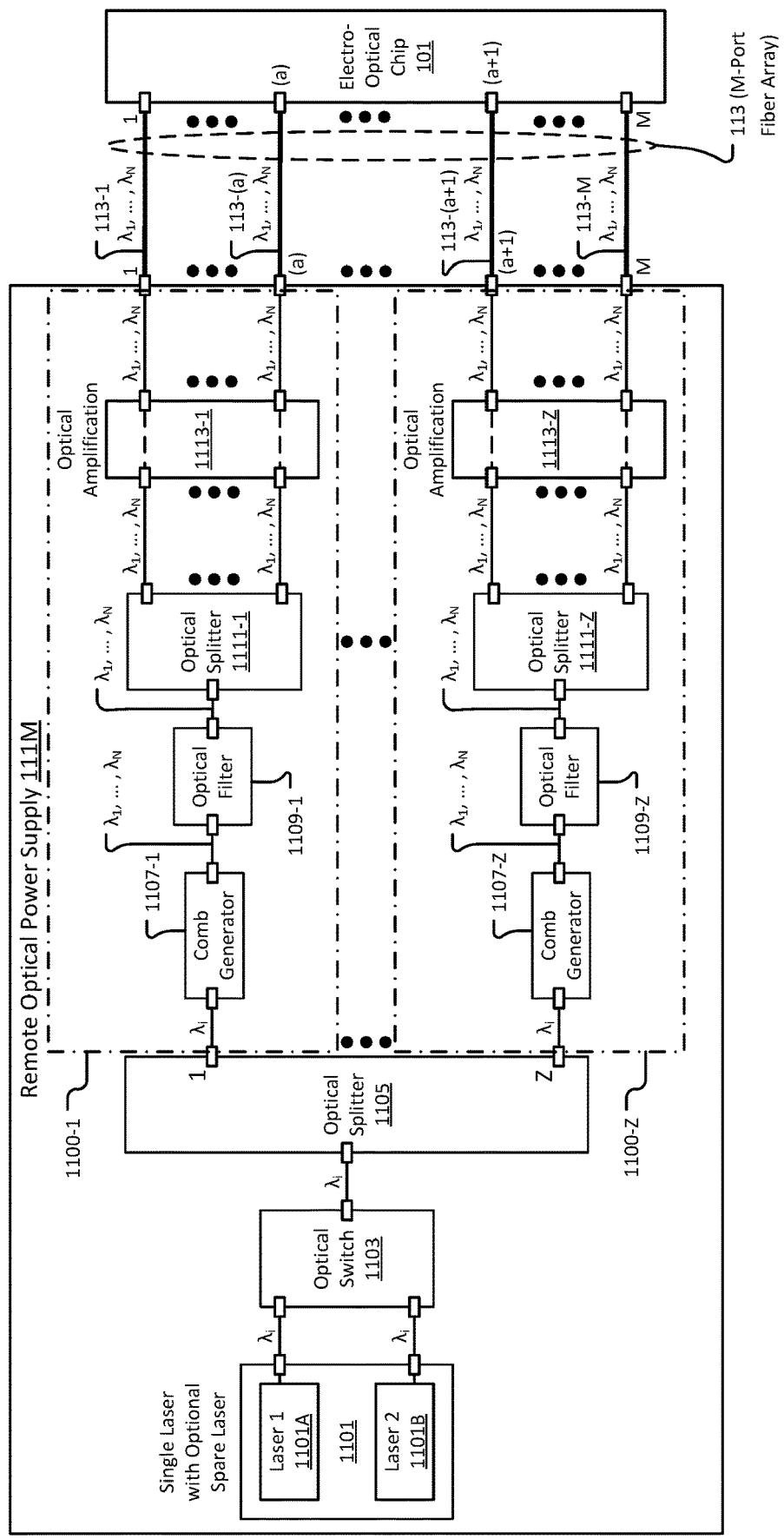
FIG. 11 shows a remote multi-wavelength optical power supply that includes a laser module having a single laser source (with optional spare laser source) configured to generate continuous wave laser light at a single wavelength ($\lambda i$), in accordance with some embodiments.

FIG. 11 shows a remote multi-wavelength optical power supply 111M that includes a laser module 1101 having a single laser source 1101A (with optional spare laser source 1101B) configured to generate continuous wave laser light at a single wavelength ($\lambda i$), in accordance with some embodiments. In some embodiments, the remote optical power supply 1101 is optically connected to an optical switch 1103 that provides for controlled connection of either the laser source 1101A or the laser source 1101B to the output of the optical switch 1103 at a given time. In some embodiments, the optical switch 1103 is an active photonic device. In some embodiments, the optical switch 1103 is a passive photonic device. In some embodiments, the optical switch 1103 is an optical waveguide that connects both the laser source 1101A and the laser source 1101B to the optical output of the optical switch 1103, with control of the laser sources 1101A and 1101B determining which laser is operating to supply laser light to the output of the optical switch 1103 at a given time. In some embodiments, the laser source 1101B is a backup for the laser source 1101A. In some embodiments, the optical switch 1103 enables switching between the laser source 1101A and the backup laser source 1101B in the event that the laser source 1101A fails. In some embodiments, only the laser source 1101A or the backup laser source 1101B operates at a given time. Also, in some embodiments, the laser module 1101 includes more than one of the backup laser sources 1101B, with each of the multiple backup laser sources, e.g., 1101B, optically connected to a respective optical input of the optical switch 1103.

The output of the optical switch 1103 is connected to an optical input of an optical splitter 1105. The optical splitter 1105 is configured to divide the light received through the optical input of the optical splitter 1105 and direct portions of this incoming light to each of a number (Z) of optical outputs of the optical splitter 1105. Each of the optical outputs (1 to Z) of the optical splitter 1005 is optically connected to supply the single wavelength ($\lambda i$) of laser light to each of a number Z of comb generation pipelines 1100-1 to 1100-Z. More specifically, each of the optical outputs (1 to Z) of the optical splitter 1005 is optically connected to an optical input of a corresponding one of the number Z of comb generators 1107-1 to 1107-Z in respective ones of the Z comb generation pipelines 1100-1 to 1100-Z. In this manner, the remote optical power supply 111M transmits the continuous wave laser light of the single wavelength ($\lambda i$) generated by either the laser source 1101A or the laser source 1101B to the optical input of each of the Z comb generators 1107-1 to 1107-Z of the comb generation pipelines 1100-1 to 1100-Z at a given time. Each comb generator 1107-1 to 1107-Z is configured to generate and output the number (N) of wavelengths ($\lambda 1, \ldots, \lambda N$) of continuous wave laser light from the single wavelength ($\lambda i$) of laser light. In the remote optical power supply 111M, the optical output of each of the number M of comb generators 1107-1 to 1107-Z is optically connected to an optical input of a corresponding one of the number Z of optical filter devices 1109-1 to 1109-Z. Each of the optical filter devices 1109-1 to 1109-Z operates to remove imperfections in the comb generation process performed by the corresponding comb generator 1107-1 to 1107-Z. An optical output of each of the optical filter devices 1109-1 to 1109-M is optically connected to an optical input of a corresponding one of the number Z of optical splitters 1111-1 to 1111-Z in each of the Z comb generation pipelines 1100-1 to 1100-Z. Each of the optical splitters 1111-1 to 1111-Z has a plurality of optical outputs. Each of the optical splitters 1111-1 to 1111-Z is configured to divide the light received through its optical input and direct portions of this incoming light to each of its plurality of optical outputs.

The plurality of optical outputs of each of the optical splitters 1111-1 to 1111-Z are optically connected to corresponding optical inputs of a corresponding one of the number Z of optical amplification devices 1113-1 to 1113-Z. Each of the Z optical amplification devices 1113-1 to 1113-Z has a plurality of optical outputs respectively corresponding to the plurality of optical inputs of the optical amplification device 1113-1 to 1113-Z. Each of the Z optical amplification devices 1113-1 to 1113-Z amplifies the optical signals received from the corresponding one of the Z optical splitters 1111-1 to 1111-Z, such that amplified versions of the light received at a given optical input of a given optical amplifying device 1113-1 to 1113-Z are transmitted through the corresponding optical output of the given optical amplification device 1113-1 to 1113-Z. The light output from the optical outputs of a given one of the Z optical amplification devices 1113-1 to 1113-Z is an amplified version of the light output by the corresponding comb generator 1107-1 to 1107-Z. In this manner, the optical amplification devices 1113-1 to 1113-Z operate to offset optical power losses in the optical data communication system that includes the remote optical power supply 111M, the fiber array 113, and the electro-optical chip 101. Each of the plurality of optical outputs of each of the optical amplification devices 1113-1 to 1113-Z is connected to a corresponding one of a number M of optical outputs of the remote optical power supply 111M. In some embodiments, a sum of the pluralities of optical outputs of the Z optical amplification devices 1113-1 to 1113-Z is equal to or greater than the number M of optical outputs of the remote optical power supply 111M. The M optical outputs of the remote optical power supply 111M are respectively connected to the M optical fibers 113-1 to 113-M, which are in turn optically connected to the electro-optical chip 101.

It should be understood that the remote (external to the electro-optical chip 101) multi-wavelength optical power supply 111M uses the comb generators 1107-1 to 1107-Z instead of the optical distribution network 603 as used in the remote optical power supply 101 of FIG. 6A. In the remote multi-wavelength optical power supply 111M, the lasers 1101A and 1101B operate to generate continuous wave laser light at the single wavelength ($\lambda i$) for input to the comb generators 1107-1 to 1107-Z in the various comb generator pipelines 1100-1 to 1100-Z. Each of the comb generators 1107-1 to 1107-Z operates to use the continuous wave laser light at the single wavelength ($\lambda i$) to create continuous wave light at multiple wavelengths ($\lambda 1, \ldots, \lambda N$) corresponding to a desired wavelength spacing, such as the WDM wavelength/frequency grid. It should be noted that the continuous wave laser light wavelength ($\lambda i$) generated by the lasers 1101A and 1101B can be in the general wavelength range of the desired WDM wavelength/frequency grid and still be used by the comb generators 1107-1 to 1107-Z to generate the desired WDM wavelength/frequency grid. Each of the comb generators 1107-1 to 1107-Z is configured to generate the desired WDM wavelength/frequency grid of continuous wave light, which defines a WDM light source that is ultimately transmitted through each of the optical fibers 113-1 to 113-M of the optical fiber array 113 to the electro-optical chip 101. In some embodiments, after the optical filtering by the optical filtering devices 1109-1 to 1109-Z and after the optical amplification by the optical amplification devices 1113-1 to 1113-Z, the continuous wave light at the multiple wavelengths ($\lambda 1, \ldots, \lambda N$) define a WDM light source that is transmitted through each of the optical fibers 113-1 to 113-M of the optical fiber array 113 to the electro-optical chip 101. In some embodiments, the electro-optical chip 101 uses the WDM light source as continuous wave laser light input to one or more of the transmit macros in the macros 205-1 to 205-M as shown in FIG. 6C. Also, in some embodiments, the electro-optical chip 101 is configured to further manipulate the WDM light source signals, such as through wavelength/frequency-selective splitting, before sending the WDM light source signals as continuous wave laser light input to one or more of the transmit macros in the macros 205-1 to 205-M.

The diagram of FIG. 8 indicating how each of the optical fibers 113-1 to 113-M receives each of the multiple wavelengths ($\lambda 1, \ldots, \lambda N$) of continuous wave laser light also applies to each of the remote optical power supplies 111E through 111M. The remote optical power supplies 111E through 111M operate to supply continuous wave light at a substantially equal intensity (power) at each of the multiple wavelengths ($\lambda 1, \ldots, \lambda N$) to each of the optical fibers 113-1 to 113-M and in turn to the electro-optical chip 101.

In some embodiments, each of the remote multi-wavelength optical power supplies 111A-111M includes a laser (701-1 to 701-M; 901A, 901B; 1001A, 1001B; 1101A, 1101B) and a comb generator (703-1 to 703-M; 907-1 to 907-M; 1005; 1107-1 to 1107-Z). The laser (701-1 to 701-M; 901A, 901B; 1001A, 1001B; 1101A, 1101B) is configured to generate continuous wave light at the single wavelength ($\lambda i$). The comb generator (703-1 to 703-M; 907-1 to 907-M; 1005; 1107-1 to 1107-Z) is optically connected to the laser (701-1 to 701-M; 901A, 901B; 1001A, 1001B; 1101A, 1101B) to receive the continuous wave light at the single wavelength ($\lambda i$) as input light. The comb generator (703-1 to 703-M; 907-1 to 907-M; 1005; 1107-1 to 1107-Z) is configured to generate the multiple wavelengths ($\lambda 1, \ldots, \lambda N$) of continuous wave light from the input light. In some embodiments, the laser (701-1 to 701-M; 901A, 901B; 1001A, 1001B; 1101A, 1101B) is one of a plurality of lasers within the optical power supply 111A-111M. And, the comb generator (703-1 to 703-M; 907-1 to 907-M; 1005; 1107-1 to 1107-Z) is one of a plurality of comb generators within the optical power supply 111A-111M. Each of the plurality of comb generators (703-1 to 703-M; 907-1 to 907-M; 1005; 1107-1 to 1107-Z) is connected to receive continuous wave light at the single wavelength ($\lambda i$) from a corresponding one of the plurality of lasers (701-1 to 701-M; 901A, 901B; 1001A, 1001B; 1101A, 1101B). Each of the plurality of comb generators (703-1 to 703-M; 907-1 to 907-M; 1005; 1107-1 to 1107-Z) is configured to generate and convey the multiple wavelengths ($\lambda 1, \ldots, \lambda N$) of continuous wave light to a corresponding one of a plurality (M) of optical outputs of the optical power supply 111A-111M.

In some embodiments, an optical amplification device (705; 909; 1009; 1113-1 to 1113-Z) is optically connected to receive and amplify the multiple wavelengths ($\lambda 1, \ldots, \lambda N$) of continuous wave light generated by the comb generator(s) (703-1 to 703-M; 907-1 to 907-M; 1005; 1107-1 to 1107-Z). The optical amplification device (705; 909; 1009; 1113-1 to 1113-Z) is optically connected to convey amplified versions of the multiple wavelengths ($\lambda 1, \ldots, \lambda N$) of continuous wave light to one or more of the (M) optical output(s) of the optical power supply 111A-111M. In some embodiments, optical filter devices (707-1 to 707-M; 911-1 to 911-M; 1011; 1109-1 to 1109-Z) are optically connected to receive the multiple wavelengths ($\lambda 1, \ldots, \lambda N$) of continuous wave light generated by the comb generators (703-1 to 703-M; 907-1 to 907-M; 1005; 1107-1 to 1107-Z). Each of the optical filter devices (707-1 to 707-M; 911-1 to 911-M; 1011; 1109-1 to 1109-Z) is configured to remove imperfections in the multiple wavelengths ($\lambda 1, \ldots, \lambda N$) of continuous wave light and provide optically filtered versions of the multiple wavelengths ($\lambda 1, \ldots, \lambda N$) of continuous wave light to the (M) optical outputs of the optical power supply 111A-111M. Also, in some embodiments, the optical amplification device (705; 909; 1009; 1113-1 to 1113-Z) is optically connected to receive and amplify the optically filtered versions of the multiple wavelengths ($\lambda i, \ldots, \lambda N$) of continuous wave light in route to the optical outputs of the optical power supply 111A-111M. In some embodiments, an optical splitter (1007; 1111-1 to 1111-Z) is optically connected to supply a portion of the continuous wave light at each of the multiple wavelengths ($\lambda 1, \ldots, \lambda N$) as generated by the comb generator (703-1 to 703-M; 907-1 to 907-M; 1005; 1107-1 to 1107-Z) to each of a plurality of optical outputs of the optical power supply 111A-111M.

Figure 12A:
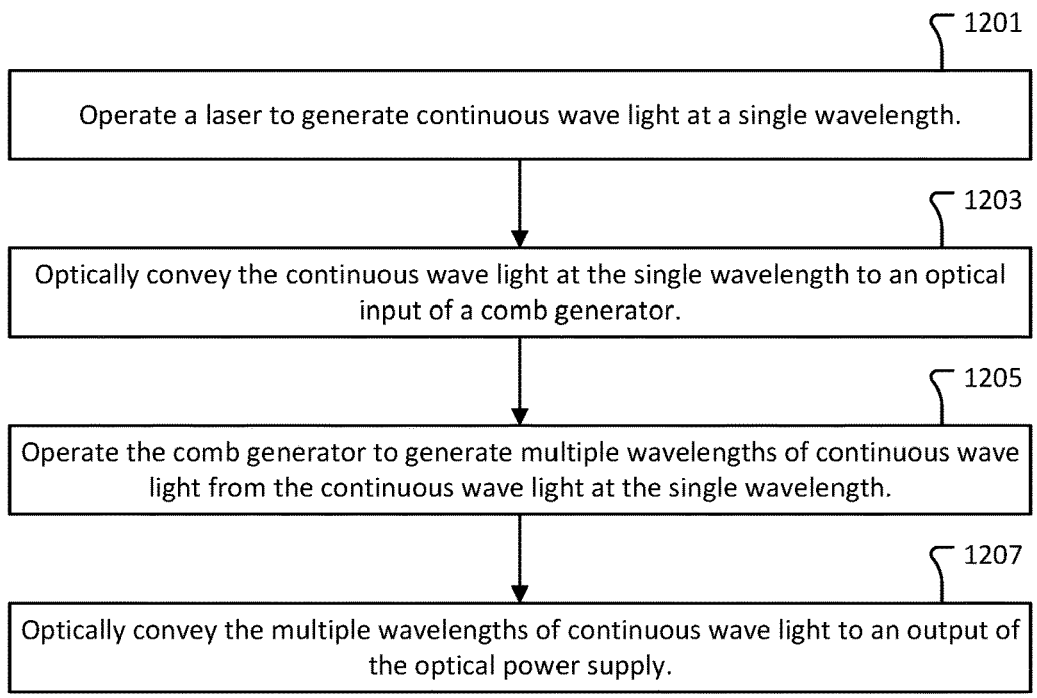
FIG. 12A shows a flowchart of a method for operating an optical power supply, in accordance with some embodiments.

FIG. 12A shows a flowchart of a method for operating an optical power supply (111A-111M), in accordance with some embodiments. The method includes an operation 1201 for operating a laser (701-1 to 701-M; 901A, 901B; 1001A, 1001B; 1101A, 1101B) to generate continuous wave light at a single wavelength ($\lambda i$). The method also includes an operation 1203 for optically conveying the continuous wave light at the single wavelength ($\lambda i$) to an optical input of a comb generator (703-1 to 703-M; 907-1 to 907-M; 1005; 1107-1 to 1107-Z). The method also includes an operation 1205 for operating the comb generator (703-1 to 703-M; 907-1 to 907-M; 1005; 1107-1 to 1107-Z) to generate multiple wavelengths ($\lambda 1, \ldots, \lambda N$) of continuous wave light from the continuous wave light at the single wavelength ($\lambda i$). The method also includes an operation 1207 for optically conveying the multiple wavelengths ($\lambda 1, \ldots, \lambda N$) of continuous wave light to an output of the optical power supply (111A-111M). In some embodiments, the method includes operating each of the plurality of lasers (701-1 to 701-M; 901A, 901B; 1001A, 1001B; 1101A, 1101B) to generate continuous wave light at the single wavelength ($\lambda i$), and operating each of the plurality of comb generators (703-1 to 703-M; 907-1 to 907-M; 1005; 1107-1 to 1107-Z) to generate the multiple wavelengths ($\lambda 1, \ldots, \lambda N$) of continuous wave light from the continuous wave light at the single wavelength ($\lambda i$) as received from a corresponding one of the plurality of lasers (701-1 to 701-M; 901A, 901B; 1001A, 1001B; 1101A, 1101B), and optically conveying the multiple wavelengths ($\lambda 1, \ldots, \lambda N$) of continuous wave light from each comb generator (703-1 to 703-M; 907-1 to 907-M; 1005; 1107-1 to 1107-Z) to the corresponding one of the plurality of optical outputs of the optical power supply (111A-111M). In some embodiments, the method also includes amplifying the multiple wavelengths ($\lambda 1, \ldots, \lambda N$) of continuous wave light in route from the comb generator (703-1 to 703-M; 907-1 to 907-M; 1005; 1107-1 to 1107-Z) to the optical output of the optical power supply (111A-111M). In some embodiments, the method also includes optically filtering the multiple wavelengths ($\lambda 1, \ldots, \lambda N$) of continuous wave light in route from the comb generator (703-1 to 703-M; 907-1 to 907-M; 1005; 1107-1 to 1107-Z) to the optical output of the optical power supply (111A-

111M). In some embodiments, the method includes amplifying optically filtered versions of the multiple wavelengths (λ1, ..., λN) of continuous wave light in route to the optical output of the optical power supply (111A-111M).

Figure 12B:
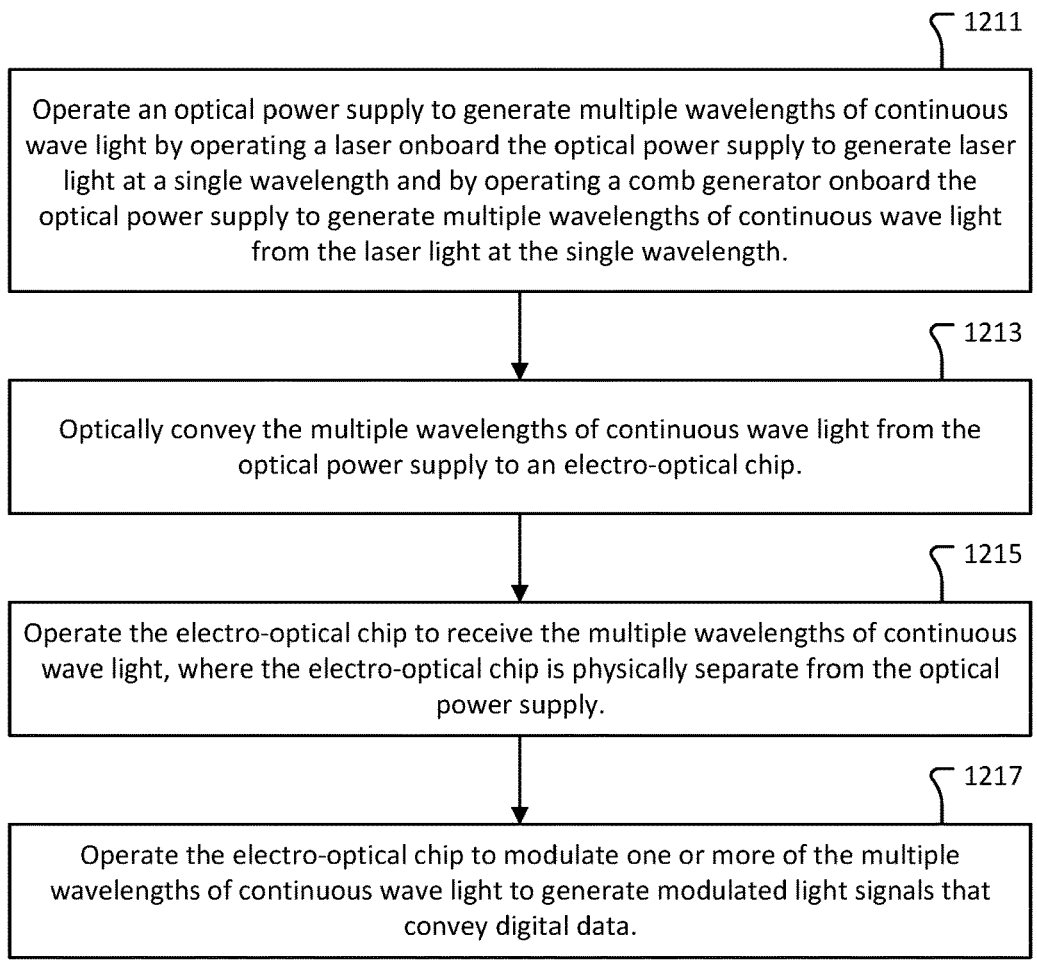
FIG. 12B shows a flowchart of a method for operating an optical data communication system, such as shown in FIGS. 7A-11, in accordance with some embodiments.

FIG. 12B shows a flowchart of a method for operating an optical data communication system, such as shown in FIGS. 7A-11, in accordance with some embodiments. The method includes an operation 1211 for operating an optical power supply (111A-111M) to generate multiple wavelengths (λ1, ..., λN) of continuous wave light by operating a laser (701-1 to 701-M; 901A, 901B; 1001A, 1001B; 1101A, 1101B) onboard the optical power supply (111A-111M) to generate laser light at a single wavelength (λi), and by operating a comb generator (703-1 to 703-M; 907-1 to 907-M; 1005; 1107-1 to 1107-Z) onboard the optical power supply (111A-111M) to generate the multiple wavelengths (λ1, ..., λN) of continuous wave light from the laser light at the single wavelength (λi). The method also includes an operation 1213 for optically conveying the multiple wavelengths (λ1, ..., λN) of continuous wave light from the optical power supply (111A-111M) to an electro-optical chip (101). The method also includes an operation 1215 for operating the electro-optical chip (101) to receive the multiple wavelengths (λ, ..., λN) of continuous wave light. The electro-optical chip (101) is physically separate from the optical power supply (111A-111M). The method also includes an operation 1217 for operating the electro-optical chip (101) to modulate one or more of the multiple wavelengths (λi, ..., λN) of continuous wave light to generate modulated light signals that convey digital data. In some embodiments, the method includes operating an optical amplification device (705; 909; 1009; 1113-1 to 1113-Z) within the optical power supply (111A-111M) to optically amplify the multiple wavelengths (λ1, ..., λN) of continuous wave 5 light generated by the comb generator (703-1 to 703-M; 907-1 to 907-M; 1005; 1107-1 to 1107-Z). In some embodiments, the method includes operating an optical filter device (707-1 to 707-M; 911-1 to 911-M; 1011; 1109-1 to 1109-Z) within the optical power supply (111A-111M) to remove imperfections in the multiple wavelengths (λ1, ..., λN) of continuous wave light generated by the comb generator (703-1 to 703-M; 907-1 to 907-M; 1005; 1107-1 to 1107-Z).

FIG. 13A shows a remote (external to the electro-optical chip 101) single-wavelength optical power supply 111N configured to supply continuous wave laser light at a single wavelength (λi), in accordance with some embodiments. The remote optical power supply 111N includes a laser array 1301 having a number (M) of lasers 1301-1 to 1301-M that are each configured to generate continuous wave laser light at substantially the same wavelength (λi). In some embodiments, the optical outputs of the M lasers 1301-1 to 1301-M are optically connected in a direct manner to respective ones of M optical outputs of the remote optical power supply 111N. In some embodiments, as an option, the remote optical power supply 111N includes an optical amplification device 1303 connected between the laser array 1301 and the M optical outputs of the remote optical power supply 111N. The optical amplification device 1303 has the number M of optical outputs respectively corresponding to the number M of optical inputs of the optical amplification device 1303. The optical amplification device 1303 amplifies the optical signals (increases the optical power of the light) received from each of the M lasers 1301-1 to 1301-M, such that amplified versions of the light received at a given optical input of the optical amplifying device 1303 are transmitted through the corresponding optical output of the optical amplification device 1303. In this manner, the light output from a given one of the optical outputs of the optical amplification device 1303 is an amplified version of the light output by a corresponding one of the M lasers 1301-1 to 1301-M. Each of the M optical outputs of the optical amplification device 1303 is connected to a corresponding one of the number M of optical fibers 113-1 to 113-M, which is in turn optically connected to the electro-optical chip 101. The optical amplification device 1303 operates to offset optical power losses in the optical data communication system that includes the remote optical power supply 111N, the fiber array 113, and the electro-optical chip 101. It should be understood that the remote single-wavelength optical power supply 111N does not include the optical distribution network 603 as used in the remote optical power supply 101 of FIG. 6A.

In the remote single-wavelength optical power supply 111N, each laser 1301-1 to 1301-M corresponds to a different one of the output optical fibers 113-1 to 113-M, respectively, where the laser light output by each laser 1301-1 to 1301-M can be optionally amplified by the optical amplification device 1303. However, in some embodiments, a one-to-one correspondence between lasers, e.g., 1301-1 to 1301-M, in the laser array 1301 and the optical fibers 113-1 to 113-M in the fiber array 113 is not required. For example, in some embodiments, it is possible to have fewer lasers in the laser array 1301 than there are optical fibers 113-1 to 113-M in the optical fiber array 113, with each laser in the laser in the laser array 1301 configured to generate continuous wave laser light at the same wavelength (λi) which can be split by one or more optical splitters, and which can be optionally amplified by the optical amplification device 1303, to ensure that each output optical fiber 113-1 to 113-M of the optical fiber array 113 is supplied with sufficient optical power.

FIG. 13B shows a remote (external to the electro-optical chip 101) single-wavelength optical power supply 111O configured to supply continuous wave laser light at a single wavelength (λi), in accordance with some embodiments. The remote multi-wavelength optical power supply 111O includes a laser module 1305 having a single laser source 1305A (with optional spare laser source 1305B) configured to generate continuous wave laser light at a single wavelength (λi), in accordance with some embodiments. In some embodiments, the remote optical power supply 111O is optically connected to an optical switch 1307 that provides for controlled connection of either the laser source 1305A or the laser source 1305B to the output of the optical switch 1307 at a given time. In some embodiments, the optical switch 1307 is an active photonic device. In some embodiments, the optical switch 1307 is a passive photonic device. In some embodiments, the optical switch 1307 is an optical waveguide that connects both the laser source 1305A and the laser source 1305B to the optical output of the optical switch 1307, with control of the laser sources 1305A and 1305B determining which laser is operating to supply laser light to the output of the optical switch 1307 at a given time. In some embodiments, the laser source 1305B is a backup for the laser source 1305A. In some embodiments, the optical switch 1307 enables switching between the laser source 1305A and the backup laser source 1305B in the event that the laser source 1305A fails. In some embodiments, only the laser source 1305A or the backup laser source 1305B operates at a given time. Also, in some embodiments, the laser module 1305 includes more than one of the backup laser sources 1305B, with each of the multiple backup laser sources, e.g., 1305B, optically connected to a respective optical input of the optical switch 1307.

The output of the optical switch 1307 is connected to an optical input of an optical splitter 1309. The optical splitter 1309 is configured to divide the light received through the optical input of the optical splitter 1309 and direct portions of this incoming light to each of a number (M) of optical outputs of the optical splitter 1309. Each of the optical outputs of the optical splitter 1309 is optically connected to corresponding optical inputs of an optical amplification device 1311. The optical amplification device 1311 has a number M of optical outputs respectively corresponding to the number M of optical inputs of the optical amplification device 1311. Each of the M optical outputs of the optical amplification device 1311 is connected to a corresponding one of the M optical outputs of the remote optical power supply 111O, which are in turn respectively connected to the M optical fibers 113-1 to 113-M, which are in turn optically connected to the electro-optical chip 101. The optical amplification device 1311 amplifies the optical signals received from the optical splitter 1309, such that amplified versions of the light received at a given optical input of the optical amplifying device 1311 are transmitted through the corresponding optical output of the optical amplification device 1311. In this manner, the light output from a given one of the optical outputs of the optical amplification device 1311 is an amplified version of the single wavelength (λi) of light generated by the laser module 1305. The optical amplification device 1311 operates to offset optical power losses in the optical data communication system that includes the remote optical power supply 111O, the fiber array 113, and the electro-optical chip 101. It should be understood that the remote single-wavelength optical power supply 111O does not include the optical distribution network 603 as used in the remote optical power supply 101 of FIG. 6A.

FIG. 13C shows a diagram indicating how each of the optical fibers 113-1 to 113-M receives the single wavelengths (λi) of continuous wave laser from each of the remote optical power supplies 111N and 111O, in accordance with some embodiments. The remote optical power supplies 111N and 111O operate to supply continuous wave light at a substantially equal intensity (power) at the single wavelength (λi) to each of the optical fibers 113-1 to 113-M and in turn to the electro-optical chip 101.

The remote single-wavelength optical power supplies 111N and 111O of FIGS. 13A and 13B, respectively, that generate the single-wavelength (λi) of continuous wave laser light are optically connected through the optical fiber array 113 to an electro-optical chip (e.g., CMOS/SOI photonic/electronic chip) that includes an integrated comb generator at a front end of a transmitter macro. Examples of such electro-optical chips 101A and 101B are shown in FIGS. 14 and 15, respectively.

Figure 14:
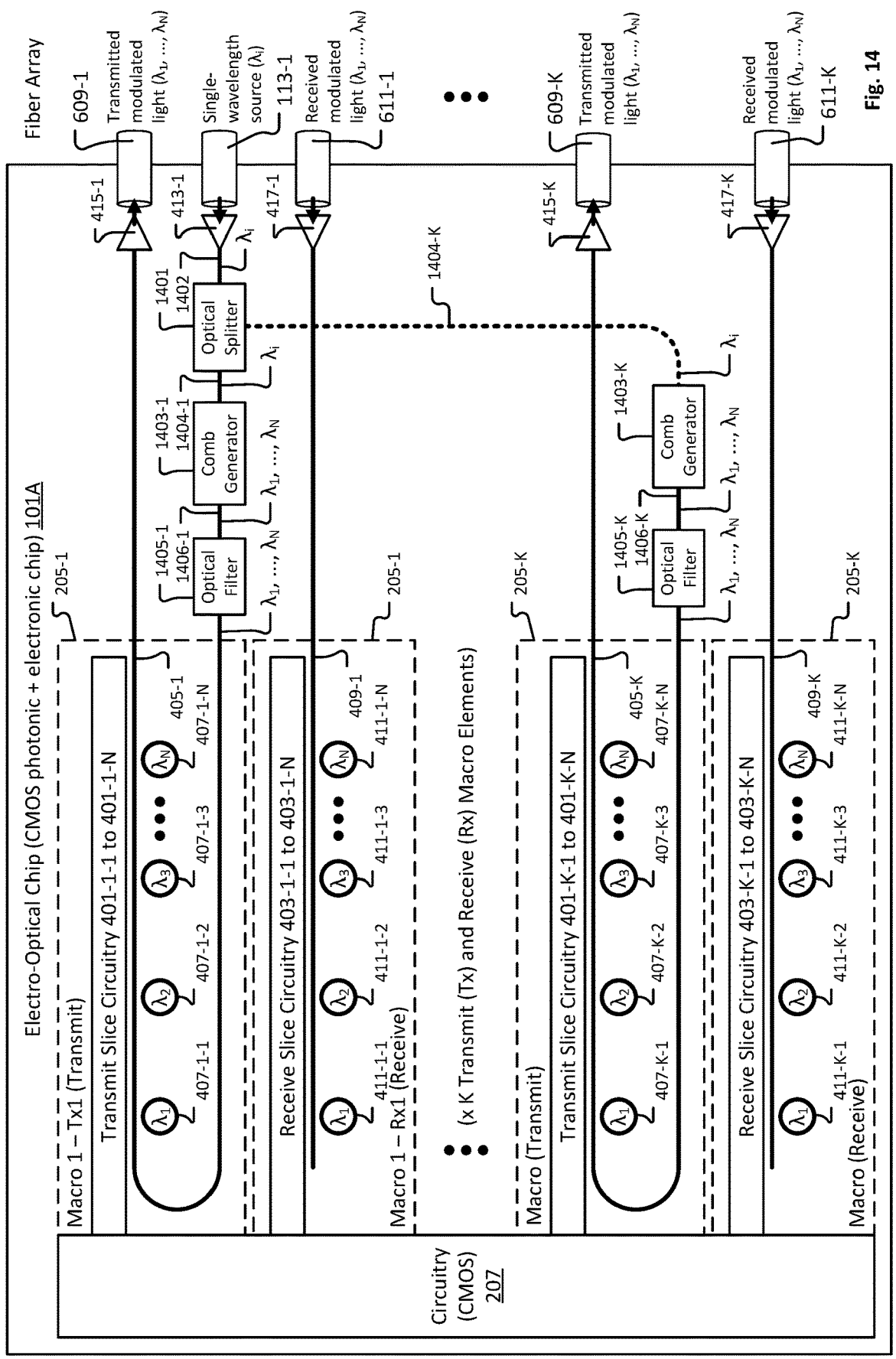
FIG. 14 shows the electro-optical chip configured to receive the single-wavelength ($\lambda i$) of continuous wave laser light from either of the remote single-wavelength optical power supplies, in accordance with some embodiments.
Figure 15:
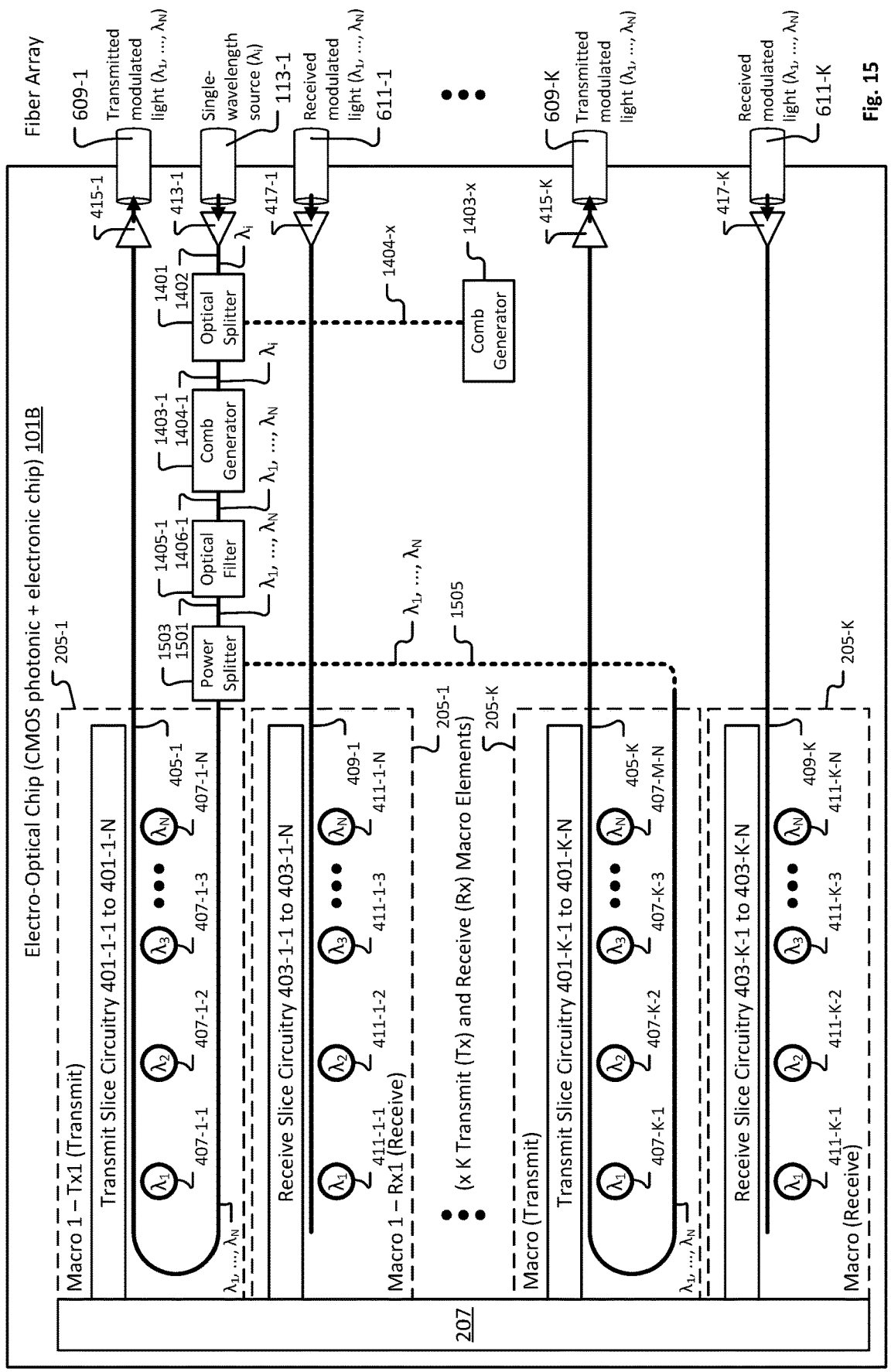
FIG. 15 show an electro-optical chip that is a variation of the electro-optical chip of FIG. 14, in accordance with some embodiments.

FIG. 14 shows the electro-optical chip 101A configured to receive the single-wavelength (λi) of continuous wave laser light from either of the remote single-wavelength optical power supplies 111N or 111O, in accordance with some embodiments. The electro-optical chip 101A is a modified version of the electro-optical chip 101 described with regard to FIGS. 1A through 6C. In some embodiments, the combination of the electro-optical chip 101A with either of the remote single-wavelength optical power supplies 111N or 111O represents a portion of a WDM optical data communication system that uses a single-wavelength external/remote optical power supply optically connected to the electro-optical chip 101A through the fiber array 113. In some embodiments, the optical fiber 113-1 optically connects the output of either of the remote single-wavelength optical power supplies 111N or 111O to the optical input port 413-1 of the electro-optical chip 101A, such that the single-wavelength (λi) of continuous wave laser light is received at the optical input port 413-1 from the optical fiber 113-1. It should be noted that because the transmit/receive macros 205-1 to 205-K in the electro-optical chip 101A operate independently from each other, precise control (e.g., matching) of the single-wavelength (λi) of continuous wave laser light is not required between the different transmit/receive macros 205-1 to 205-K. Once the single-wavelength (λi) of continuous wave laser light has been generated at the remote optical power supply 111N/111O and is optically coupled to the electro-optical chip 101A, each of a number K of comb generators 1403-1 to 1403-K on the electro-optical chip 101A receives the single-wavelength (λi) of continuous wave laser light as an input and generates a desired WDM wavelength/frequency grid for use by a corresponding one of the transmit/receive macros 205-1 to 205-K.

The electro-optical chip 101A includes an optical splitter 1401 having an optical input optically connected to the optical input port 413-1 of the electro-optical chip 101A, as indicated by the optical connection 102. In some embodiments, the optical connection 102 is an optical waveguide optically coupled to the optical input port 413-1. The optical splitter 1401 functions to split the incoming single-wavelength (λi) of continuous wave laser light for distribution to the transmit portions of the transmit/receive macros 205-1 to 205-K within the electro-optical chip 101A. More specifically, the single-wavelength (λi) of continuous wave laser light output from the optical splitter 1401 is transmitted to the optical input of each of the number K of comb generators 1403-1 to 1403-K within the electro-optical chip 101A through respective optical connections 1404-1 to 1404-K. In some embodiments, the optical connections 1404-1 to 1404-K are formed by respective optical waveguides that are optically coupled to respective optical outputs of the optical splitter 1401. Each comb generator 1403-1 to 1403-K is disposed within a light source input path of a corresponding one of the transmit/receive macros 205-1 to 205-K. Each of the comb generators 1403-1 through 1403-K operates to use the continuous wave laser light at the single wavelength (λi) to create CW light at multiple wavelengths (λ1, ..., λN) corresponding to a desired wavelength spacing, such as the WDM wavelength/frequency grid. In other words, each of the comb generators 1403-1 through 1403-K is configured to generate the desired WDM wavelength/frequency grid of continuous wave light.

In some embodiments, the multiple wavelengths (λ1, ..., λN) of light are transmitted directly from the comb generators 1403-1 through 1403-K into a respective one of the optical waveguides 405-1 to 405-K of the transmit portions of the transmit/receive macros 205-1 to 205-K. In some embodiments, as an option, the multiple wavelengths (λ1, ..., λN) of light are transmitted from the outputs of the comb generators 1403-1 to 1403-K through a corresponding optical connection 1406-1 to 1406-K to an optical input of a corresponding optical filter device 1405-1 to 1405-K. Then, filtered versions of the multiple wavelengths (λ1, ..., λN) of continuous wave light are transmitted from optical outputs of the optical filter devices 1405-1 to 1405-K into the corresponding optical waveguides 405-1 to 405-K of the of the corresponding transmit/receive macros 205-1 to 205-K. The optical filter devices 1405-1 through 1405-K operate to remove imperfections in the comb generation process performed by the comb generators 1403-1 to 1403-K. The multiple wavelengths (λ1, ..., λN) of continuous wave light of the WDM wavelength/frequency grid as output by the comb generators 1403-1 through 1403-K are sent as input light to the transmit portions of the transmit/receive macros 205-1 through 205-K for generation of modulated light signals that convey digital data. The modulated light signals are transmitted from the transmit portions of the transmit/receive macros 205-1 to 205-K to the optical output ports 415-1 to 415-K, respectively, and into respective optical fibers 609-1 to 609-K for transmission within the optical data communication network. It should be appreciated that implementation of the optical splitter 1401 significantly reduces the number of optical fibers required between the remote single-wavelength optical power supplies 111N and/or 111O and the electro-optical chip 101A. Also, it should be understood that in some embodiments multiple optical splitters, e.g., multiple instances of 1401, can be connected to respective one of the optical input ports 413-1 to 413-K in order to distribute the incoming continuous wave laser light at the single wavelength ($\lambda i$) to respective subsets of the comb generators 1403-1 to 1403-K. In this manner, a given instance of the optical splitter 1401 has its optical outputs connected to the optical inputs of a subset of the comb generators 1403-1 to 1403-K.

Combination of the remote single-wavelength optical power supplies 111N and/or 111O, or optional variant thereof, with the electro-optical chip 101A represents a photonic architecture in which a single wavelength ($\lambda i$) laser source is optically coupled to the electro-optical chip 101A, and in which a comb generator, e.g., 1403-1 to 1403-K, is integrated onboard the electro-optical chip 101A and operated to create the WDM wavelength/frequency grid for the transmit portions of the transmit/receive macros 205-1 to 205-K. In the above-described photonic architecture, each transmit/receive macro 205-1 to 205-K is serviced by a respective comb generator 1403-1 to 1403-K. It should be understood that use of the comb generators 1403-1 to 1403-K significantly reduces or eliminates the complexity of having an optical distribution network, such as the optical distribution network 603 as used in the remote optical power supply 101 of FIG. 6A, implemented within the remote single-wavelength optical power supplies 111N, 111O. Also, in the above-described photonic architecture, the single-wavelength laser light source that is optically transmitted to the electro-optical chip 101A is split to provide input light to the multiple comb generators 1403-1 to 1403-K. This splitting of the laser light source provides for a reduction in the number of optical input ports required on the electro-optical chip 101A and a reduction in the number of optical fibers that have to be connected to the electro-optical chip 101A. Also, with optical splitting either before or after comb generators 1403-1 to 1403-K, it is possible to introduce redundancy in case an input optical fiber, e.g., 113-1, loses light or a comb generator, e.g., 1403-1 to 1403-K, fails to work properly. In some embodiments, a photodiode detector is implemented within the electro-optical chip 101A to sense a drop in optical power at the optical input to the transmit portion of a corresponding transmit/receive macro 205-1 to 205-K. And, upon sensing the drop in optical power by the photodiode detector, an optical switch implemented within the electro-optical chip 101A operates to route light from the output of another comb generator 1403-1 to 1403-K to the transmit portion of the corresponding transmit/receive macro 205-1 to 205-K.

FIG. 15 show an electro-optical chip 101B that is a variation of the electro-optical chip 101A of FIG. 14, in accordance with some embodiments. The electro-optical chip 101B is configured to receive the single-wavelength ($\lambda i$) of continuous wave laser light from either of the remote single-wavelength optical power supplies 111N or 111O. The electro-optical chip 101B has the comb generator 1403-1 optically connected to provide multiple wavelengths ($\lambda 1, \ldots, \lambda N$) of continuous wave light as input to transmit portion of multiple transmit/receive macros 205-1 to 205-K. Specifically, the electro-optical chip 101B includes an optical power splitter 1503 having an optical input optically connected to the optical output of the optical filter device 1405-1 by way of an optical connection 1501. In some embodiments, the optical connection 1501 is an optical waveguide formed within the electro-optical chip 1B. In this manner, the optical power splitter 1503 receives as input, by way of the optical filter device 1405-1, the multiple wavelengths ($\lambda 1, \ldots, \lambda N$) of continuous wave light output by the comb generator 1403-1. The optical power splitter 1503 has multiple optical outputs respectively optically connected to the transmit portions of the transmit/receive macros 205-1 to 205-K. For example, the optical waveguide 405-1 of the transmit portion of the transmit/receive macro 205-1 is optically connected to an optical output of the optical power splitter 1503. And, similarly, the optical waveguide 405-K of the transmit portion of the transmit/receive macro 205-K is optically connected to an optical output of the optical power splitter 1503 through an optical connection 1505. In some embodiments, the optical connection 1505 is an optical waveguide formed with the electro-optical chip 101B. The optical power splitter 1503 splits and distributes the multiple wavelengths ($\lambda 1, \ldots, \lambda N$) of continuous wave light received from the comb generator 1403-1 to each of the transmit/receive macros 205-1 to 205-K. In some embodiments, the optical power splitter 1503 is configured to distribute substantially the same amount of optical power at each of the multiple wavelengths ($\lambda 1, \ldots, \lambda N$) to each of the transmit/receive macros 205-1 to 205-K.

In comparison to the electro-optical chip 101A, the electro-optical chip 101B does not require each of the transmit/receive macros 205-1 to 205-K to have its own comb generator 1403-1 to 1403-K, which reduces the number of photonic devices and expense of the electro-optical chip 101B relative to the electro-optical chip 101A. The configuration of the electro-optical chip 101B advantageously provides for reduction in the complexity and power consumption of the CMOS photonic circuits onboard the electro-optical chip 101B as compared to the electro-optical chip 101A. Also, in the electro-optical chip 101B, incoming light from the remote single-wavelength optical power supplies 111N or 111O can be optionally split by the optical splitter 1401 to be sent to another comb generator 1403-x, by way of a corresponding optical connection 1404-x, in case the number of input optical fibers is limited compared to the number K of transmit/receive macros 205-1 to 205-K. The WDM wavelength/frequency grid output by the comb generator 403-x can then be optionally optically filtered and subjected to power splitting for distribution to a subset of the transmit/receive macros 205-1 to 205-K.

In some embodiments, an optical data communication system includes the optical power supply 111N and/or 111O and the electro-optical chip 101A and/or 101B. In some embodiments, each of the electro-optical chips 101A and 101B includes the optical input port 413-1 optically connected to receive continuous wave light at the single wavelength ($\lambda i$) from the remote optical power supply 111N, 111O. Each of the electro-optical chips 101A and 101B also includes a comb generator 1403-1 to 1403-K having an optical input optically connected to receive the continuous wave light at the single wavelength ($\lambda i$) from the optical input port 413-1. Each of the comb generators 1403-1 to 1403-K is configured to generate multiple wavelengths ($\lambda 1, \ldots, \lambda N$) of continuous wave light from the continuous wave laser light at the single wavelength ($\lambda i$) and convey the multiple wavelengths ($\lambda 1, \ldots, \lambda N$) of continuous wave light through an optical output of the comb generator 1403-1 to 1403-K. Each of the electro-optical chips 101A and 101B also includes a transmit macro 205-1 to 205-K that receives the multiple wavelengths ($\lambda 1, \ldots, \lambda N$) of continuous wave light from the optical output of the comb generator 1403-1 to 1403-K. The transmit macro 205-1 to 205-K is configured to modulate one or more of the multiple wavelengths ($\lambda 1, \ldots, \lambda N$) of continuous wave light to generate modulated light signals that convey digital data.

In some embodiments, the electro-optical chip 101A and 101B includes a plurality of comb generators 1403-1 to 1403-K and a plurality of transit macros 205-1 to 205-K, where each transmit macro 205-1 to 205-K is connected to receive the multiple wavelengths ($\lambda 1, \ldots, \lambda N$) of continuous wave light from a corresponding one of the plurality of comb generators 1403-1 to 1403-K. The electro-optical chip 101A and 101B also includes the optical splitter 1401 optically connected to split the continuous wave light at the single wavelength ($\lambda i$) as received at the optical input port 413-1. The optical splitter 1401 is optically connected to supply a portion of the continuous wave light at the single wavelength ($\lambda i$) as input light to each of the plurality of comb generators 1403-1 to 1403-K. In some embodiments, a plurality of optical filter devices 1405-1 to 1405-K is respectively optically connected between a corresponding one of the plurality of comb generators 1403-1 to 1403-K and a corresponding one of the plurality of transmit macros 205-1 to 205-K. Each of the plurality of optical filter devices 1405-1 to 1405-K is configured to remove imperfections in the multiple wavelengths ($\lambda 1, \ldots, \lambda N$) of continuous wave light generated by the corresponding one of the plurality of comb generators 1403-1 to 1403-K. In some embodiments, the optical splitter 1503 is optically connected to supply a portion of the continuous wave light at each of the multiple wavelengths ($\lambda 1, \ldots, \lambda N$) as generated by the comb generator 1403-1 to 1403-K to each of the plurality of transmit macros 205-1 to 205-K. In some embodiments, the optical filter device 1405-1 to 1405-K is optically connected between the comb generator 1403-1 to 1403-K and the optical splitter 1503.

Figure 16:
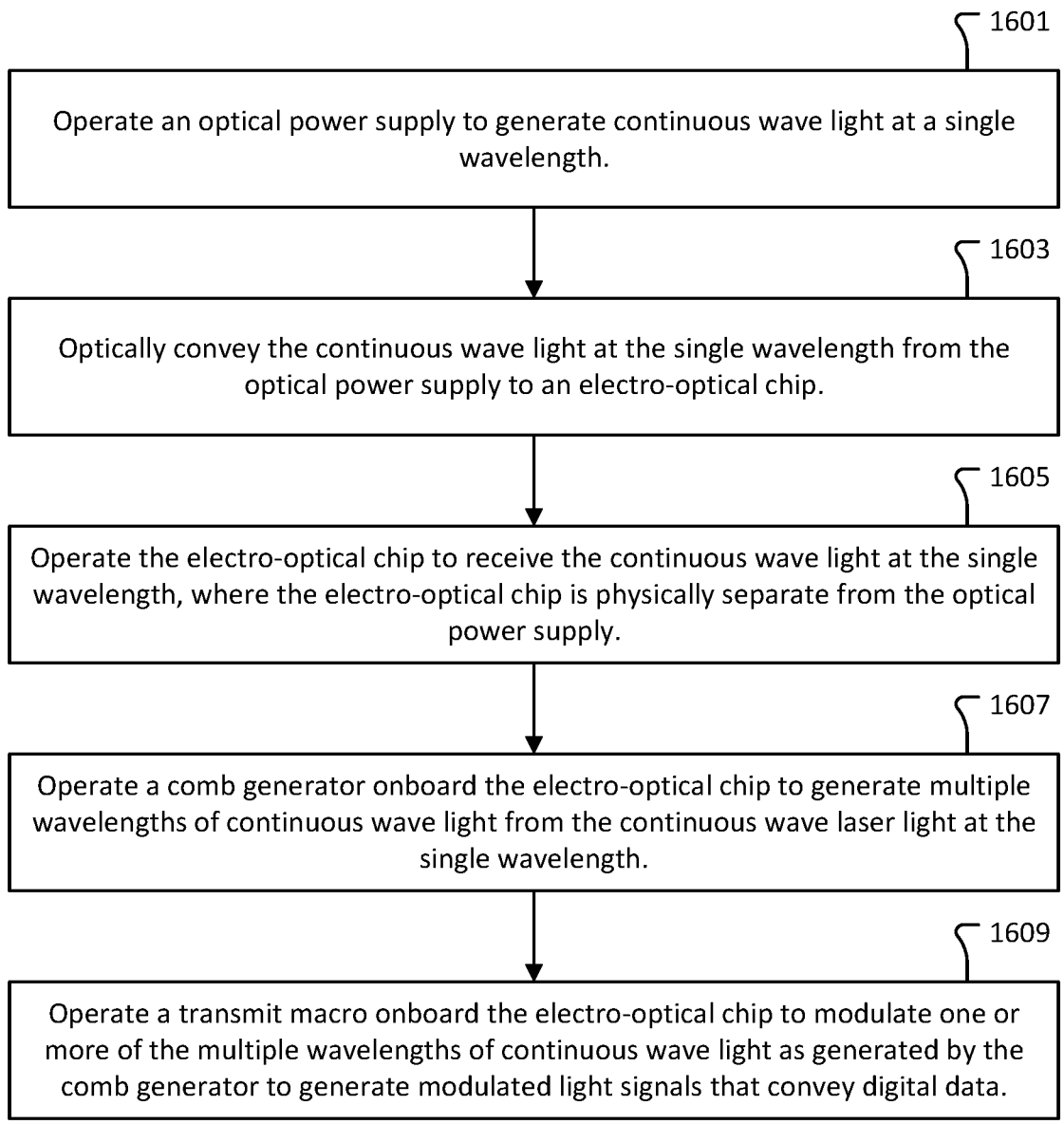
FIG. 16 shows a flowchart of a method for operating an optical data communication system, in accordance with some embodiments.

FIG. 16 shows a flowchart of a method for operating an optical data communication system, in accordance with some embodiments. The method includes an operation 1601 for operating an optical power supply (111N, 111O) to generate continuous wave light at a single wavelength ($\lambda i$). The method also includes an operation 1603 for optically conveying the continuous wave light at the single wavelength ($\lambda i$) from the optical power supply (111N, 111O) to an electro-optical chip (101A, 101B). The method also includes an operation 1605 for operating the electro-optical chip (101A, 101B) to receive the continuous wave light at the single wavelength ($\lambda i$). The electro-optical chip (101A, 101B) is physically separate from the optical power supply (111N, 111O). The method also includes an operation 1607 for operating a comb generator (1403-1 to 1403-K) onboard the electro-optical chip (101A, 101B) to generate multiple wavelengths ($\lambda 1, \ldots, \lambda N$) of continuous wave light from the continuous wave laser light at the single wavelength ($\lambda i$). The method also includes an operation 1609 for operating a transmit macro (205-1 to 205-K) onboard the electro-optical chip (101A, 101B) to modulate one or more of the multiple wavelengths ($\lambda 1, \ldots, \lambda N$) of continuous wave light as generated by the comb generator (1403-1 to 1403-K) to generate modulated light signals that convey digital data.

In some embodiments, the method includes conveying the continuous wave light at the single wavelength ($\lambda i$) through an optical splitter (1401) to supply a portion of the continuous wave light at the single wavelength ($\lambda i$) as input light to each of a plurality of comb generators (1403-1 to 1403-K) onboard the electro-optical chip (101A, 101B). In these embodiments, the method also includes operating each of the plurality of comb generators (1403-1 to 1403-K) to generate multiple wavelengths ($\lambda 1, \ldots, \lambda N$) of continuous wave light from the portion of the continuous wave laser light at the single wavelength ($\lambda i$). Also, in these embodiments, the method includes conveying the multiple wavelengths ($\lambda 1, \ldots, \lambda N$) of continuous wave light from each of the plurality of comb generators (1403-1 to 1403-K) to a corresponding one of a plurality of transmit macros (205-1 to 205-K) onboard the electro-optical chip (101A, 101B). Also, in these embodiments, the method includes operating each of the plurality of transmit macros (205-1 to 205-K) to modulate one or more of the multiple wavelengths ($\lambda 1, \ldots, \lambda N$) of continuous wave light to generate modulated light signals that convey digital data.

In some embodiments, the method includes operating each of a plurality of optical filter devices (1405-1 to 1405-K) onboard the electro-optical chip (101A, 101B) to remove imperfections in the multiple wavelengths ($\lambda 1, \ldots, \lambda N$) of continuous wave light generated by a corresponding one of the plurality of comb generators (1403-1 to 1403-K). In some embodiments, the method includes operating an optical splitter (1503) onboard the electro-optical chip (101A, 101B) to supply a portion of the continuous wave light at each of the multiple wavelengths ($\lambda 1, \ldots, \lambda N$) as generated by the comb generator (1403-1 to 1403-K) as input light to each of a plurality of transmit macros (205-1 to 205-K) onboard the electro-optical chip (101A, 101B). Also, in some embodiments, the method includes operating the optical filter device (1405-1 to 1405-K) onboard the electro-optical chip (101A, 101B) to remove imperfections in the multiple wavelengths ($\lambda 1, \ldots, \lambda N$) of continuous wave light generated by the comb generator (1403-1 to 1403-K) in route to the optical splitter (1503).

Figure 17:
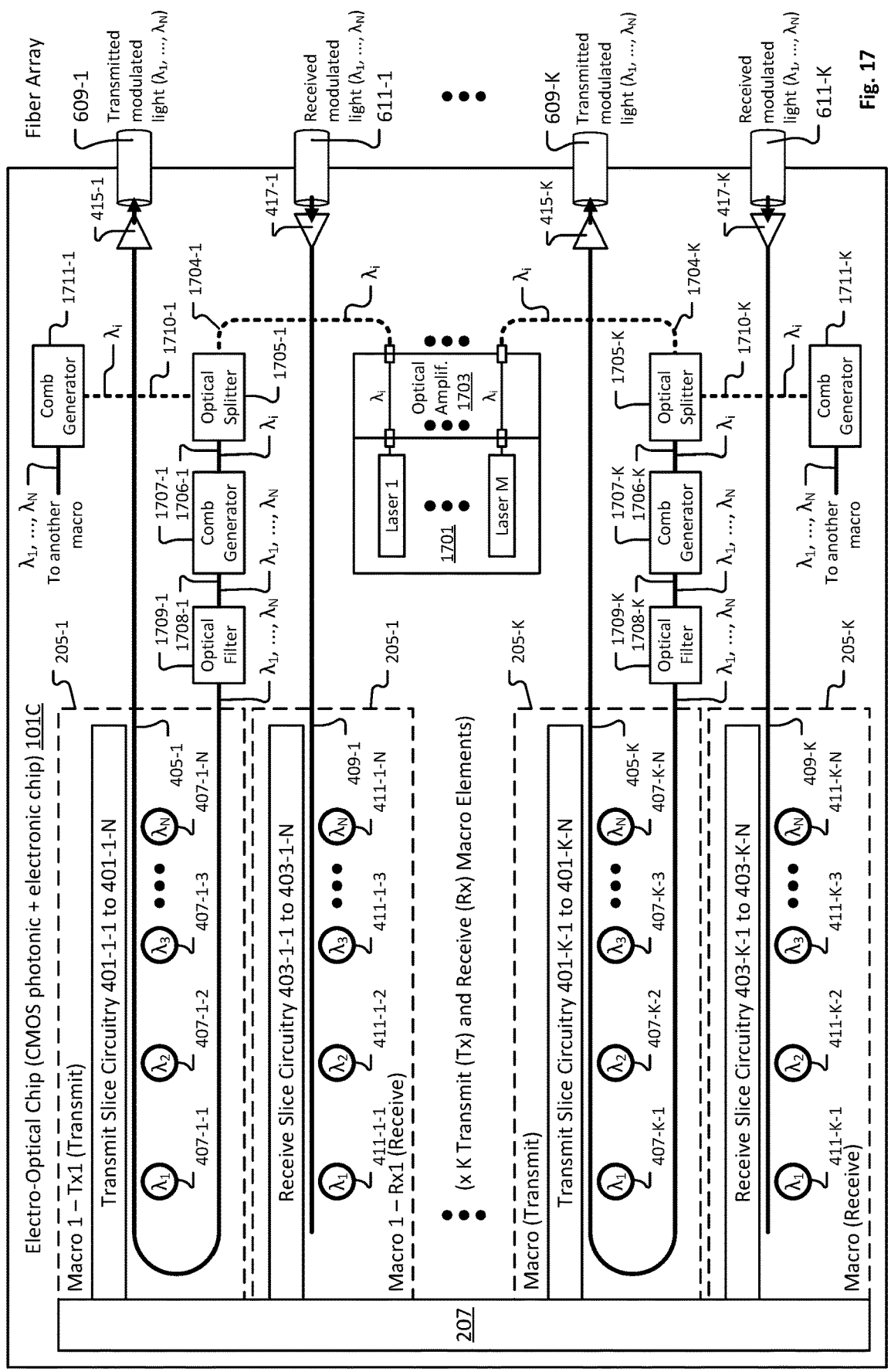
FIG. 17 shows an electro-optical chip that includes an onboard laser source for generating continuous wave laser light of a single-wavelength ($\lambda i$) that is used by a number K of comb generators onboard the electro-optical chip to generate multiple wavelengths ($\lambda 1, \ldots, \lambda N$) of continuous wave light for use by corresponding transmit/receive macros onboard the electro-optical chip, in accordance with some embodiments.

FIG. 17 shows an electro-optical chip 101C that includes an onboard laser source 1701 for generating continuous wave laser light of a single-wavelength ($\lambda i$) that is used by a number K of comb generators 1707-1 to 1707-K onboard the electro-optical chip 101C to generate multiple wavelengths ($\lambda 1, \ldots, \lambda N$) of continuous wave light for use by corresponding transmit/receive macros 205-1 to 205-K onboard the electro-optical chip 101C, in accordance with some embodiments. It should be understood that the electro-optical chip 101C is not connected to receive continuous wave input light from a remote optical power supply, thereby removing the complexity and cost associated with the remote optical power supply. In some embodiments, the electro-optical chip 101C is a portion of WDM optical data communication system. In some embodiments, the laser source 1701 includes a number M of lasers, where each of the M lasers is configured to generate the single wavelength ($\lambda i$) of continuous wave light. In some embodiments, the light output by the laser source 1701 is optionally optically amplified by an optical amplifying device 1703. The single wavelength ($\lambda i$) continuous wave light generated by the laser source 1701 is transmitted to comb generators 1707-1 to 1707-K, which generate and supply multiple wavelengths ($\lambda 1, \ldots, \lambda N$) of continuous wave light as input light to transmit portions of the transmit/receive macros 205-1 to 205-K, respectively.

In some embodiments, the light output by the laser source 1701 is transmitted through an optical connection 1704-1 to 1704-K (e.g., optical waveguide) to a corresponding optional optical splitter 1705-1 to 1705-K. Each of the optional optical splitters 1705-1 to 1705-K has multiple optical outputs connected to supply the single wavelength ($\lambda i$) of continuous wave light to multiple comb generators. For example, the optical splitter 1705-1 is connected to supply the single wavelength ($\lambda i$) of continuous wave light through an optical connection 1706-1 to an optical input of the comb generator 1707-1, and through an optical connection 1710-1 to an optical input of the comb generator 1711-1. Similarly, the optical splitter 1705-K is connected to supply the single wavelength ($\lambda i$) of continuous wave light through an optical connection 1706-K to an optical input of the comb generator 1707-K, and through an optical connection 1710-K to an optical input of the comb generator 1711-K. It should be understood, however, that in some embodiments, the optical splitters 1705-1 to 1705-K are not used, with the single wavelength ($\lambda i$) of continuous wave light being transmitted directly from the laser source 1701 (or from the optional optical amplifying device 1703) to the comb generators 1707-1 to 1707-K.

Each of the comb generators 1707-1 to 1707-K operates to use the continuous wave laser light at the single wavelength ($\lambda i$) to create continuous wave light at multiple wavelengths ($\lambda 1, \ldots, \lambda N$) corresponding to a desired wavelength spacing, such as the WDM wavelength/frequency grid. In some embodiments, the multiple wavelengths ($\lambda 1, \ldots, \lambda N$) of light are transmitted directly from the comb generators 1707-1 to 1707-K into a respective one of the optical waveguides 405-1 to 405-K of the transmit portions of the transmit/receive macros 205-1 to 205-K. In some embodiments, as an option, the multiple wavelengths ($\lambda 1, \ldots, \lambda N$) of light are transmitted from the outputs of the comb generators 1707-1 to 1707-K through a corresponding optical connection 1708-1 to 1708-K to an optical input of a corresponding optical filter device 1709-1 to 1709-K. Then, filtered versions of the multiple wavelengths ($\lambda 1, \ldots, \lambda N$) of continuous wave light are transmitted from optical outputs of the optical filter devices 1709-1 to 1709-K into the corresponding optical waveguides 405-1 to 405-K of the of the corresponding transmit/receive macros 205-1 to 205-K. The optical filter devices 1709-1 through 1709-K operate to remove imperfections in the comb generation process performed by the comb generators 1707-1 to 1707-K. The multiple wavelengths ($\lambda 1, \ldots, \lambda N$) of continuous wave light of the WDM wavelength/frequency grid as output by the comb generators 1707-1 through 1707-K are sent as input light to the transmit portions of the transmit/receive macros 205-1 through 205-K for generation of modulated light signals that convey digital data. The modulated light signals are transmitted from the transmit portions of the transmit/receive macros 205-1 to 205-K to the optical output ports 415-1 to 415-K, respectively, and into respective optical fibers 609-1 to 609-K for transmission within the optical data communication network.

The electro-optical chip 101C represents a portion of a WDM optical data communication system that uses a single-wavelength ($\lambda i$) integrated optical source (laser source 1701, with optional optical amplifying device 1703) implemented onboard the electro-optical chip 101C. The continuous wave laser light of the single wavelength ($\lambda i$) is conveyed from the integrated optical source to the comb generators 1707-1 to 1707-K, which use the single wavelength ($\lambda i$) of light to generate multiple wavelengths ($\lambda 1, \ldots, \lambda N$) of continuous wave light to create the desired WDM wavelength/frequency grid, which is then sent to the transmit portions of the transmit/receive macros 205-1 to 205-K. In some embodiments, the laser source 1701 includes multiple lasers. In some embodiments, the number M of lasers in the laser source 1701 is less than the number of comb generators 1707-1 to 1707-K. In these embodiments, one or more optical splitters 1705-1 to 1705-K are implemented to distribute the continuous wave laser light at the single wavelength ($\lambda i$) to each of the comb generators 1707-1 to 1707-K. In some embodiments, the laser source 1701 includes a single laser (with optional backup laser), with one or more optical splitters 1705-1 to 1705-K configured to distribute the continuous wave laser light at the single wavelength ($\lambda i$) from the single laser to each of the comb generators 1707-1 to 1707-K. In the electro-optical chip 101C, optional optical amplification and splitting can be used to boost light signal power and reduce the number of lasers required in the laser source 1701.

Figure 18:
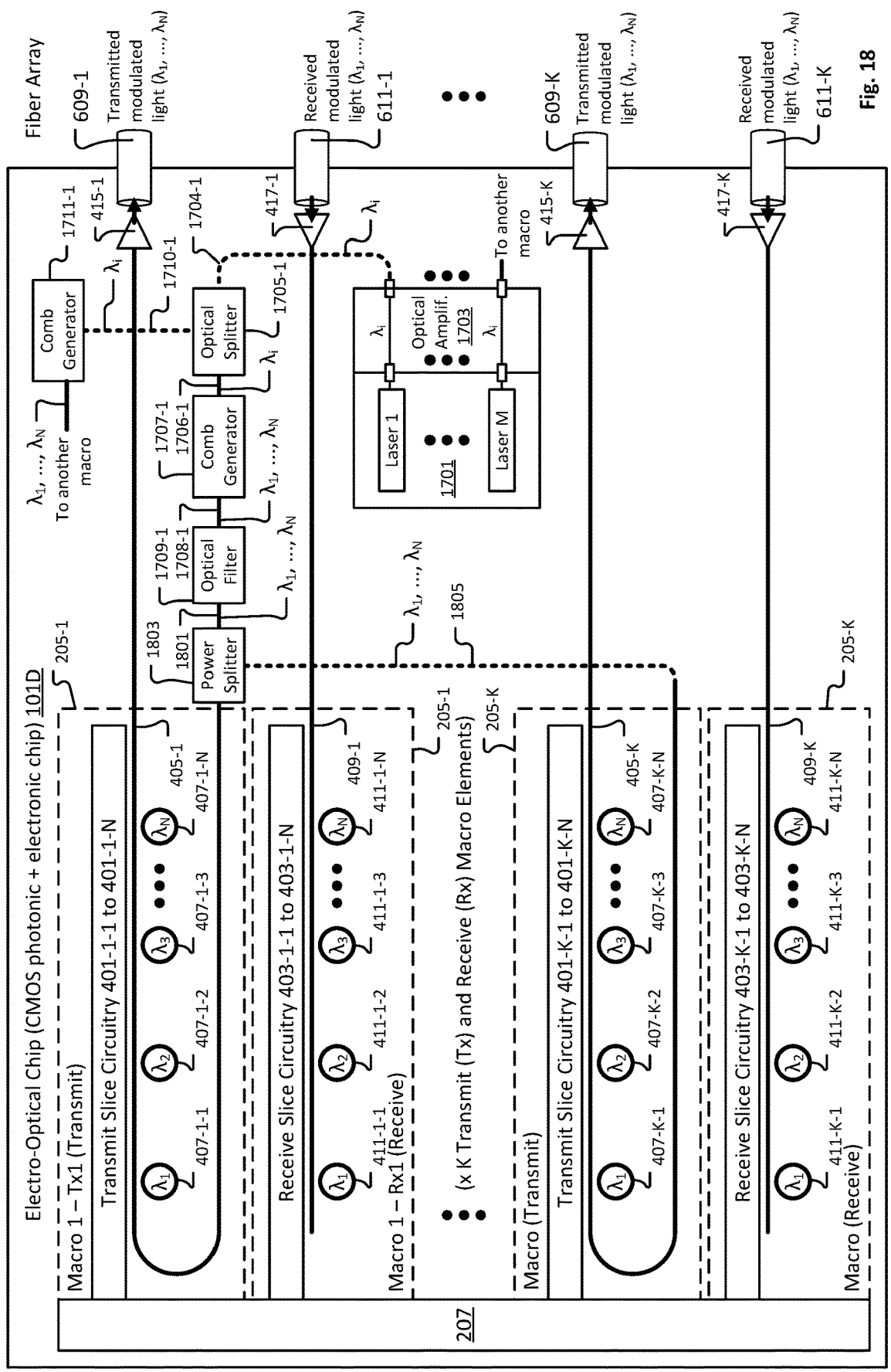
FIG. 18 shows an electro-optical chip that is a variation of the electro-optical chip of FIG. 17, in accordance with some embodiments.

FIG. 18 shows an electro-optical chip 101D that is a variation of the electro-optical chip 101C of FIG. 17, in accordance with some embodiments. The electro-optical chip 101D includes the onboard laser source 1701 for generating the single-wavelength ($\lambda i$) of continuous wave laser light for input to the comb generator 1707-1. However, the electro-optical chip 101D has the comb generator 1707-1 optically connected to provide multiple wavelengths ($\lambda 1, \ldots, \lambda N$) of continuous wave light as input to transmit portions of multiple transmit/receive macros 205-1 to 205-K. Specifically, the electro-optical chip 101D includes an optical power splitter 1803 having an optical input optically connected to the optical output of the optical filter device 1709-1 by way of an optical connection 1801. In some embodiments, the optical connection 1801 is an optical waveguide formed within the electro-optical chip 101D. In this manner, the optical power splitter 1803 receives as input, by way of the optical filter device 1709-1, the multiple wavelengths ($\lambda 1, \ldots, \lambda N$) of continuous wave light output by the comb generator 1707-1. The optical power splitter 1803 has multiple optical outputs respectively optically connected to the transmit portions of the transmit/receive macros 205-1 to 205-K. For example, the optical waveguide 405-1 of the transmit portion of the transmit/receive macro 205-1 is optically connected to an optical output of the optical power splitter 1803. And, similarly, the optical waveguide 405-K of the transmit portion of the transmit/receive macro 205-K is optically connected to an optical output of the optical power splitter 1803 through an optical connection 1805. In some embodiments, the optical connection 1805 is an optical waveguide formed with the electro-optical chip 101D. The optical power splitter 1803 splits and distributes the multiple wavelengths ($\lambda 1, \ldots, \lambda N$) of continuous wave light received from the comb generator 1707-1 to each of the transmit/receive macros 205-1 to 205-K. In some embodiments, the optical power splitter 1803 is configured to distribute substantially the same amount of optical power at each of the multiple wavelengths ($\lambda 1, \ldots, \lambda N$) to each of the transmit/receive macros 205-1 to 205-K. In comparison to the electro-optical chip 101C, the electro-optical chip 101D does not require each of the transmit/receive macros 205-1 to 205-K to have its own comb generator 1707-1 to 1707-K, which reduces the number of photonic devices and expense of the electro-optical chip 101D relative to the electro-optical chip 101C. The configuration of the electro-optical chip 101D advantageously provides for reduction in the complexity and power consumption of the CMOS photonic circuits onboard the electro-optical chip 101D as compared to the electro-optical chip 101C.

Figure 19:
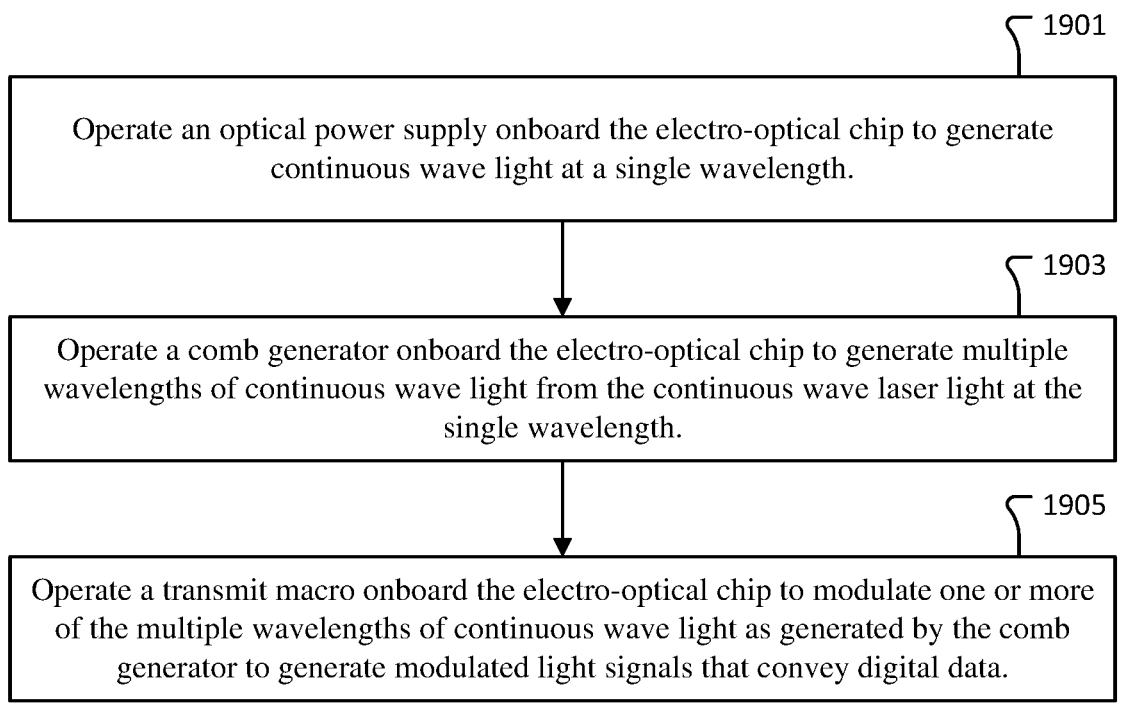
FIG. 19 shows a flowchart of a method for operating an electro-optical chip, in accordance with some embodiments.

FIG. 19 shows a flowchart of a method for operating an electro-optical chip (101C, 101D), in accordance with some embodiments. The method includes an operation 1901 for operating an optical power supply (1701) onboard the electro-optical chip (101C, 101D) to generate continuous wave light at a single wavelength ($\lambda i$). The method also includes an operation 1903 for operating a comb generator (1707-1 to 1707-K) onboard the electro-optical chip (101C, 101D) to generate multiple wavelengths ($\lambda 1, \ldots, \lambda N$) of continuous wave light from the continuous wave laser light at the single wavelength ($\lambda i$). The method also includes an operation 1905 for operating a transmit macro (205-1 to 205-K) onboard the electro-optical chip (101C, 101D) to modulate one or more of the multiple wavelengths ($\lambda 1, \ldots, \lambda N$) of continuous wave light as generated by the comb generator (1707-1 to 1707-K) to generate modulated light signals that convey digital data.

In some embodiments, the method includes operating each of a plurality of comb generators (1707-1 to 1707-K) onboard the electro-optical chip (101C, 101D) to generate multiple wavelengths ($\lambda 1, \ldots, \lambda N$) of continuous wave light from the continuous wave light at a single wavelength ($\lambda i$). Also, in these embodiments, the method includes operating each of a plurality of transmit macros (205-1 to 205-K) onboard the electro-optical chip (101C, 101D) to modulate one or more of the multiple wavelengths ($\lambda 1, \ldots, \lambda N$) of continuous wave light as generated by a corresponding one of the plurality of comb generators (1707-1 to 1707-K) to generate modulated light signals that convey digital data. In some embodiments, the method includes operating an optical splitter (1705-1 to 1705-K) onboard the electro-optical chip (101C, 101D) to supply a portion of the continuous wave light at the single wavelength ($\lambda i$) as generated by the optical power supply (1701) to at least two of the plurality of comb generators (1707-1 to 1707-K). In some embodiments, the method includes operating each of a plurality of optical filter devices (1709-1 to 1709-K) onboard the electro-optical chip (101C, 101D) to remove imperfections in the multiple wavelengths ($\lambda 1, \ldots, \lambda N$) of continuous wave light generated by a corresponding one of the plurality of comb generators (1707-1 to 1707-K).

In some embodiments, the method includes operating an optical splitter (1803) onboard the electro-optical chip (101C, 101D) to supply a portion of the continuous wave light at each of the multiple wavelengths ($\lambda i, \ldots, \lambda N$) as generated by the comb generator (1707-1 to 1707-K) to each of a plurality of transmit macros (205-1 to 205-K) onboard the electro-optical chip (101C, 101D). Also, in some of these embodiments, the method includes operating an optical filter device (1709-1 to 1709-K) onboard the electro-optical chip (101C, 101D) to remove imperfections in the multiple wavelengths ($\lambda 1, \ldots, \lambda N$) of continuous wave light generated by the comb generator (1707-1 to 1707-K) in route to the optical splitter (1803).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the invention description. Accordingly, the present embodiments are to be considered as illustrative and not restrictive, and the invention is not to be limited to the details given herein, but may be modified within the scope and equivalents of the described embodiments.

What is claimed is:

1. An electro-optical chip, comprising:
a plurality of transmit macros, each of the plurality of transmit macros having a respective substantially U-shaped optical waveguide including a linear-shaped optical input waveguide segment, a curved waveguide segment, and a linear-shaped optical output waveguide segment, each of the plurality of transmit macros having a set of microring resonators positioned within an evanescent optical coupling distance of the linear-shaped optical output waveguide segment, each of the microring resonators configured to modulate light of a particular wavelength traveling through the linear-shaped optical output waveguide segment;
a plurality of optical outputs located on a same side of the electro-optical chip, the plurality of optical outputs respectively optically connected to the linear-shaped optical output waveguide segments of the plurality of transmit macros;
an optical input port configured to optically connect to a remote single-wavelength optical power supply to receive a single wavelength of continuous wave laser light from the remote single-wavelength optical power supply;
a comb generator having an optical input optically connected to the optical input port such that the single wavelength of continuous wave laser light is received at the optical input of the comb generator, the comb generator configured to generate a plurality of distinct wavelengths of continuous wave light from the single wavelength of continuous wave light that is received through the optical input port, the comb generator having an optical output, the comb generator configured to transmit the plurality of distinct wavelengths of continuous wave light through the optical output of the comb generator; and
an optical power splitter having an optical input optically connected to the optical output of the comb generator so as to receive the plurality of distinct wavelengths of continuous wave light from the comb generator, the optical power splitter having a plurality of optical outputs respectively optically connected to the linear-shaped optical input waveguide segments of the plurality of transmit macros, the optical power splitter configured to supply a portion of each of the plurality of distinct wavelengths of continuous wave light through each of the plurality of optical outputs of the optical power splitter to each of the linear-shaped optical input waveguide segments of the plurality of transmit macros.

2. The electro-optical chip as recited in claim 1, wherein the set of microring resonators of each of the plurality of transmit macros includes a plurality of microring resonators.

3. The electro-optical chip as recited in claim 2, wherein each of the plurality of microring resonators is tuned to optically in-couple light of a specified wavelength from the optical waveguide.

4. The electro-optical chip as recited in claim 3, wherein the specified wavelength is different for each plurality of microring resonators.

5. The electro-optical chip as recited in claim 3, further comprising:
   a plurality of heating devices implemented to respectively control wavelength tuning of the plurality of microring resonators.

6. The electro-optical chip as recited in claim 1, further comprising:
   an optical filter optically disposed between the comb generator and the optical power splitter.

7. The electro-optical chip as recited in claim 1, further comprising:
   a plurality of comb generators, wherein said comb generator is one of the plurality of comb generators; and
   an input optical power splitter configured to receive the single wavelength of continuous wave light from the optical input port and supply a portion of the single wavelength of continuous wave light to the optical input of each of the plurality of comb generators.

8. The electro-optical chip as recited in claim 7, further comprising:
   multiple pluralities of transmit macros, wherein said plurality of transmit macros is one of the multiple pluralities of transmit macros, wherein each of the plurality of comb generators is configured to generate the plurality of distinct wavelengths of continuous wave light from the portion of the single wavelength of continuous wave light and supply the plurality of distinct wavelengths of continuous wave light to a respective plurality of transmit macros of the multiple pluralities of transmit macros.

9. The electro-optical chip as recited in claim 1, further comprising:
   a laser configured generate the single wavelength of continuous wave light and supply the single wavelength of continuous wave light to the comb generator.

10. A method for operating an electro-optical chip, comprising:
    receiving a single wavelength of continuous wave light at an optical input port of an electro-optical chip from a laser external to the electro-optical chip;
    conveying the single wavelength of continuous wave light from the optical input port to an optical input of a comb generator onboard the electro-optical chip, the comb generator having an optical output optically connected to an optical input of an optical splitter onboard the electro-optical chip;
    operating the comb generator to generate a plurality of distinct wavelengths of continuous wave light from the single wavelength of continuous wave light;
    transmitting the plurality of distinct wavelengths of continuous wave light through the optical output of the comb generator to the optical input of the optical splitter;
    conveying the plurality of distinct wavelengths of continuous wave light through the optical power splitter such that a portion of each of the plurality of distinct wavelengths of continuous wave light is conveyed through each of a plurality of optical outputs of the optical splitter to a respective plurality of optical waveguides of a respective plurality of transmit macros onboard the electro-optical chip, wherein each optical waveguide of the plurality of transmit macros has a substantially U-shaped portion that includes a linear-shaped optical input waveguide segment, a curved waveguide segment, and a linear-shaped optical output waveguide segment, wherein the linear-shaped optical input waveguide segments of the plurality of transmit macros are respectively optically connected to the plurality of optical outputs of the optical splitter;
    operating a set of microring resonators positioned within an evanescent optical coupling distance of a given one of the plurality of linear-shaped optical output waveguide segments of the plurality of transmit macros to modulate light of a particular wavelength traveling through the given one of the plurality of linear-shaped optical output waveguide segments to generate at least one modulated light signal; and
    conveying the at least one modulated light signal to a given optical output of the electro-optical chip, wherein the given optical output of the electro-optical chip is one of a plurality of optical outputs of the electro-optical chip respectively optical connected the plurality of linear-shaped optical output waveguide segments of the plurality of transmit macros, the plurality of optical outputs of the electro-optical chip located on a same side of the electro-optical chip.

11. The method as recited in claim 10, wherein the set of microring resonators of each of the plurality of transmit macros includes a plurality of microring resonators.

12. The method as recited in claim 11, further comprising:
    tuning each of the plurality of microring resonators to optically in-couple light of a specified wavelength from the optical waveguide.

13. The method as recited in claim 12, wherein the specified wavelength is different for each plurality of microring resonators.

14. The method as recited in claim 12, further comprising:
    operating a plurality of heating devices to respectively control wavelength tuning of the plurality of microring resonators.

15. The method as recited in claim 10, further comprising:
    optically filtering the plurality of distinct wavelengths of continuous wave light generated by the comb generator in route to the optical power splitter.

16. The method as recited in claim 10, further comprising:
    conveying a portion of the single wavelength of continuous wave light from the optical input port to an optical input of each of a plurality of comb generators, wherein said comb generator is one of the plurality of comb generators.

17. The method as recited in claim 16, further comprising:
    operating each of the plurality of comb generators to generate the plurality of distinct wavelengths of continuous wave light from the portion of the single wavelength of continuous wave light; and
    conveying the plurality of distinct wavelengths of continuous wave light from each of the plurality of comb generators to a respective set of one or more transmit macros onboard the electro-optical chip.

* * * * *